United States Patent
Aritoshi et al.

(10) Patent No.: US 10,160,182 B2
(45) Date of Patent: Dec. 25, 2018

(54) TRANSFER FILM, TRANSPARENT LAMINATE, ELECTROSTATIC CAPACITANCE-TYPE INPUT DEVICE, AND IMAGE DISPLAY DEVICE

(71) Applicant: FUJIFILM Corporation, Tokyo (JP)

(72) Inventors: Yohei Aritoshi, Fujinomiya (JP); Kentaro Toyooka, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/661,049

(22) Filed: Jul. 27, 2017

(65) Prior Publication Data

US 2017/0334165 A1  Nov. 23, 2017

(30) Foreign Application Priority Data

Mar. 12, 2015 (JP) .................. 2015-049986

(51) Int. Cl.
    *G06F 3/044*   (2006.01)
    *B32B 7/02*    (2006.01)
    *B32B 27/08*   (2006.01)

(52) U.S. Cl.
    CPC ............ *B32B 7/02* (2013.01); *B32B 27/08* (2013.01); *G06F 3/044* (2013.01); *B32B 2307/412* (2013.01); *B41M 2205/40* (2013.01); *G06F 2203/04103* (2013.01); *G06F 2203/04111* (2013.01)

(58) Field of Classification Search
    CPC . B41M 1/28; B41M 1/34; B41M 5/00; B41M 5/0058; B41M 5/007; B41M 2205/40; G06F 3/044; G06F 2203/04103
    USPC ...................................... 428/32.77
    See application file for complete search history.

(56) References Cited

U.S. PATENT DOCUMENTS

| 9,632,639 B2 | 4/2017 | Kanna et al. |
| 2015/0251393 A1 | 9/2015 | Kanna et al. |

FOREIGN PATENT DOCUMENTS

| JP | 2003-191414 A | 7/2003 |
| JP | 2008-224829 A | 9/2008 |
| JP | 2010-042670 A | 2/2010 |
| JP | 2010-086684 A | 4/2010 |
| JP | 2010-152809 A | 7/2010 |

(Continued)

OTHER PUBLICATIONS

International Preliminary Report on Patentability and Translation of Written Opinion dated Sep. 12, 2017 from the International Bureau in counterpart International application No. PCT/JP2016/057763.

(Continued)

*Primary Examiner* — Bruce H Hess
(74) *Attorney, Agent, or Firm* — Sughrue Mion, PLLC

(57) ABSTRACT

Provided are a transfer film which includes a temporary support, a first curable transparent resin layer, and a second transparent resin layer disposed in direct contact with the first curable transparent resin layer in this order, satisfies Expression 1 and Expression 2A:

$$n_1 < n_2 \qquad \text{Expression 1:}$$

$$100 \times \sigma_2/T_2 \leq 5.0 \qquad \text{Expression 2A:}$$

where $n_1$ represents a refractive index of the first curable transparent resin layer, $n_2$ represents a refractive index of the second transparent resin layer, $\sigma_2$ represents a standard deviation of a thickness of the second transparent resin layer, and $T_2$ represents an average thickness of the second transparent resin layer.

14 Claims, 11 Drawing Sheets

(56) References Cited

FOREIGN PATENT DOCUMENTS

| | | |
|---|---|---|
| JP | 2010-257492 A | 11/2010 |
| JP | 2012-078528 A | 4/2012 |
| JP | 2014-010814 A | 1/2014 |
| JP | 2014-108541 A | 6/2014 |
| JP | 2014-157983 A | 8/2014 |
| WO | 2014/084112 A1 | 6/2014 |

OTHER PUBLICATIONS

International Search Report for PCT/JP2016/057763 dated May 31, 2016 [PCT/ISA/210].
Written Opinion for PCT/JP2016/057763 dated May 31, 2016 [PCT/ISA/237].
Office Action dated Jul. 17, 2018, from the Japanese Patent Office in counterpart Japanese Application No. 2017-505418.
Office Action dated Aug. 6, 2018, from the State Intellectual Property Office of People's Republic of China in counterpart Chinese Application No. 201680008563.2.

TRANSFER FILM, TRANSPARENT LAMINATE, ELECTROSTATIC CAPACITANCE-TYPE INPUT DEVICE, AND IMAGE DISPLAY DEVICE

CROSS-REFERENCE TO RELATED APPLICATIONS

This application is a Continuation of PCT International Application No. PCT/JP2016/057763, filed on Mar. 11, 2016, which claims priority under 35 U.S.C. Section 119(a) to Japanese Patent Application No. 2015-049986 filed on Mar. 12, 2015. Each of the above applications is hereby expressly incorporated by reference, in its entirety, into the present application.

BACKGROUND OF THE INVENTION

1. Field of the Invention

The present invention relates to a transfer film, a transparent laminate, an electrostatic capacitance-type input device, and an image display device. Specifically, the present invention relates to a transfer film which can be used to form transparent laminates which have favorable transparent electrode pattern-masking properties and allow color unevenness only to a small extent and has photolithographic properties, a transparent laminate which has favorable transparent electrode pattern-masking properties and allows color unevenness only to a small extent, an electrostatic capacitance-type input device including this transparent laminate, and an image display device comprising this electrostatic capacitance-type input device as a constituent element.

2. Description of the Related Art

Recently, as electronic devices such as mobile phones, car navigations, personal computers, ticket vending machines, and bank terminals, there are electronic devices in which a liquid crystal display device having a touch panel-type input device is provided and desired commands can be input by touching images and the like displayed on the liquid crystal display devices with a finger, a stylus, or the like.

As the above-described input device (touch panel), there are resistance film-type input devices, electrostatic capacitance-type input devices, and the like.

The electrostatic capacitance-type input devices have an advantage that a translucent conductive film needs to be formed only on one substrate. As such electrostatic capacitance-type input devices, for example, there are input devices in which electrode patterns are extended in mutually intersecting directions and input locations are detected by detecting changes in the electrostatic capacitance between electrodes caused in a case in which the input devices are touched by a finger or the like (for examples, refer to JP2010-86684A, JP2010-152809A, and JP2010-257492A).

Furthermore, JP2014-010814A discloses a transparent laminate including, in the plane, a region in which a transparent substrate, a first transparent film having a refractive index of 1.6 to 1.78 and a thickness of 55 to 110 nm, a transparent electrode pattern, and a second transparent film having a refractive index of 1.6 to 1.78 and a thickness of 55 to 110 nm are laminated in this order in order to prevent transparent electrode patterns in the electrostatic capacitance-type input devices described in JP2010-86684A, JP2010-152809A, and JP2010-257492A from being observed.

As methods for forming transparent films as described in JP2014-010814A, a variety of methods are known. JP2014-010814A describes a method in which metal oxides are sputtered or a method in which curable transparent resin layers formed on a temporary support are transferred onto a substrate. JP2014-010814A describes that, in a case in which an opening portion for installing a pressure-sensitive (not a change in electrostatic capacitance but a press-type mechanical mechanism) switch is formed on a part of a front plate (a surface that is directly touched by a finger), the use of a transfer film during the formation of a transparent resin layer does not cause the leakage or protrusion of resist components through the opening portion, eliminate the necessity for a step of removing leaked or protruded portions, and enhances production efficiency.

JP2014-108541A discloses a transfer film including a temporary support, a first curable transparent resin layer, and a second transparent resin layer disposed adjacent to the first curable transparent resin layer in this order, in which the refractive index of the second transparent resin layer is higher than the refractive index of the first curable transparent resin layer, and the refractive index of the second transparent resin layer is 1.6 or higher. According to JP2014-108541A, it is described that, when the refractive index difference between a transparent electrode pattern (preferably ITO) and the second transparent resin layer and the refractive index difference between the second transparent resin layer and the first curable transparent resin layer are set to be small, light reflection is reduced, the transparent electrode pattern becomes rarely visible, and visibility can be improved. In addition, it is described that the transfer film of JP2014-108541A is preferably used to form transparent insulating layers or transparent protective layers in electrostatic capacitance-type input devices.

JP2012-078528A describes a method for forming resin patterns having favorable developability and the like using a photosensitive composition including a resin having an acidic group at a side chain, a polymerizable compound, and a photopolymerization initiator.

SUMMARY OF THE INVENTION

In JP2014-108541A, a transfer film in which two or more transparent resin layers can be laminated together at once by forming a first curable transparent resin layer on a temporary support, curing the first curable transparent resin layer by means of exposure, and then laminating a second transparent resin layer by means of application is formed. In JP2014-010814A and JP2012-078528A, methods for laminating two or more transparent resin layers at once were not studied.

In electrostatic capacitance-type input devices that are ordinarily used, a frame portion is provided around an image display region. Therefore, in a case in which a refractive index-adjusting layer (a layer for improving transparent electrode pattern-masking properties by making transparent electrode patterns rarely visible) or a transparent protective layer (also referred to as an overcoat layer) of the electrostatic capacitance-type input device is formed using a transfer film, there is a demand that it is easy to shape the refractive index-adjusting layer or the transparent protective layer in a desired pattern shape so as to prevent the refractive index-adjusting layer or the transparent protective layer from being laminated on the frame portion while the problem of transparent electrode patterns being visually observed is solved by laminating the refractive index-adjusting layer on an image display region at the same time. As a method for forming the refractive index-adjusting layer or the transparent protective layer in a desired pattern, a method in which a transfer film is cut along the shape of the frame portion of the electrostatic capacitance-type input device (a die cut method or a half cut method) can be considered. However, from the viewpoint of further enhancing productivity, it is desirable to form transparent laminates having so favorable patterning properties that the refractive index-adjusting layer or the transparent protective layer can be developed in a desired pattern by means of photolithography after being transferred onto a transparent electrode pattern from a transfer film. Since the second transparent resin layer is formed by means of application after the first curable transparent resin layer is cured, the transfer film described in JP2014-108541A is described to have "the first curable transparent resin layer", but the transparent resin layer on the first layer already has significantly lost "curing properties" and is thus not suitable for post-transfer photolithography. In addition, in the examples of JP2012-078528A, since laminates are formed by transferring and curing a curable resin layer on the first layer and then transferring and curing a curable resin layer on the second layer using another transfer film, the laminates are not suitable for post-transfer photolithography. Therefore, transfer films in which two or more transparent resin layers can be laminated together at once (in other words, at the same time) and which is suitable for photolithography are not known yet.

On the basis of the above-described circumstance, when providing one transparent resin layer using the method described in JP2014-010814A, JP2014-108541A, or JP2012-078528A and then forming another transparent resin layer on the second layer by means of application without curing the transparent resin layer on the first layer for the purpose of imparting photolithographic properties, the present inventors found that interlaminar mixing occurred. It was found that, due to the disarray in the interface between the first curable resin layer and the second curable resin layer attributed to this interlaminar mixing, portions in which the first curable resin layer and the second curable resin layer had different thicknesses from each other were randomly generated in the plane of the transfer film. Generally, it is known that, in bilayer-structured transparent bodies, light is reflected on the air interface and on a surface of a second layer facing the air interface opposite to the air interface, and an optical interference phenomenon caused by phase shifting attributed to the optical path difference has an influence on the transmission characteristics or reflection characteristics of transparent laminates. At this time, as described above, in the case of transparent bodies in which portions in which the second curable resin layer has a different thickness are randomly generated in the plane of a transfer film, the intensity or tint of reflected light appears to vary in the plane of the transfer film, and so-called color unevenness occurs. Actually, in a case in which the inventors of the present invention visually observed a transfer film in which one transparent resin layer on the second layer was provided using the method described in JP2014-010814A, JP2014-108541A, or JP2012-078528A and then another transparent resin layer was formed by means of application without curing the earlier-formed transparent resin layer, color unevenness occurred significantly, and it was necessary to improve the methods described in JP2014-010814A, JP2014-108541A, and JP2012-078528A.

That is, regarding transfer films having favorable transparent electrode pattern-masking properties for solving the problem of transparent electrode patterns being visually observed, there have been no known transfer films which can be used to form transparent laminates which allow color unevenness only to a small extent, can be developed in desired patterns by means of photolithography, and have favorable productivity due to the capability of laminating two or more transparent resin layers at once.

The present invention has been made in consideration of the above-described circumstances. An object of the present invention is to provide a transfer film which can be used to form transparent laminates which have favorable transparent electrode pattern-masking properties and allow color unevenness only to a small extent, is capable of transferring two or more transparent resin layers at once, and has photolithographic properties. Another object of the present invention is to provide a transparent laminate which has favorable transparent electrode pattern-masking properties and allows color unevenness only to a small extent, an electrostatic capacitance-type input device including this transparent laminate, and an image display device comprising this electrostatic capacitance-type input device as a constituent element.

The inventors of the present invention studied regarding the first curable transparent resin layer which was, unlike that in JP2014-108541A, not cured and instead put into a state of being curable. The inventors of the present invention found that, when a transfer film having a second transparent resin layer disposed in direct contact with a first curable transparent resin layer in a state of being curable is controlled so that the refractive indexes of the first curable transparent resin layer and the second transparent resin layer satisfy a specific relationship and is controlled so that a value obtained by dividing the standard deviation of the thickness of the second transparent resin layer by the average thickness (so-called coefficient of variation) satisfies a specific range, it is possible to achieve the above-described objects.

The present invention which is specific means for achieving the above-described objects and preferred aspects of the present invention will be described below.

[1] A transfer film comprising in this order: a temporary support; a first curable transparent resin layer; and a second transparent resin layer disposed in direct contact with the first curable transparent resin layer, in which Expression 1 and Expression 2A are satisfied, $n_1 < n_2$      Expression 1:

$100 \times \sigma_2 / T_2 \leq 5.0$      Expression 2A:

where $n_1$ represents a refractive index of the first curable transparent resin layer, $n_2$ represents a refractive index of the second transparent resin layer, $\sigma_2$ represents a standard deviation of a thickness of the second transparent resin layer, and $T_2$ represents an average thickness of the second transparent resin layer.

[2] The transfer film according to [1], in which Expression 2B is preferably satisfied, $0.2 \leq 100 \times \sigma_2 / T_2$      Expression 2B:

where $\sigma_2$ represents the standard deviation of the thickness of the second transparent resin layer, and $T_2$ represents the average thickness of the second transparent resin layer.

[3] The transfer film according to [1] or [2], in which Expression 3A is preferably satisfied, $100 \times H_2 / T_2 \leq 20$      Expression 3A:

where $H_2$ represents a difference between a maximum value and a minimum value of the thickness of the second transparent resin layer, and $T_2$ represents the average thickness of the second transparent resin layer.

[4] The transfer film according to any one of [1] to [3], in which Expression 3B is preferably satisfied, $2 \leq 100 \times H_2 / T_2$      Expression 3B:

where $H_2$ represents a difference between a maximum value and a minimum value of the thickness of the second transparent resin layer, and $T_2$ represents the average thickness of the second transparent resin layer.

[5] The transfer film according to any one of [1] to [4], in which Expression 4A is preferably satisfied, $$X_2 \leq 100 \qquad \text{Expression 4A:}$$

where $X_2$ represents a sum of the number of portions in which the thickness of the second transparent resin layer is thicker than the average thickness $T_2$ of the second transparent resin layer and the number of portions in which the thickness of the second transparent resin layer is thinner than the average thickness $T_2$ of the second transparent resin layer per 4 cm length in a direction parallel to a surface of the first curable transparent resin layer in a vertical cross-section of the transfer film.

[6] The transfer film according to any one of [1] to [5], in which Expression 4B is preferably satisfied, $$3 \leq X_2 \qquad \text{Expression 4B:}$$

where $X_2$ represents a sum of the number of the portions in which the thickness of the second transparent resin layer is thicker than the average thickness $T_2$ of the second transparent resin layer and the number of the portions in which the thickness of the second transparent resin layer is thinner than the average thickness $T_2$ of the second transparent resin layer per 4 cm length in a direction parallel to a surface of the first curable transparent resin layer in a vertical cross-section of the transfer film.

[7] The transfer film according to any one of [1] to [6], in which the first curable transparent resin layer preferably includes 0.01% to 0.5% by mass of a surfactant containing a fluorine atom with respect to a solid content of the first curable transparent resin layer.

[8] The transfer film according to any one of [1] to [7], in which the first curable transparent resin layer preferably includes a resin that is soluble in organic solvents.

[9] The transfer film according to any one of [1] to [8] which is preferably a dry-resist film.

[10] A transparent laminate comprising: a transparent electrode pattern; a second transparent resin layer disposed in direct contact with the transparent electrode pattern; and a first curable transparent resin layer disposed in direct contact with the second transparent resin layer, in which Expression 1 and Expression 2A are satisfied, $$n_1 < n_2 \qquad \text{Expression 1:}$$

$$100 \times \sigma_2 / T_2 \leq 5.0 \qquad \text{Expression 2A:}$$

where $n_1$ represents a refractive index of the first curable transparent resin layer, $n_2$ represents a refractive index of the second transparent resin layer, $\sigma_2$ represents a standard deviation of a thickness of the second transparent resin layer, and $T_2$ represents an average thickness of the second transparent resin layer.

[11] The transparent laminate according to [10], in which the second transparent resin layer and the first curable transparent resin layer in the transfer film according to any one of [1] to [9] are preferably laminated together in this order on the transparent electrode pattern.

[12] A transparent laminate, in which the second transparent resin layer and the first curable transparent resin layer in the transfer film according to any one of [1] to [9] are laminated together in this order on a transparent electrode pattern.

[13] An electrostatic capacitance-type input device comprising: the transparent laminate according to any one of [10] to [12].

[14] An image display device comprising: the electrostatic capacitance-type input device according to [13] as a constituent element.

According to the present invention, it is possible to provide a transfer film which can be used to form transparent laminates which have favorable transparent electrode pattern-masking properties and allow color unevenness only to a small extent, is capable of transferring two or more transparent resin layers at once, and has photolithographic properties.

BRIEF DESCRIPTION OF THE DRAWINGS

FIG. 14 is a schematic view illustrating an example of a state in which the transfer film of the present invention having the first curable transparent resin layer and a second transparent resin layer is laminated on the transparent electrode pattern in the electrostatic capacitance-type input device by means of lamination and is yet to be cured by means of exposure or the like.

DESCRIPTION OF THE PREFERRED EMBODIMENTS

Figure 1A:
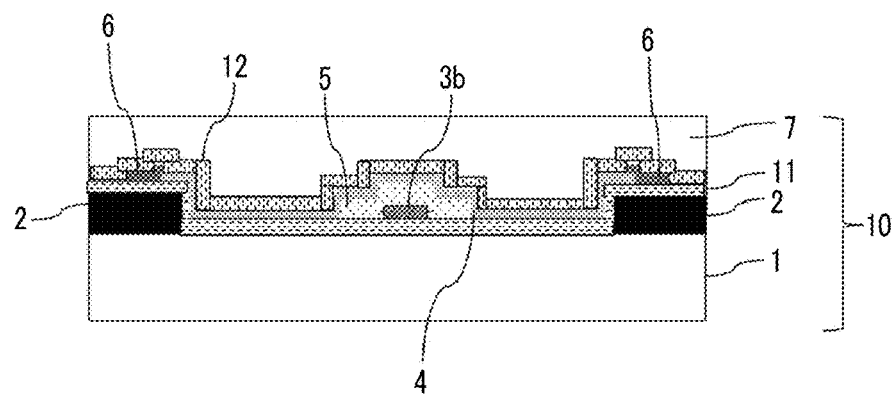
FIG. 1A is a schematic cross-sectional view illustrating an example of a constitution of an electrostatic capacitance-type input device of the present invention.

Hereinafter, a transfer film, a transparent laminate, an electrostatic capacitance-type input device, and an image display device of the present invention will be described. Hereinafter, constituent requirements will be described on the basis of typical embodiments or specific examples of the present invention in some cases, but the present invention is not limited to these embodiments or specific examples. Meanwhile, in the present specification, numerical ranges expressed using "to" includes numerical values before and after the "to" as the lower limit value and the upper limit value.

[Transfer Film]

The transfer film of the present invention is a transfer film which has a temporary support, a first curable transparent resin layer, and a second transparent resin layer disposed in direct contact with the first curable transparent resin layer in this order and satisfies Expression 1 and Expression 2A;

$$n_1 < n_2 \qquad \text{Expression 1:}$$

$$100 \times \sigma_2/T_2 \leq 5.0 \qquad \text{Expression 2A:}$$

$n_1$ represents the refractive index of the first curable transparent resin layer, $n_2$ represents the refractive index of the second transparent resin layer, $\sigma_2$ represents the standard deviation of the thickness of the second transparent resin layer, and $T_2$ represents the average thickness of the second transparent resin layer.

When the above-described constitution is provided, it is possible to provide transfer films which can be used to form transparent laminates which have favorable transparent electrode pattern-masking properties and allow color unevenness only to a small extent, are capable of transferring two or more transparent resin layers at once, and have photolithographic properties.

Transparent electrode patterns (preferably including a metal oxide such as indium tin oxide (ITO)) generally have a higher refractive index than resin layers. When the transfer film of the present invention satisfies Expression 1: $n_1 < n_2$, it is possible to obtain transfer films in which the refractive index difference between the transparent electrode pattern and the second transparent resin layer and the refractive index difference between the second transparent resin layer and the first curable transparent resin layer become small, in a case in which a transparent laminate is formed on the viewer side of the transparent electrode pattern, light reflection is reduced and the transparent electrode pattern becomes rarely visible, and transparent electrode pattern-masking properties can be improved.

In addition, even when the first curable transparent resin layer is laminated with the second transparent resin layer while remaining in a state of being curable, in a case in which Expression 2A is satisfied, the layers are favorably differentiated from each other, transparent electrode pattern visibility can be improved with the mechanism of Expression 1, and it is possible to develop the first curable transparent resin layer and the second transparent resin layer in a desired pattern by means of photolithography after the first curable transparent resin layer and the second transparent resin layer are transferred onto the transparent electrode pattern from the transfer film. Meanwhile, when the first curable transparent resin layer and the second transparent resin layer are favorably differentiated from each other, a refractive index adjustment effect that can be obtained due to the mechanism of Expression 1 is likely to be sufficiently obtained, and transparent electrode pattern visibility tends to be sufficiently improved. Practically, photolithography needs to be carried out on at least the first curable transparent resin layer which becomes a layer closer to the outside than the second transparent resin layer after transfer. The second transparent resin layer which becomes a layer closer to the inside than the first curable transparent resin layer after transfer may not have photolithographic properties. In the present invention, since the first curable transparent resin layer is curable in a state of being included in the transfer film, the first curable transparent resin layer which becomes a layer closer to the outside than the second transparent resin layer after transfer has photolithographic properties.

Furthermore, when the transfer film of the present invention satisfies Expression 2A, it is possible to prevent color unevenness attributed to the thickness unevenness of the second curable transparent resin layer in the plane from being easily observed and reduce color unevenness.

Hereinafter, a preferred aspect of the transfer film of the present invention will be described.

<Layer Constitution of Transfer Film>

The transfer film of the present invention has a temporary support, a first curable transparent resin layer, and a second transparent resin layer disposed in direct contact with the first curable transparent resin layer in this order. The temporary support and the first curable transparent resin layer may be disposed in direct contact with each other or may be disposed through another layer. Examples of another layer include a thermoplastic resin layer or an interlayer described below. The temporary support and the first curable transparent resin layer are preferably disposed in direct contact with each other.

Figure 12:
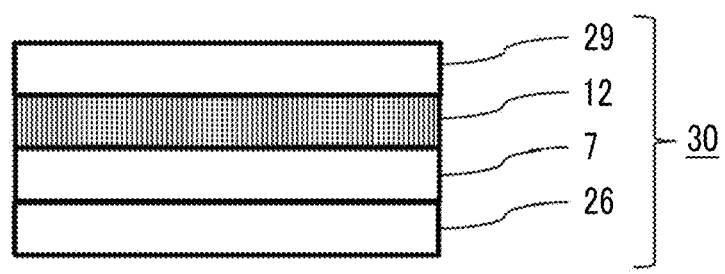
FIG. 12 is a schematic cross-sectional view illustrating another example of the constitution of the transfer film of the present invention.

FIG. 12 illustrates an example of a preferred layer constitution of the transfer film of the present invention. FIG. 12 is a schematic view of a transfer film 30 of the present invention in which a temporary support 26, a first curable transparent resin layer 7, a second transparent resin layer 12, and a protective peeling layer (protective film) 29 are laminated adjacent to each other in this order.

<Characteristics of Transfer Film>

(Refractive Indexes)

The transfer film of the present invention satisfies Expression 1.

$$n_1 < n_2 \qquad \text{Expression 1:}$$

$n_1$ represents the refractive index of the first curable transparent resin layer, and $n_2$ represents the refractive index of the second transparent resin layer.

That is, in the transfer film of the present invention, the refractive index of the second transparent resin layer is higher than the refractive index of the first curable transparent resin layer. The $(n_2 - n_1)$ value is preferably 0.03 to 0.30 and more preferably 0.05 to 0.20.

The refractive index $n_1$ of the first curable transparent resin layer is preferably $1.45 \leq n_1 \leq 1.59$, more preferably $1.5 \leq n_1 \leq 1.53$, particularly preferably $1.5 \leq n_1 \leq 1.52$, and more particularly preferably $1.51 \leq n_1 \leq 1.52$.

The refractive index $n_2$ of the second transparent resin layer is preferably 1.60 or higher. Meanwhile, the refractive index of the second transparent resin layer needs to be adjusted depending on the refractive index of the transparent electrode pattern, and the upper limit value of the refractive index is not particularly limited, but is preferably 2.1 or lower and more preferably 1.78 or lower. The refractive index $n_2$ of the second transparent resin layer is preferably $1.60 \leq n_2 \leq 1.75$. The refractive index of the second transparent resin layer may be 1.74 or lower.

In a case in which the refractive index of the transparent electrode pattern exceeds 2.0 as in the case of the oxide of In and Zn (indium zinc oxide: IZO), the refractive index $n_2$ of the second transparent resin layer is preferably 1.7 or higher and 1.85 or lower.

(Thickness of Second Transparent Resin Layer)

The transfer film of the present invention satisfies Expression 2A.

$$100 \times \sigma_2/T_2 \leq 5.0 \qquad \text{Expression 2A:}$$

$\sigma_2$ represents the standard deviation of the thickness of the second transparent resin layer, and $T_2$ represents the average thickness of the second transparent resin layer.

Figure 16:
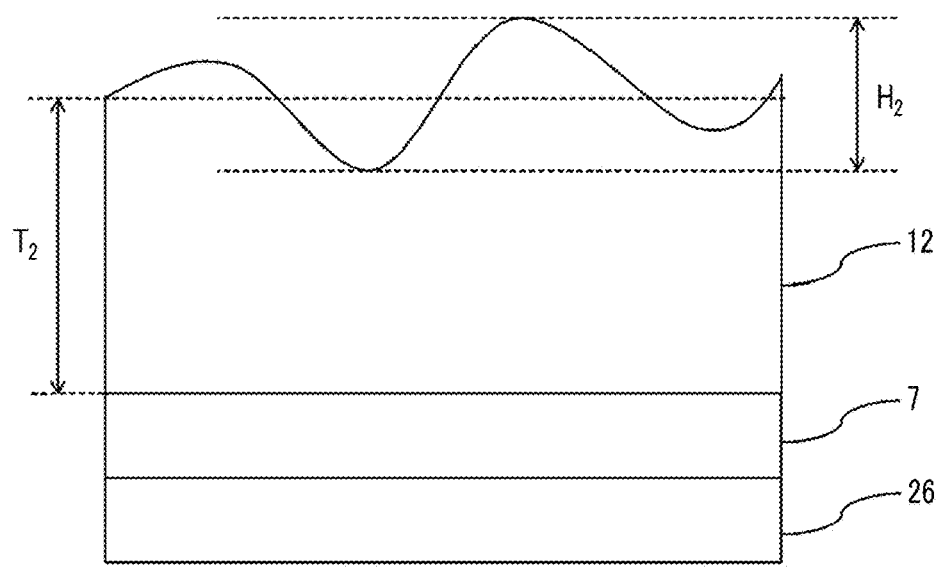
FIG. 16 is a schematic cross-sectional view illustrating still another example of the constitution of the transfer film of the present invention.

FIG. 16 illustrates a schematic cross-sectional view illustrating another example of the constitution of the transfer film of the present invention. Here, there are cases in which the thickness of the second transparent resin layer 12 is not uniform in the plane of the second transparent resin layer 12. In addition, there are cases in which the thickness of the first curable transparent resin layer 7 is not uniform in the plane of the first curable transparent resin layer 7. In the transfer film of the present invention, even in a case in which the thickness of the second transparent resin layer 12 is not uniform, the thickness is controlled so that the value obtained by dividing the standard deviation of the thickness of the second transparent resin layer by the average thickness (so-called coefficient of variation) satisfies a specific range. The thickness of the second transparent resin layer 12 refers to the thickness from the interface between the first curable transparent resin layer 7 and the second transparent resin layer 12 to the surface of the second transparent resin layer 12 on the opposite side (the side on which the first curable transparent resin layer 7 is not disposed). FIG. 16 illustrates an aspect in which the thickness of the first curable transparent resin layer 7 is uniform and the height of the interface between the first curable transparent resin layer 7 and the second transparent resin layer 12 is uniform, but the present invention is not limited by FIG. 16.

$T_2$ can be obtained by averaging the thickness of the second transparent resin layer. In FIG. 16, the average thickness $T_2$ of the second transparent resin layer is indicated using broken lines.

$\sigma_2$ can be obtained by measuring the thickness of the second transparent resin layer at a plurality of places and computing the statistical standard deviation according to an ordinary method.

$100 \times \sigma_2/T_2$ is 5.0 or less, more preferably 4.4 or less from the viewpoint of reducing color unevenness, particularly preferably 2.9 or less, and more particularly preferably 2.5 or less.

In order to suppress color unevenness, $100 \times \sigma_2/T_2$ is preferably small, and, in order to set $100 \times \sigma_2/T_2$ to less than 0.2, it is easy to formulate a large amount of a surfactant in the first curable transparent resin layer as described below. In this case, the entry of a large amount of the surfactant in the first curable transparent resin layer into the second transparent resin layer is prevented when the second transparent resin layer has been formed by means of application, whereby it becomes difficult for the surfactant to be precipitated on the surface of the second transparent resin layer during the additional drying of the second transparent resin layer and to be extremely eccentrically located between the second transparent resin layer and the transparent electrode pattern, and thus it becomes difficult to decrease adhesiveness between the second transparent resin layer and the transparent electrode pattern. From this viewpoint, $100 \times \sigma_2/T_2$ is preferably 0.2 or more in a practical sense. That is, the transfer film of the present invention preferably satisfies Expression 2B from the viewpoint of improving adhesiveness between the second transparent resin layer and the transparent electrode pattern.

$$0.2 \leq 100 \times \sigma_2/T_2 \qquad \text{Expression 2B:}$$

$\sigma_2$ represents the standard deviation of the thickness of the second transparent resin layer, and $T_2$ represents the average thickness of the second transparent resin layer.

$100 \times \sigma_2/T_2$ is more preferably 0.3 or more, particularly preferably 0.4 or more, and more particularly preferably 1.0 or more.

The transfer film of the present invention preferably satisfies Expression 3A since it is possible to form transparent laminates which allow color unevenness only to a small extent.

$$100 \times H_2/T_2 \leq 20 \qquad \text{Expression 3A:}$$

$H_2$ represents the difference between the maximum value and the minimum value of the thickness of the second transparent resin layer, and $T_2$ represents the average thickness of the second transparent resin layer.

$H_2$ can be obtained as the difference between the maximum value and the minimum value of the second transparent resin layer. FIG. 16 illustrates $H_2$ obtained from the maximum value and the minimum value of the thickness of the second transparent resin layer.

Color unevenness can be further reduced as $H_2$ decreases, and, in a case in which Expression 3A is satisfied, even a small area of color unevenness is not easily observed, and color unevenness can be reduced.

$100 \times H_2/T_2$ is more preferably 18 or less, particularly preferably 15 or less, and more particularly preferably 13 or less.

$100 \times H_2/T_2$ is preferably small; however, in order to produce transfer film having $100 \times H_2/T_2$ of less than 2, it is necessary to provide production steps with significant restrictions such as the extreme lowering of the drying temperature. In order to enhance the productivity (production efficiency) of transfer films, $100 \times H_2/T_2$ is preferably 2 or more in a practical sense. That is, the transfer film of the present invention preferably satisfies Expression 3B.

$$2 \leq 100 \times H_2/T_2 \qquad \text{Expression 3B:}$$

$H_2$ represents the difference between the maximum value and the minimum value of the thickness of the second transparent resin layer, and $T_2$ represents the average thickness of the second transparent resin layer.

$100 \times H_2/T_2$ is more preferably 3 or more.

The transfer film of the present invention preferably satisfies Expression 4A.

$$X_2 \leq 100 \qquad \text{Expression 4A:}$$

$X_2$ represents the sum of the number of portions in which the thickness of the second transparent resin layer is thicker than the average thickness $T_2$ of the second transparent resin layer and the number of portions in which the thickness of the second transparent resin layer is thinner than the average thickness $T_2$ of the second transparent resin layer per 4 cm length in a direction parallel to the surface of the first curable transparent resin layer in a vertical cross-section of the transfer film.

Since a group of places away from the average thickness of the second transparent resin layer is observed as a single unevenness (regardless of the size), when the total $X_2$ of the number of portions in which the thickness of the second transparent resin layer is thicker than the average thickness $T_2$ of the second transparent resin layer and the number of portions in which the thickness of the second transparent resin layer is thinner than the average thickness $T_2$ of the second transparent resin layer per 4 cm of the transfer film satisfies Expression 4A, it is possible to reduce color unevenness. Since it is determined that $X_2$ is a value obtained from 4 cm of the transfer film, values measured from 4 cm of the transfer film may be used or values obtained by measuring the total number from a length of shorter or longer than 4 cm of the transfer film and converting the measured total number to a value for 4 cm of the transfer film may be used.

Figure 9:
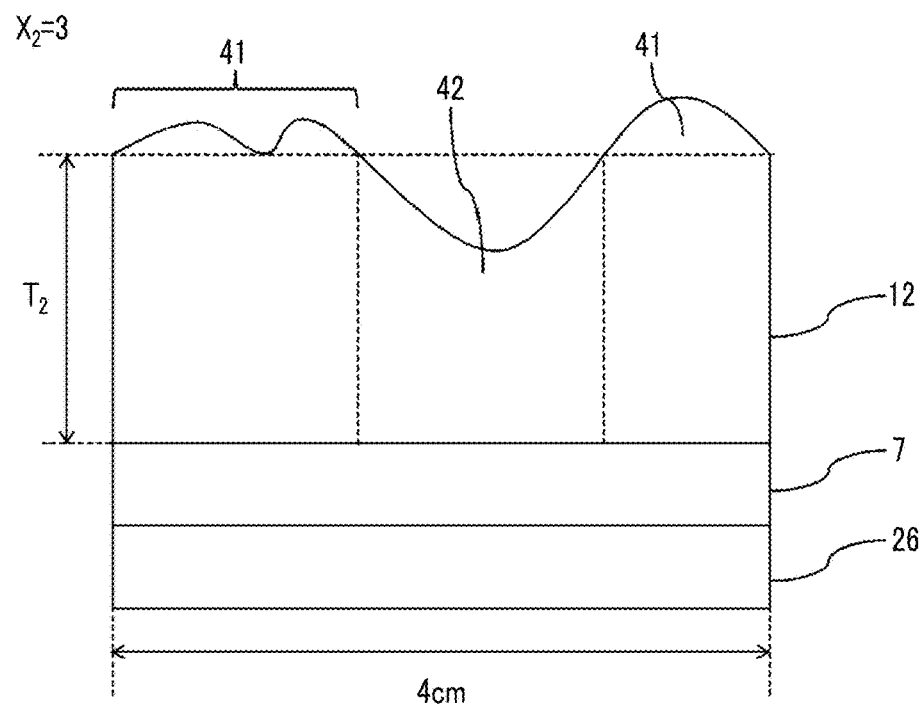
FIG. 9 is a schematic cross-sectional view illustrating an example of a constitution of a transfer film of the present invention.
Figure 17:
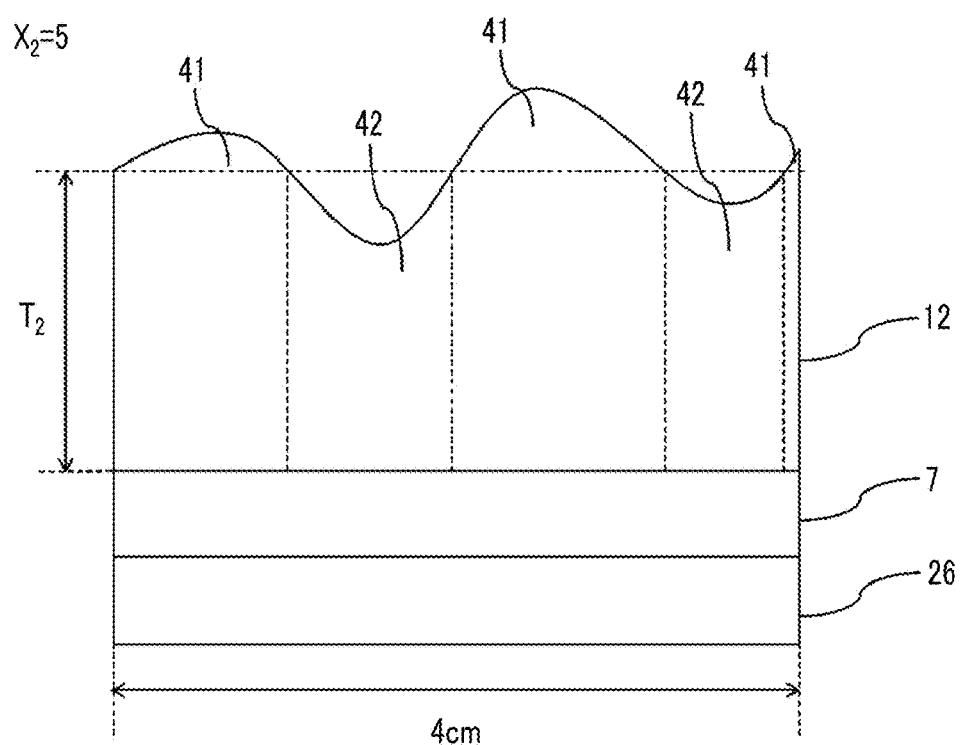
FIG. 17 is a schematic cross-sectional view illustrating still another example of the constitution of the transfer film of the present invention.

FIG. 17 and FIG. 9 illustrate schematic cross-sectional views illustrating additional examples of the constitution of the transfer film of the present invention. In FIG. 17, since three portions 41 in which the thickness of the second transparent resin layer is thicker than the average thickness $T_2$ of the second transparent resin layer are present per 4 cm of the transfer film, and two portions 42 in which the thickness of the second transparent resin layer is thinner than the average thickness $T_2$ of the second transparent resin layer are present per 4 cm of the transfer film, $X_2$ is obtained to be five. In FIG. 9, since two portions 41 in which the thickness of the second transparent resin layer is thicker than the average thickness $T_2$ of the second transparent resin layer are present per 4 cm of the transfer film, and one portion 42 in which the thickness of the second transparent resin layer is thinner than the average thickness $T_2$ of the second transparent resin layer is present per 4 cm of the transfer film, $X_2$ is obtained to be three.

Particularly, FIG. 9 illustrates an aspect in which the portion 41 on the left side in FIG. 9 in which the thickness of the second transparent resin layer is thicker than the average thickness $T_2$ of the second transparent resin layer has a portion in which the thickness is exactly the same as the average thickness $T_2$ of the second transparent resin layer (the measurement point in a measurement method described below), and, in this case, the portion is observed as a single uneven color portion, and the number of the portion 41 in which the thickness of the second transparent resin layer is thicker than the average thickness $T_2$ of the second transparent resin layer is counted as one. Since only cases in which a portion thinner than the average thickness $T_2$ of the second transparent resin layer changes to a portion thicker than the average thickness $T_2$ of the second transparent resin layer or a portion thicker than the average thickness $T_2$ of the second transparent resin layer changes to a portion thinner than the average thickness $T_2$ of the second transparent resin layer (that is, cases in which actual measurement points cross $T_2$ in the case of being graphed) are observed as separate uneven color portions, $X_2$ is computed as a total of two which results from one portion 41 in which the thickness of the second transparent resin layer is thicker than the average thickness $T_2$ of the second transparent resin layer and one portion 42 in which the thickness of the second transparent resin layer is thinner than the average thickness $T_2$ of the second transparent resin layer.

$X_2$ is preferably 80 or less, more preferably 50 or less, and particularly preferably 30 or less.

The transfer film of the present invention preferably satisfies Expression 4B from the viewpoint of improving adhesiveness between the second transparent resin layer and the transparent electrode pattern.

$$3 \leq X_2 \qquad \text{Expression 4B:}$$

$X_2$ represents the sum of the number of the portions in which the thickness of the second transparent resin layer is thicker than the average thickness $T_2$ of the second transparent resin layer and the number of the portions in which the thickness of the second transparent resin layer is thinner than the average thickness $T_2$ of the second transparent resin layer per 4 cm length in the direction parallel to the surface of the first curable transparent resin layer in the vertical cross-section of the transfer film.

In other words, $X_2$ represents the sum of the number of the portions in which the thickness of the second transparent resin layer is thicker than the average thickness $T_2$ of the second transparent resin layer and the number of the portions in which the thickness of the second transparent resin layer is thinner than the average thickness $T_2$ of the second transparent resin layer per 4 cm length in the direction parallel to the surface of the first curable transparent resin layer in a case in which the thickness of the second transparent resin layer in the transfer film is measured along a flat surface perpendicular to the surface of the temporary support.

In other words with a different expression, $X_2$ represents the sum of the number of the portions in which the thickness of the second transparent resin layer is thicker than the average thickness $T_2$ of the second transparent resin layer and the number of the portions in which the thickness of the second transparent resin layer is thinner than the average thickness $T_2$ of the second transparent resin layer per 4 cm line segment in orthogonal projection on the surface of the first curable transparent resin layer in the transfer film.

Meanwhile, as the surface of the first curable transparent resin layer used in the case of computing $X_2$, the surface of the first curable transparent resin layer on a side opposite to the side on which the second transparent resin layer is formed (temporary support side) is used.

From the viewpoint of improving adhesiveness between the second transparent resin layer and the transparent electrode pattern, $X_2$ is preferably 4 or more, more preferably 5 or more, and particularly preferably 15 or more.

In the transfer film of the present invention, the thickness of the second transparent resin layer is preferably 500 nm or less and more preferably 130 nm or less. The thickness of the second transparent resin layer is preferably 20 nm or more. The thickness of the second transparent resin layer is particularly preferably 55 to 125 nm, more particularly preferably 60 to 120 nm, and still more particularly preferably 70 to 115 nm.

<Temporary Support>

The temporary support that is used in the transfer film of the present invention is not particularly limited, and examples thereof include glass, Si wafers, paper, non-woven fabrics, films, and the like. Among these, the temporary support is preferably a film and more preferably a resin film.

As the film that is used as the temporary support, it is possible to use flexible materials that do not significantly deform, contract, or extend under pressurization or under pressurization and heating. Examples of the above-described temporary support include polyethylene terephthalate films, triacetylcellulose films, polystyrene films, polycarbonate films, and the like, and, among these, biaxially-stretched polyethylene terephthalate films are particularly preferred.

The thickness of the temporary support is not particularly limited, but is generally in a range of 5 to 200 μm, particularly, preferably in a range of 10 to 150 μm from the viewpoint of easy handling, versatility, and the like, and more preferably in a range of 10 to 20 μm from the viewpoint of weight reduction.

In addition, the temporary support may be transparent and may contain dyed silicon, an alumina sol, a chromium salt, a zirconium salt, or the like.

In addition, the temporary support can be imparted with a conductive property using the method described in JP2005-221726A.

<First Curable Transparent Resin Layer>

The first curable transparent resin layer may be heat-curable, photocurable, or heat-curable and photocurable. Among these, the first curable transparent resin layer is preferably at least heat-curable since reliability can be imparted to films by means of heat-curing after transfer and more preferably heat-curable and photocurable since it is easy to form films by heat-curing the layer after transfer and reliability can be imparted to films by means of heat-curing after the formation of films.

(Surfactant Containing Fluorine Atom)

In the transfer film of the present invention, the first curable transparent resin layer preferably includes 0.01% to 0.5% by mass of a surfactant containing a fluorine atom with respect to the solid content of the first curable transparent resin layer. When the first curable transparent resin layer includes a surfactant containing a fluorine atom, an effect of "suppressing surface tension and flattening the surface of coated films remaining in a wet state after being formed by means of application", which is an effect of surfactants in the related art, can be obtained. Additionally, it has been newly found that, in a case in which the first curable transparent resin layer includes a surfactant containing a fluorine atom, when the first curable transparent resin layer is formed by means of application and dried, a thin layer of the fluorine-based surfactant is formed on the surface of the first curable transparent resin layer and serves as a protective layer, and thus it is possible to suppress interlaminar mixing between the first curable transparent resin layer and the second transparent resin layer when the second transparent resin layer is formed by means of application. This effect can be significantly obtained when the first curable transparent resin layer includes 0.01% by mass or more of the surfactant containing a fluorine atom with respect to the solid content of the first curable transparent resin layer and can be more significantly obtained when the first curable transparent resin layer includes 0.02% by mass or more of the surfactant containing a fluorine atom with respect to the solid content of the first curable transparent resin layer.

The content of the surfactant containing a fluorine atom in the first curable transparent resin layer is more preferably 0.01% to 0.5% by mass and particularly preferably 0.02% to 0.4% by mass with respect to the solid content of the first curable transparent resin layer. In order to favorable maintain adhesiveness between the second transparent resin layer and the transparent electrode pattern, the content of the surfactant containing a fluorine atom is preferably 0.5% by mass or less and more preferably 0.4% by mass or less with respect to the solid content of the first curable transparent resin layer.

Furthermore, in a case in which an acrylic resin is selected as the resin for the first curable transparent resin layer, and the fluorine-based surfactant is jointly used, this effect can be more significantly obtained.

Examples of the surfactant containing a fluorine atom which is preferably used in the first curable transparent resin layer include the surfactants described in Paragraph 0017 of JP4502784B and Paragraphs 0060 to 0071 of JP2009-237362A. In addition, as the surfactant containing a fluorine atom which is preferably used in the first curable transparent resin layer, commercially available fluorine-based surfactants can be used. Particularly, fluorine-based surfactants described below are preferred.

MEGAFACE F251, MEGAFACE F253, MEGAFACE F281, MEGAFACE. F444, MEGAFACE F477, MEGAFACE F551, MEGAFACE F552, MEGAFACE F553, MEGAFACE F554, MEGAFACE F555, MEGAFACE F556, MEGAFACE F557, MEGAFACE F558, MEGAFACE F559, MEGAFACE F560, MEGAFACE F561, MEGAFACE F562, MEGAFACE F563, MEGAFACE F565, MEGAFACE F568, MEGAFACE F569, MEGAFACE F570, MEGAFACE F571, MEGAFACE R40, MEGAFACE R41, MEGAFACE R43, MEGAFACE R94, MEGAFACE RS-55, MEGAFACE RS56, MEGAFACE RS72-K, MEGAFACE RS75, MEGAFACE RS76-E, MEGAFACE RS76-NS, MEGAFACE RS78, MEGAFACE RS90, and MEGAFACE F780F manufactured by DIC Corporation.

In addition, a compound represented by Structural Formula (3) (weight-average molecular weight: 15,000, solid content: 30%, methyl ethyl ketone: 70%) is also preferred and can be used.

Structure Formula (3)

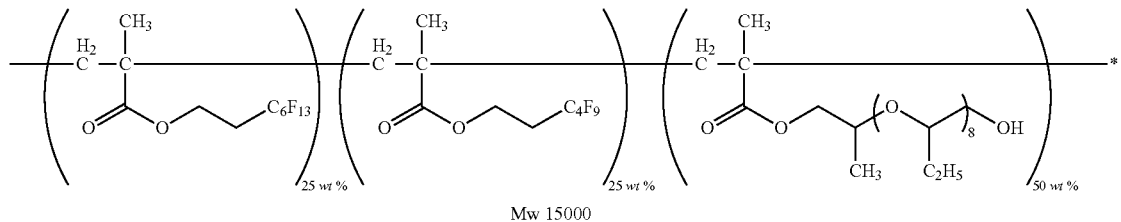

Mw 15000 layer is formed by means of application. This effect can be significantly obtained when the first curable transparent resin layer includes 0.01% by mass or more of the surfactant containing a fluorine atom with respect to the solid content of the first curable transparent resin layer and can be more significantly obtained when the first curable transparent resin layer includes 0.02% by mass or more of the surfactant containing a fluorine atom with respect to the solid content of the first curable transparent resin layer.

In the transfer film, the first curable transparent resin layer preferably includes a binder polymer, a photopolymerizable compound, and a photopolymerization initiator.

The first curable transparent resin layer in the transfer film may be a negative-type material or a positive-type material.

In a case in which the first curable transparent resin layer in the transfer film is a negative-type material, the first curable transparent resin layer preferably includes metal oxide particles, a binder polymer (preferably an alkali-soluble resin), a photopolymerizable compound, and a photopolymerization initiator. Furthermore, additives and the like can be used, but components in the layer are not limited thereto.

The method for controlling the refractive index of the first curable transparent resin layer is not particularly limited, and it is possible to singly use a transparent resin layer having a desired refractive index, use a transparent resin layer to which particles such as metal particles or metal oxide particles are added, or use a complex of a metal salt and a macromolecule.

Furthermore, in the first curable transparent resin layer, additives may be used. Examples of the additives include the thermal polymerization inhibitors described in Paragraph 0018 of JP4502784B and, furthermore, other additives described in Paragraphs 0058 to 0071 of JP2000-310706A.

The details of a preferred range of materials for the first curable transparent resin layer will be described in the section of a method for manufacturing the transfer film below.

In the transfer film of the present invention, since the first curable transparent resin layer is curable, it is possible to impart photolithographic properties to the transferred first curable transparent resin layer. In the transfer film of the present invention, the first curable transparent resin layer preferably includes a resin that is soluble in organic solvents. On the other hand, the second transparent resin layer is preferably formed of a water-based resin composition, and the formed second transparent resin layer may not include a resin soluble in water, and, for example, the formed second transparent resin layer preferably includes a resin soluble in basic aqueous solutions (for example, ammonia water). In the case of manufacturing the transfer film of the present invention, it is preferable to impart curing properties to first curable transparent resin layer in a state of being used as a dry-resist film by applying and drying an organic solvent-based resin composition which is used to form the first curable transparent resin layer and then, without exposing the first curable transparent resin layer, applying the water-based resin composition which is used to form the second transparent resin layer.

The details of the method for imparting curing properties to the first curable transparent resin layer will be described in the section of the method for manufacturing the transfer film below.

In the transfer film of the present invention, the thickness of the first curable transparent resin layer is preferably 1 µm or more, more preferably 1 to 15 µm, particularly preferably 2 to 12 µm, and more particularly preferably 3 to 10 µm from the viewpoint of exhibiting a sufficient surface protection capability when forming transparent protective layers in electrostatic capacitance-type input devices using the first curable transparent resin layer.

<Second Transparent Resin Layer>

The transfer film of the present invention has the second transparent resin layer disposed adjacent to the first curable transparent resin layer.

The second transparent resin layer may be a curable transparent resin layer or a non-curable transparent resin layer, but is preferably a curable transparent resin layer from the viewpoint of enhancing the photolithographic properties of the transfer film.

The second transparent resin layer may be heat-curable, photocurable, or heat-curable and photocurable. Among these, the second transparent resin layer is preferably at least heat-curable since reliability can be imparted to films by means of heat-curing after transfer and more preferably heat-curable and photocurable since it is easy to form films by heat-curing the layer after transfer and reliability can be imparted to films by means of heat-curing after the formation of films.

The second transparent resin layer preferably includes a binder, a photopolymerizable compound, and a photopolymerization initiator.

In a case in which the transfer film is a negative-type material, the second transparent resin layer preferably includes metal oxide particles, a binder resin (preferably an alkali-soluble resin), a photopolymerizable compound, and a photopolymerization initiator. Furthermore, additives and the like can be used, but components in the layer are not limited thereto.

The method for controlling the refractive index of the second transparent resin layer is not particularly limited, and it is possible to singly use a transparent resin layer having a desired refractive index, use a transparent resin layer to which particles such as metal particles or metal oxide particles are added, or use a complex of a metal salt and a macromolecule.

Furthermore, in the second transparent resin layer, additives may be used. Examples of the additives include the surfactants described in Paragraph 0017 of JP4502784B and Paragraphs 0060 to 0071 of JP2009-237362A, the thermal polymerization inhibitors described in Paragraph 0018 of JP4502784B, and, furthermore, other additives described in Paragraphs 0058 to 0071 of JP2000-310706A.

The details of a preferred range of materials for the second transparent resin layer will be described in the section of a method for manufacturing the transfer film below.

Hitherto, the transfer film has been described mainly using the case in which the transfer film of the present invention is a negative-type material, but the transfer film of the present invention may be a positive-type material. In a case in which the transfer film of the present invention is a positive-type material, in the first curable transparent resin layer and the second transparent resin layer, for examples, the materials described in JP2005-221726A and the like can be used, but the materials are not limited thereto.

<Protective Film>

The transfer film of the present invention is preferably further provided with a protective film (also referred to as "protective peeling layer") on the surface of the second transparent resin layer.

As the protective film, the protective films described in Paragraphs 0083 to 0087 and 0093 of JP2006-259138A can be appropriately used.

<Thermoplastic Resin Layer>

In the transfer film of the present invention, it is also possible to provide a thermoplastic resin layer between the temporary support and the first curable transparent resin layer.

The thermoplastic resin layer is preferably alkali-soluble. The thermoplastic resin layer plays a role of a cushion material so as to be capable of absorbing protrusions and recesses (also including protrusions, recesses, and the like caused by images and the like which have been previously formed) on the base surface and is preferably capable of transforming in accordance with protrusions and recesses on the base surface.

The thermoplastic resin layer preferably includes the organic macromolecular substance described in JP1993-72724A (JP-H05-72724A) as a component and particularly preferably includes at least one substance selected from organic macromolecular substances having a softening point of approximately 80° C. or lower which is obtained using the Vicat method [specifically, the polymer softening point measurement method based on ASTM D1235].

Specific examples thereof include organic macromolecules such as polyolefins such as polyethylene and polypropylene, ethylene copolymers of ethylene and vinyl acetate or a saponified substance thereof, copolymers of ethylene and an acrylic acid ester or a saponified substance thereof, vinyl chloride copolymers of polyvinyl chloride or vinyl chloride and vinyl acetate or a saponified substance thereof, polyvinylidene chloride, vinylidene chloride copolymers, polystyrene, styrene-based copolymers of styrene and a (meth)acrylic acid ester or a saponified substance thereof, polyvinyl toluene, vinyl toluene copolymers of vinyl toluene and a (meth)acrylic acid ester or a saponified substance thereof, poly(meth)acrylic acid esters, (meth)acrylic acid ester copolymers of butyl (meth)acrylate and vinyl acetate, polyamide resins such as vinyl acetate copolymer nylon, copolymerized nylon, N-alkoxymethylated nylon, and N-dimethylaminated nylon, and the like.

The thickness of the thermoplastic resin layer is preferably 3 to 30 μm. The thickness of the thermoplastic resin layer is more preferably 4 to 25 μm and particularly preferably 5 to 20 μm.

The thermoplastic resin layer can be formed by means of the application or the like of a prepared liquid including a thermoplastic organic macromolecule, and the prepared liquid that is used in the case of application or the like can be prepared using a solvent. The solvent is not particularly limited as long as the solvent is capable of dissolving macromolecular components constituting the thermoplastic resin layer, and examples thereof include methyl ethyl ketone, cyclohexanone, propylene glycol monomethyl ether acetate, n-propanol, 2-propanol, and the like.

<Interlayer>

In the transfer film of the present invention, it is also possible to provide an interlayer between the thermoplastic resin layer and the first curable transparent resin layer. The interlayer is described in JP1993-72724A (JP-H05-72724A) as "separation layer".

<Method for Manufacturing Transfer Film>

The method for manufacturing the transfer film of the present invention is not particularly limited, and the transfer film can be manufactured using a well-known method.

Particularly, the transfer film of the present invention is preferably manufactured using a manufacturing method including a step of forming the first curable transparent resin layer on the temporary support and a step of directly forming the second transparent resin layer on the first curable transparent resin layer.

When interlaminar mixing between the first curable transparent resin layer and the second transparent resin layer is suppressed, Expression 2A can be easily satisfied. In order to suppress interlaminar mixing, it is preferable to use a composition for forming the first curable transparent resin layer (for example, coating fluid) as the organic solvent-based resin composition and use a composition for forming the second transparent resin layer (for example, coating fluid) as the water-based resin composition. In this case, even when the second transparent resin layer is formed by means of application on the composition for forming the first curable transparent resin layer without curing the composition for forming the first curable transparent resin layer, the first curable transparent resin layer is not dissolved, and thus interlaminar mixing does not easily occur.

The step of forming the first curable transparent resin layer is preferably a step of applying the organic solvent-based resin composition including a resin soluble in organic solvents onto the temporary support, and the step of forming the second transparent resin layer is preferably a step of applying the water-based resin composition since the uniformity of the thickness of the second transparent resin layer becomes favorable and color unevenness is significantly reduced. The water-based resin composition preferably includes "a resin soluble in water or a resin that is not soluble in water but soluble in ammonia water" and more preferably includes a resin that is soluble in water but soluble in ammonia water. Specifically, in a case in which the water-based resin composition including an ammonium salt of a monomer having an acidic group or an ammonium salt of a resin having an acidic group is applied onto the first curable transparent resin layer obtained using the organic solvent-based resin composition, even when the second transparent resin layer is formed without curing the first curable transparent resin layer, interlaminar mixing does not easily occur, and the uniformity of the thickness of the second transparent resin layer becomes favorable, and consequently, it becomes easy for the second transparent resin layer to satisfy Expression 2A, Expression 3A, and Expression 4A.

At this time, when the first curable transparent resin layer includes a resin having photolithographic properties as the resin therefor, it is possible to impart photolithographic properties. Examples of the resin having photolithographic properties include specific acrylic resins and the like, acrylic resins that are alkali-soluble resins are preferred, and the acrylic resins described in "0028" to "0072" of JP2008-146018A are more preferred.

In addition, when the resin for the second transparent resin layer includes an ammonium salt of a monomer having an acidic group or an ammonium salt of a resin having an acidic group, it is possible to improve the moisture-heat resistance of films to be obtained. Specifically, when a coated film obtained using the water-based resin composition including an ammonium salt of a monomer having an acidic group or an ammonium salt of a resin having an acidic group is dried, ammonia having a lower boiling point than water is likely to be volatilized from the ammonium salt of a monomer having an acidic group or the ammonium salt of a resin having an acidic group in a drying step, and thus acidic groups are generated (regenerated), and the ammonium salt can be present in the second transparent resin layer as a monomer having an acidic group or a resin having an acidic group. Therefore, in a case in which the transfer film is stored at a high temperature and a high humidity and absorbs moisture, the monomer having an acidic group or the resin having an acidic group which constitutes the second transparent resin layer has already become insoluble in water, and thus it is possible to suppress a problem of moisture-heat resistance caused when the transfer film absorbs humidity.

Furthermore, in a case in which the composition for forming the first curable transparent resin layer (for example, coating fluid) includes a surfactant containing a fluorine atom (also referred to as fluorine-based surfactant), even when the second transparent resin layer is formed without curing the first curable transparent resin layer, interlaminar mixing does not occur, and the uniformity of the thickness of the second transparent resin layer becomes favorable. In addition, when the content of the surfactant in the composition for forming the first curable transparent resin layer is adjusted so that the content of the surfactant in the first curable transparent resin layer reaches 0.01 to 0.50% by mass with respect to the solid content, in the case of manufacturing a transparent laminate described below, adhesiveness between the second transparent resin layer and the transparent electrode pattern becomes favorable. The preferred range of the content of the surfactant with respect to the solid content of the composition for forming the first curable transparent resin layer is the same as the preferred range of the content of the surfactant containing a fluorine atom in the first curable transparent resin layer with respect to the solid content of the first curable transparent resin layer.

Particularly, an aspect in which the step of forming the first curable transparent resin layer is a step of applying an organic solvent-based resin composition including an acrylic resin and the fluorine-based surfactant onto the temporary support and the step of forming the second transparent resin layer is a step of applying a water-based resin composition including an ammonium salt of a monomer having an acidic group or an ammonium salt of a resin having an acidic group is preferred since interlaminar mixing between the first curable transparent resin layer and the second transparent resin layer can be suppressed, the uniformity of the thickness of the second transparent resin layer becomes favorable, and color unevenness is significantly reduced. Furthermore, this aspect is preferred since adhesiveness between the second transparent resin layer and the transparent electrode pattern becomes favorable and, in a case in which the transfer film is stored at a high temperature and a high humidity and absorbs moisture, it is possible to suppress problems caused by the absorption of moisture by the transparent resin layer (here, the second transparent resin layer) formed using the water-based resin composition.

(Step of Forming First Curable Transparent Resin Layer on Temporary Support)

Since the variation in the thickness of the second transparent resin layer further decreases as the surface of the first curable transparent resin layer becomes flatter, it is possible to make facilitate the second transparent resin layer to satisfy Expression 2A, Expression 2B, Expression 3A, Expression 3B, Expression 4A, and Expression 4B by adjusting the content of the solid content of the resin composition that is used to form the first curable transparent resin layer (the composition for forming the first curable transparent resin layer), the content of the solid content of the surfactant, and the drying temperature. However, the second transparent resin layer satisfying Expression 2A, Expression 2B, Expression 3A, Expression 3B, Expression 4A, and Expression 4B by adjusting manufacturing conditions other than the above-described conditions may be formed.

The step of forming the first curable transparent resin layer on the temporary support is preferably a step of applying the composition for forming the first curable transparent resin layer on the temporary support.

The concentration of the solid content of the composition for forming the first curable transparent resin layer is preferably 15% to 30% by mass, more preferably 20% to 24% by mass, and particularly preferably 21% to 23% by mass.

The step of forming the first curable transparent resin layer on the temporary support is preferably a step of applying an organic solvent-based resin composition on the above-described temporary support.

The organic solvent-based resin composition refers to a resin composition that is soluble in organic solvents.

As the organic solvents, ordinary organic solvents can be used. Examples of the organic solvents include methyl ethyl ketone, propylene glycol monomethyl ether, propylene glycol monomethyl ether acetate, cyclohexanone, methyl isobutyl ketone, ethyl lactate, methyl lactate, caprolactam, and the like.

The resin composition that is used to form the first curable transparent resin layer preferably includes a binder polymer, a photopolymerizable compound, and a photopolymerization initiator.

—Binder Polymer—

As the binder polymer included in the resin composition that is used to form the first curable transparent resin layer, an arbitrary polymer component can be used without any particular limitations, and, from the viewpoint of using the first curable transparent resin layer as transparent protective layers in electrostatic capacitance-type input devices, polymer components having high surface hardness and favorable heat resistance are preferred, alkali-soluble resins are more preferred, and, among alkali-soluble resins, well-known photosensitive siloxane resin materials, acrylic resin materials, and the like are preferably used. The binder polymer included in the resin composition that is used to form the first curable transparent resin layer preferably contains an acrylic resin. Both the binder polymer included in the resin composition that is used to form the first curable transparent resin layer and a resin or binder polymer having an acidic group included in the resin composition that is used to form the second transparent resin layer, which will be described below, more preferably contain an acrylic resin from the viewpoint of enhancing interlaminar adhesiveness before and after the transfer of the first curable transparent resin layer and the second transparent resin layer. A preferred range of the binder polymer for the first curable transparent resin layer will be specifically described.

The resin which is used in the organic solvent-based resin composition that is used to form the first curable transparent resin layer and is soluble in organic solvents (also referred to as "binder" or "polymer") is not particularly limited within the scope of the purport of the present invention, can be appropriately selected from well-known resins, and alkali-soluble resins are preferred. As the alkali-soluble resins, it is possible to use the polymer described in Paragraph 0025 of JP2011-95716A and Paragraphs 0033 to 0052 of JP2010-237589A.

In addition, the resin composition that is used to form the first curable transparent resin layer may also include polymer latex. Polymer latex mentioned herein is latex obtained by dispersing the fine particles of a polymer that is insoluble in water in water. The polymer latex is described in, for example, "Chemistry of high-molecular-weight latex (published by Kobunshi Kankokai (1973))" by Muroi Soichi.

Polymer particles that can be used are preferably polymer particles of a polymer such as an acrylic polymer, a vinyl acetate-based polymer, a rubber-based (for example, styrene-butadiene-based or chloroprene-based) polymer, an olefin-based polymer, a polyester-based polymer, a polyurethane-based polymer, a polystyrene-based polymer or a copolymer thereof.

It is preferable to strengthen the bonding forces between polymer chains constituting the polymer particles. Examples of means for strengthening the bonding forces between polymer chains include means for using interactions generated by hydrogen bonds and methods for generating covalent bonds. Means for imparting hydrogen bonding forces is preferably the introduction of monomers having a polar group into polymer chains by means of copolymerization or graft polymerization. Examples of the polar group include carboxyl groups (included in acrylic acid, methacrylic acid, itaconic acid, fumaric acid, maleic acid, crotonic acid, partially-esterified maleic acid, and the like), primary, secondary, and tertiary amino groups, ammonium salt groups, sulfonic acid groups (styrenesulfonic acid group and the like), and the like, and carboxyl groups and sulfonic acid groups are particularly preferred.

The preferred range of the copolymerization ratio of the monomers having a polar group is in a range of 5% to 35% by mass, more preferably 5% to 20% by mass, and still more preferably 15% to 20% by mass with respect to 100% by mass of the polymer. Meanwhile, examples of means for generating covalent bonds include methods in which an epoxy compound, blocked isocyanate, isocyanate, a vinylsulfone compound, an aldehyde compound, a methylol compound, a carboxylic acid anhydride, or the like is reacted with a hydroxyl group, a carboxyl group, a primary or secondary amino group, an acetoacetyl group, a sulfonic acid group, or the like.

Among polymers for which the above-described reaction is used, polyurethane derivatives obtained by a reaction between a polyol and a polyisocyanate compound are preferred, polymers for which a polyvalent amine is jointly used as a chain extender are more preferred, and, furthermore, polymers which are turned into an ionomer by introducing the polar group into polymer chains are particularly preferred.

The weight-average molecular weight of the polymer is preferably 10,000 or more and more preferably 20,000 to 100,000. Examples of polymers preferable for the present invention include ethylene ionomers and polyurethane ionomers which are copolymers between ethylene and methacrylic acid.

The polymer latex that can be used in the present invention may be polymer latex obtained by emulsification polymerization or polymer latex obtained by emulsification. Methods for preparing the polymer latex are described in, for example, "Emulsion Latex Handbook" (edited by the emulsion latex handbook editorial committee, published by Taiseisha Ltd. (1975)).

Examples of the polymer latex that can be used in the present invention include polymer latex obtained by means of the ammonia-neutralization and emulsification of an aqueous dispersion of a polyethylene ionomer (trade name: CHEMIPEARL S120, manufactured by Mitsui Chemicals, Inc., the solid content: 27%), (CHEMIPEARL S100 manufactured by Mitsui Chemicals, Inc. the solid content: 27%), (CHEMIPEARL S111 manufactured by Mitsui Chemicals, Inc. the solid content: 27%), (CHEMIPEARL S200 manufactured by Mitsui Chemicals, Inc. the solid content: 27%), (CHEMIPEARL S300 manufactured by Mitsui Chemicals, Inc. the solid content: 35%), (CHEMIPEARL S650 manufactured by Mitsui Chemicals, Inc. the solid content: 27%), and (CHEMIPEARL S75N manufactured by Mitsui Chemicals, Inc. the solid content: 24%), an aqueous dispersion of a polyether-based polyurethane (trade name: HYDRAN WLS-201, manufactured by DIC Corporation, the solid content: 35%, Tg −50° C., Tg is the abbreviation of the glass transition temperature), (trade name: HYDRAN WLS-202, manufactured by DIC Corporation, the solid content: 35%, Tg −50° C.), (trade name: HYDRAN WLS-221, manufactured by DIC Corporation, the solid content: 35%. Tg −30° C.), (trade name: HYDRAN WLS-210, manufactured by DIC Corporation, the solid content: 35%, Tg −15° C.), (trade name: HYDRAN WLS-213, manufactured by DIC Corporation, the solid content: 35%, Tg −15° C.), (trade name: HYDRAN WLI-602, manufactured by DIC Corporation, the solid content: 39.5%, Tg −50° C.), (trade name: HYDRAN WLI-611, manufactured by DIC Corporation, the solid content: 39.5%, Tg −15° C.), alkyl acrylate copolymer-ammonium (trade name: JURYMER AT-210, manufactured by Nippon Kayaku Co., Ltd.), alkyl acrylate copolymer-ammonium (trade name: JURYMER ET-410, manufactured by Nippon Kayaku Co., Ltd.), alkyl acrylate copolymer-ammonium (trade name: JURYMER AT-510, manufactured by Nippon Kayaku Co., Ltd.), or polyacrylic acid (trade name: JURYMER AC-10L, manufactured by Nippon Kayaku Co., Ltd.).

—Photopolymerizable Compound—

As the photopolymerizable compound that is used in the organic solvent-based resin composition, it is possible to use the photopolymerizable compound described in Paragraphs 0023 and 0024 of JP4098550B. Among these, pentaerythritol tetraacrylate, pentaerythritol triacrylate, and tetraacrylates of pentaerythritol ethylene oxide adduct can be preferably used. These photopolymerizable compounds may be used singly or a plurality of photopolymerizable compounds may be used in combination. In a case in which a mixture of pentaerythritol tetraacrylate and pentaerythritol triacrylate is used, the percentage of pentaerythritol triacrylate in the entire mixture of pentaerythritol tetraacrylate and pentaerythritol triacrylate is preferably 0 to 80% and more preferably 10 to 60% in terms of mass ratio.

Examples of the photopolymerizable compound that is used in the organic solvent-based resin composition include photopolymerizable compounds obtained by causing an addition reaction of an ethylene oxide or a propylene oxide with a polyfunctional alcohol such as polyethylene glycol di(meth)acrylate, polypropylene glycol di(meth)acrylate, trimethylolethane triacrylate, trimethylolpropane triacrylate, trimethylolpropane diacrylate, neopentyl glycol di(meth) acrylate, pentaerythritol tetra(meth)acrylate, pentaerythritol tri(meth)acrylate, dipentaerythritol hexa(meth)acrylate, dipentaerythritol penta(meth)acrylate, hexanediol di(meth) acrylate, trimethylolpropane tri(acryloyloxypropyl) ether, tri(acryloyloxyethyl) isocyanurate, tri(acryloyloxyethyl) cyanurate, glycerin tri(meth)acrylate, trimethylol propane or glycerin, or bisphenol and forming a (meth)acrylate thereof, polyfunctional acrylates or methacrylates of the urethane acrylates respectively described in JP1973-41708B (JP-S48-41708B), JP1975-6034B (JP-S50-6034B), and JP1976-37193A (JP-S51-37193A); the polyester acrylates respectively described in JP1973-64183A (JP-S48-64183A), JP1974-43191B (JP-S49-43191B), and JP1977-30490B (JP-S52-30490B); epoxy acrylates which are reaction products between epoxy resins and (meth)acrylic acids; and the like, and the like. Among these, trimethylolpropane tri(meth) acrylate, pentaerythritol tetra(meth)acrylate, dipentaerythritol hexa(meth)acrylate, mixtures of dipentaerythritol penta (meth)acrylate and pentaerythritol tetraacrylate (NK ester A-TMMT manufactured by Shin-Nakamura Chemical Co., Ltd.), and tetraacrylates of pentaerythritol ethylene oxide adducts (KAYARAD RP-1040 manufactured by Nippon Kayaku Co., Ltd.) can be preferably used. These photopolymerizable compounds may be used singly or two or more photopolymerizable compounds may be jointly used.

—Photopolymerization Initiator—

When the resin composition that is used to form the first curable transparent resin layer includes the photopolymerizable compound and the photopolymerization initiator, it is possible to facilitate the formation of patterns of the first curable transparent resin layer.

As the photopolymerization initiator that is used in the organic solvent-based resin composition, it is possible to use the photopolymerization initiators described in Paragraphs 0031 to 0042 of JP2011-95716A. For example, it is possible to preferably use 1,2-octane dione, 1-[4-(phenylthio)-, 2-(O-benzoyloxime)] (trade name: Irgacure OXE-01, manufactured by BASF), additionally, ethanone, 1-[9-ethyl-6-(2- methylbenzoyl)-9H-carbazole-3-yl]-, 1-(0-acetyloxime) (trade name: Irgacure OXE-02, manufactured by BASF), 2-(dimethylamino)-2-[(4-methylphenyl)methyl]-1-[4-(4-morpholinyl)phenyl]-1-butanone (trade name: Irgacure 379EG manufactured by BASF), 2-methyl-1-(4-methyl thiophenyl)-2-morpholino propan-1-one (trade name: Irgacure 907, manufactured by BASF), 2-hydroxy-1-{4-[4-(2-hydroxy-2-methyl-propionyl)-benzyl]phenyl}-2-methyl-propan-1-one (trade name: Irgacure 127, manufactured by BASF), 2-benzyl-2-dimethylamino-1-(4-morpholinophenyl)-butanone-1 (trade name: Irgacure 369, manufactured by BASF), 2-hydroxy-2-methyl-1-phenyl-erypropan-1-one (trade name: Irgacure 1173, manufactured by BASF), 1-hydroxy-cyclohexyl-phenyl-ketone (trade name: Irgacure 184, manufactured by BASF), 2,2-dimethoxy-1,2-diphenyl ethan-1-one (trade name: Irgacure 651, manufactured by BASF), oxime ester-based photopolymerization initiator (trade name: Lunar 6, manufactured by DKSH Japan K.K.), and the like.

In the resin composition that is used to form the first curable transparent resin layer, the content of the photopolymerization initiator is preferably 1% by mass or more and more preferably 2% by mass or more of the solid content of the resin composition that is used to form the first curable transparent resin layer. In the resin composition that is used to form the first curable transparent resin layer, the content of the photopolymerization initiator is preferably 10% by mass or less and more preferably 5% by mass or less of the solid content of the resin composition that is used to form the first curable transparent resin layer from the viewpoint of improving the patterning property of the transparent laminate of the present invention.

—Metal Oxide Particles—

The resin composition that is used to form the first curable transparent resin layer may or may not include particles (preferably metal oxide particles) for the purpose of adjusting the refractive index or the light transmittance. In order to control the refractive index of the first curable transparent resin layer in the above-described range, it is possible to add metal oxide particles to the resin composition in an arbitrary ratio depending on the kind of the polymer or the polymerizable compound being used (preferably the photopolymerizable compound). In the resin composition that is used to form the first curable transparent resin layer, the content of the metal oxide particles is preferably 0% to 35% by mass, more preferably 0% to 10% by mass, and particularly preferably 0% by mass of the solid content of the resin composition that is used to form the first curable transparent resin layer.

Since the metal oxide particles are highly transparent and light-transmissible, it is possible to obtain the composition for forming the first curable transparent resin layer having a high refractive index and excellent transparency.

The refractive index of the metal oxide particles is preferably higher than the refractive index of the first curable transparent resin layer or the second transparent resin layer which do not include the metal oxide particles. Specifically, in the transfer film of the present invention, the second transparent resin layer more preferably include particles having a refractive index of 1.50 or higher, still more preferably include particles having a refractive index of 1.55 or higher, particularly preferably include particles having a refractive index of 1.70 or higher, and most preferably include particles having a refractive index of 1.90 or higher with respect to light having a wavelength of 400 to 750 nm.

Here, the refractive index of 1.50 or higher with respect to light having a wavelength of 400 to 750 nm means that the average refractive index is 1.50 or higher with respect to light having a wavelength in the above-described range, and the refractive index does not need to be 1.50 or higher with respect to all light rays having wavelengths in the above-described range. In addition, the average refractive index is a value obtained by dividing the sum of the measurement values of the refractive index with respect to individual light rays having wavelengths in the above-described range by the number of measurement points.

Meanwhile, the metal of the above-described metal oxide particles may also be a semi-metal such as B, Si, Ge, As, Sb, or Te.

The metal oxide particles which are light-transmissible and have a high refractive index are preferably oxide particles including atoms such as Be, Mg, Ca, Sr, Ba, Sc, Y, La, Ce, Gd, Tb, Dy, Yb, Lu, Ti, Zr, Hf, Nb, Mo, W, Zn, B, Al, Si, Ge, Sn, Pb, Sb, Bi, and Te, more preferably titanium oxide, titanium complex oxide, zinc oxide, zirconium oxide, indium/tin oxide, or antimony/tin oxide, still more preferably titanium oxide, titanium complex oxide, or zirconium oxide, particularly preferably titanium oxide or zirconium oxide, and most preferably titanium oxide. Particularly, titanium oxide is preferably rutile-type titanium oxide having a high refractive index. The surfaces of these metal oxide particles can also be treated with an organic material in order to impart dispersion stability.

From the viewpoint of the transparency of the first curable transparent resin layer and the second transparent resin layer, the average primary particle diameter of the metal oxide particles is preferably 1 to 200 nm and particularly preferably 3 to 80 nm. Here, the average primary particle diameter of particles refers to the arithmetic average of the diameters of 200 arbitrary particles measured using an electronic microscope. In addition, in a case in which the shapes of particles are not spherical, the longest sides are considered as the diameters.

In addition, one kind of the metal oxide particles may be used or two or more kinds of the metal oxide particles can be jointly used.

In the transfer film of the present invention, the second transparent resin layer preferably has at least one of $ZrO_2$ particles, $Nb_2O_5$ particles, or $TiO_2$ particles from the viewpoint of controlling the refractive index in the range of the refractive index of the second transparent resin layer, and $ZrO_2$ particles and $Nb_2O_5$ particles are more preferred. The first curable transparent resin layer preferably does not include the metal oxide particles, but the first curable transparent resin layer including the metal oxide particles is still in the scope of the present invention as long as Expression (1) is satisfied. In a case in which the first curable transparent resin layer includes the metal oxide particles, examples of the kind of the metal oxide particles include $ZrO_2$ particles, $Nb_2O_5$ particles, or $TiO_2$ particles.

The second transparent resin layer may or may not include the metal oxide particles, but preferably includes the metal oxide particles from the viewpoint of controlling the refractive index of the second transparent resin layer in the above-described range. To the second transparent resin layer, it is possible to add the metal oxide particles in an arbitrary ratio depending on the kind of the polymer or the polymerizable compound being used (preferably the photopolymerizable compound).

(Step of Forming Second Transparent Resin Layer)

Since the variation in the thickness of the second transparent resin layer further decreases as the surface of the second transparent resin layer becomes flatter, it is possible to make facilitate the second transparent resin layer to satisfy Expression 2A, Expression 2B, Expression 3A, Expression 3B, Expression 4A, and Expression 4B by adjusting the solid content of the resin composition that is used to form the second transparent resin layer (hereinafter, also referred to as the composition for forming the second transparent resin layer), the compositional ratio of the solvent, and the drying temperature. However, the second transparent resin layer satisfying Expression 2A, Expression 2B, Expression 3A, Expression 3B, Expression 4A, and Expression 4B by adjusting manufacturing conditions other than the above-described conditions may be formed.

The step of forming the second transparent resin layer on the first curable transparent resin layer is preferably a step of applying the composition for forming the second transparent resin layer on the first curable transparent resin layer.

The concentration of the solid content of the composition for forming the second transparent resin layer is preferably 1.0% to 5.0% by mass, more preferably 1.2% to 3.0% by mass, and particularly preferably 1.5% to 2.0% by mass.

The step of forming the second transparent resin layer on the first curable transparent resin layer is more preferably a step of applying the water-based resin composition for forming the second transparent resin layer. The step of directly forming the second transparent resin layer on the first curable transparent resin layer is particularly preferably a step of applying a water-based resin composition for forming the second transparent resin layer including an ammonium salt of a monomer having an acidic group or an ammonium salt of a resin having an acidic group.

The water-based resin composition refers to a resin composition that is soluble in water-based solvents.

The amount of water added to the composition for forming the second transparent resin layer is preferably 15 to 85 parts by mass, more preferably 20 to 80 parts by mass, and particularly preferably 25 to 75 parts by mass in a case in which the total amount of the solvent is set to 100 parts by mass from the viewpoint of facilitating the second transparent resin layer to satisfy Expression 2A, Expression 2B, Expression 3A, Expression 3B, Expression 4A, and Expression 4B.

The water-based solvent is preferably water or a solvent mixture of a lower alcohol having 1 to 3 carbon atoms and water. The solvent in the water-based resin composition that is used to form the second transparent resin layer preferably includes water and an alcohol having 1 to 3 carbon atoms and more preferably includes water or a solvent mixture in which the content ratio of water to the alcohol having 1 to 3 carbon atoms is 15/85 to 85/15 in terms of mass ratio. The content ratio of water to the alcohol having 1 to 3 carbon atoms is more preferably in a range of 20/80 to 80/20 and particularly preferably 25/75 to 75/25 in terms of mass ratio.

Water, a solvent mixture of water and methanol, and a solvent mixture of water and ethanol are preferred, and a solvent mixture of water and methanol is more preferred from the viewpoint of drying and coatability.

The power of hydrogen (pH) of the water-based resin composition at 25° C. is preferably 7.0 or more and 12.0 or less, more preferably 7.0 to 10.0, and particularly preferably 7.0 to 8.5. The pH of the water-based resin composition can be adjusted to the above-described preferred range by, for example, adding the monomer having an acidic group or the resin having an acidic group to the acidic groups using an excess amount of ammonia.

In addition, the resin composition that is used to form the second transparent resin layer is preferably at least one of a heat-curable resin composition or a photocurable resin composition. In a case in which the first curable transparent resin layer and the second transparent resin layer are the above-described curable transparent resin layers, even when the first curable transparent resin layer is laminated, and then the second transparent resin layer is laminated without curing the first curable transparent resin layer, the layers are favorably differentiated from each other, and transparent electrode pattern visibility can be improved. In this case, furthermore, in a transparent laminate described below, after an overcoat layer and a refractive index-adjusting layer (that is, the first curable transparent resin layer and the second transparent resin layer) are transferred onto the transparent electrode pattern from the obtained transfer film at the same time, it is possible to develop at least the first curable transparent resin layer which becomes a layer closer to the outside than the second transparent resin layer after transfer in a desired pattern by means of photolithography. An aspect in which the second transparent resin layer is curable is more preferred, and, in this aspect, the first curable transparent resin layer and the second transparent resin layer can be developed in a desired pattern at the same time by means of photolithography after being transferred onto the transparent electrode pattern at the same time.

The resin composition that is used to form the second transparent resin layer preferably has an ammonium salt of a monomer having an acidic group or an ammonium salt of a resin having an acidic group and includes a binder polymer, a photo- or thermopolymerizable compound, and a photo- or thermopolymerization initiator. Only the ammonium salt of a resin having an acidic group may be used as the binder polymer, or, in addition to the ammonium salt of a resin having an acidic group, other binder polymers may be further jointly used. The ammonium salt of a monomer having an acidic group may be a photo- or thermopolymerizable compound, and, in addition to the ammonium salt of a monomer having an acidic group, a photo- or thermopolymerizable compound may be further jointly used.

—Ammonium Salt of Monomer Having Acidic Group or Ammonium Salt of Resin Having Acidic Group—

The water-based resin composition preferably includes an ammonium salt of a monomer having an acidic group or an ammonium salt of a resin having an acidic group.

The ammonium salt of a monomer having an acidic group or the ammonium salt of a resin having an acidic group is not particularly limited.

The ammonium salt of a monomer having an acidic group or the ammonium salt of a resin having an acidic group in the second transparent resin layer is preferably an ammonium salt of an acrylic monomer or an acrylic resin.

The method for manufacturing the transfer film preferably includes a step of preparing a water-based resin composition including a monomer or a resin obtained by dissolving the monomer having an acidic group or the resin having an acidic group in an ammonia aqueous solution and turning at least some of the acidic group into an ammonium salt.

The concentration of the ammonia aqueous solution that can be used in the present invention is not particularly limited, but an ammonia aqueous solution in which the concentration of ammonia is 0.1% to 25% by mass is preferred, an ammonia aqueous solution in which the concentration of ammonia is 0.5% to 10% by mass is more preferred, and an ammonia aqueous solution in which the concentration of ammonia is 1% to 5% by mass is particularly preferred.

—Resin Having Acidic Group—

The monomer having an acidic group or the resin having an acidic group is preferably a resin having an acidic group and more preferably a resin having a monovalent acidic group (a carboxyl group or the like).

The resin which is used in the water-based resin composition that is used to form the second transparent resin layer and is soluble in water-based solvents (preferably water or solvent mixtures of a lower alcohol having 1 to 3 carbon atoms and water) is not particularly limited within the scope of the gist of the present invention and can be appropriately selected from well-known resins.

The resin having an acidic group that is used to form the water-based resin composition is preferably an alkali-soluble resin. The alkali-soluble resin can be appropriately selected from alkali-soluble resins which are linear organic macromolecular polymers and have at least one group that accelerates alkali solubility (that is, an acidic group: for example, a carboxyl group, a phosphoric acid group, a sulfonic acid group, or the like) in a molecule (preferably a molecule having an acrylic copolymer or a styrene-based copolymer as the main chain). Among these, alkali-soluble resins which are soluble in organic solvents and can be developed using a weak alkaline aqueous solution are more preferred. The acidic group is preferably a carboxyl group.

To the manufacturing of the alkali-soluble resin, it is possible to apply, for example, a method in which a well-known radical polymerization method is used. The polymerization conditions such as temperature, pressure, the kind and amount of radical initiators, and the kind of solvents in the case of manufacturing the alkali-soluble resin using a radical polymerization method can be easily set by persons skilled in the art, and the conditions can also be experimentally determined.

The linear organic macromolecular polymer is preferably a polymer having a carboxylic acid in the side chain. Examples thereof include poly(meth)acrylates, methacrylic acid copolymers, acrylic acid copolymers, itaconic acid copolymers, crotonic acid copolymers, maleic acid copolymers such as styrene/maleic acid, partially-esterified maleic acid copolymers, and the like, which are respectively described in JP1984-44615A (JP-S59-44615A), JP1979-34327B (JP-S54-34327B), JP1983-12577B (JP-S58-12577B), JP1979-25957B (JP-S54-25957B), JP1984-53836A (JP-S59-53836A), JP1984-71048A (JP-S59-71048A), JP1971-2121A (JP-S46-2121A), and JP1981-40824B (JP-S56-40824B) and, furthermore, acidic cellulose derivatives having a carboxylic acid in the side chain such as carboxyalkyl cellulose and carboxyalkyl starch, polymers obtained by adding an acid anhydride to a polymer having a hydroxyl group, and the like, and, furthermore, macromolecular polymers having a reactive functional group such as a (meth)acryloyl group in the side chain are also preferred.

Among these, particularly, benzyl (meth)acrylate/(meth)acrylic acid copolymers or multicomponent copolymers made of benzyl (meth)acrylate/(meth)acrylic acid/other monomers are preferred.

Additionally, polymers obtained by copolymerizing 2-hydroxyethylmethacrylate are also useful. The amount of the polymer being mixed and used can be arbitrary.

Additionally, examples thereof include 2-hydroxypropyl (meth)acrylate/polystyrene macromonomer/benzyl methacrylate/methacrylic acid copolymers, 2-hydroxy-3-phenoxypropyl acrylate/polymethyl methacrylate macromonomer/benzyl methacrylate/methacrylic acid copolymers, 2-hydroxyethyl methacrylate/polystyrene macromonomer/methyl methacrylate/methacrylic acid copolymers, 2-hydroxyethyl methacrylate/polystyrene macromonomer/benzyl methacrylate/methacrylic acid copolymers, and the like which are described in JP1995-140654A (JP-H07-140654A).

Regarding the specific constitutional unit of the alkali-soluble resin, particularly, copolymers of (meth)acrylic acid and an additional monomer capable of being copolymerized with (meth)acrylic acid are preferred.

Examples of the additional monomer capable of being copolymerized with (meth)acrylic acid include alkyl (meth)acrylates, aryl (meth)acrylates, vinyl compounds, and the like. Here, hydrogen atoms in alkyl groups and aryl groups may be substituted with substituents.

Specific examples of alkyl (meth)acrylate and aryl (meth)acrylate include methyl (meth)acrylates, ethyl (meth)acrylates, propyl (meth)acrylates, butyl (meth)acrylates, isobutyl (meth)acrylates, pentyl (meth)acrylates, hexyl (meth)acrylates, octyl (meth)acrylates, phenyl (meth)acrylates, benzyl acrylates, tolyl acrylates, naphthyl acrylates, cyclohexyl acrylates, and the like.

In addition, examples of the vinyl compounds include styrene, α-methyl styrene, vinyl toluene, glycidyl methacrylate, acrylonitrile, vinyl acetate, N-vinyl pyrrolidone, tetrahydrofurfuryl methacrylate, polystyrene macromonomers, polymethyl methacrylate macromonomers, $CH_2=CR^1R^2$, $CH_2=C(R^1)(COOR^3)$ [here, $R^1$ represents a hydrogen atom or an alkyl group having 1 to 5 carbon atoms, $R^2$ represents an aromatic hydrocarbon ring having 6 to 10 carbon atoms, and $R^3$ represents an alkyl group having 1 to 8 carbon atoms or an aralkyl group having 6 to 12 carbon atoms.], and the like.

The additional monomer capable of being copolymerized with (meth)acrylic acid can be used singly or a combination of two or more monomers capable of being copolymerized with (meth)acrylic acid can be used. A preferred additional monomer capable of being copolymerized with (meth)acrylic acid is at least one monomer selected from $CH_2=CR^1R^2$, $CH^2=C(R^1)(COOR^3)$, phenyl (meth)acrylates, benzyl (meth)acrylates, and styrene and particularly preferably $CH_2=CR^1R^2$ and/or $CH^2=C(R^1)(COOR^3)$.

Additionally, examples thereof include resins having an ethylenic unsaturated double bond introduced into a linear macromolecule which are obtained by reacting a (meth)acrylic compound having a reactive functional group, cinnamic acid, or the like with the linear macromolecule having a substituent capable of reacting with this reactive functional group. Examples of the reactive functional group include a hydroxyl group, a carboxyl group, an amino group, and the like, and examples of the substituent capable of being reacted with this reactive functional group include an isocyanate group, an aldehyde group, an epoxy group, and the like.

Among these, acrylic resins having an acidic group are preferred as the resin having an acidic group. Meanwhile, in the present specification, acrylic resins refer to both methacrylic resins and acrylic resins, and, similarly, (meth)acrylic resins refers to methacrylic resins and acrylic resins.

——Monomer Having Acidic Group——

As the monomer having an acidic group, it is possible to preferably use an acrylic monomer such as (meth)acrylic acid or a derivative thereof or the following monomer.

Examples thereof include tri- or tetrafunctional radical polymerizable monomers (monomers obtained by introducing a carboxylic acid group into a pentaerythritol tri- and tetraacrylate skeleton (acid value=80 to 120 mg-KOH/g)), penta- or hexafunctional radical polymerizable monomers (monomers obtained by introducing a carboxylic acid group into a dipentaerythritol penta- and hexaacrylate skeleton (acid value=25 to 70 mg-KOH/g)), and the like. Specific titles are not described, but bifunctional alkali-soluble radical polymerizable monomers may also be used as necessary.

Additionally, it is possible to preferably use the monomers having an acidic group described in 0025 to 0030 of JP2004-239942A, the content of which is incorporated into the present invention.

Among these, acrylic monomers such as (meth)acrylic acids or derivatives thereof can be more preferably used. Meanwhile, in the present specification, acrylic monomers refer to both methacrylic monomers and acrylic monomers.

——Other Binder Polymers——

Other binder polymers having no acidic group which can be used in the water-based resin composition are not particularly limited, and it is possible to use binder polymers that can be used in resin compositions that are used to form the first curable transparent resin layer.

—Polymerizable Compound—

The resin composition that is used to form the second transparent resin layer preferably includes a polymerizable compound such as the photopolymerizable compound or thermopolymerizable compound since the resin composition increases the strength or the like of films by being cured. The resin composition more preferably includes a photopolymerizable compound other than the monomer having an acidic group.

As the polymerizable compound that is used in the water-based resin composition, it is possible to use the polymerizable compounds described in Paragraphs 0023 and 0024 of JP4098550B. Among these, pentaerythritol tetraacrylate, pentaerythritol triacrylate, and tetraacryaltes of pentaerythritol ethylene oxide adducts can be preferably used. These polymerizable compounds may be used singly or a plurality of polymerizable compounds may be used in combination. In a case in which a mixture of pentaerythritol tetraacrylate and pentaerythritol triacrylate is used, the percentage of pentaerythritol triacrylate is preferably 0% to 80% and more preferably 10% to 60% with respect to all of the mixture of pentaerythritol tetraacrylate and pentaerythritol triacrylate in terms of the mass ratio.

Specific examples of the photopolymerizable compound that is used in the water-based resin composition include water-soluble polymerizable compounds represented by Structural Formula 1, pentaerythritol tetraacrylate mixtures (NK ester A-TMMT manufactured By Shin-Nakamura Chemical Co., Ltd., containing approximately 10% of triacrylate as an impurity), mixtures of pentaerythritol tetraacrylate and triacrylate (NK ester A-TMM3LM-N manufactured by Shin-Nakamura Chemical Co., Ltd., 37% triacrylate), mixtures of pentaerythritol tetraacrylate and triacrylate (NK ester A-TMM-3L manufactured by Shin-Nakamura Chemical Co., Ltd., 55% triacrylate), mixtures of pentaerythritol tetraacrylate and triacrylate (NK ester A-TMM3 manufactured by Shin-Nakamura Chemical Co., Ltd., 57% triacrylate), tetraacrylates of a pentaerythritol ethylene oxide adduct (KAYARAD RP-1040 manufactured by Nippon Kayaku Co., Ltd.), ARONIX TO-2349 (manufactured by Toagosei Co., Ltd.), and the like.

As the photopolymerizable compound that is used in the water-based resin composition, among these, it is possible to preferably use the water-soluble polymerizable compound represented by Structural Formula 1, a pentaerythritol tetraacrylate mixture (NK ester A-TMMT manufactured by Shin-Nakamura Chemical Co., Ltd.), a mixture of pentaerythritol tetraacrylate and triacrylate (NK ester A-TMM3LM-N manufactured by Shin-Nakamura Chemical Co., Ltd., 37% triacrylate), or a mixture of pentaerythritol tetraacrylate and triacrylate (NK ester A-TMM-3L manufactured by Shin-Nakamura Chemical Co., Ltd., 55% triacrylate) from the viewpoint of improving the reticulation of the transfer film of the present invention.

Structural Formula 1

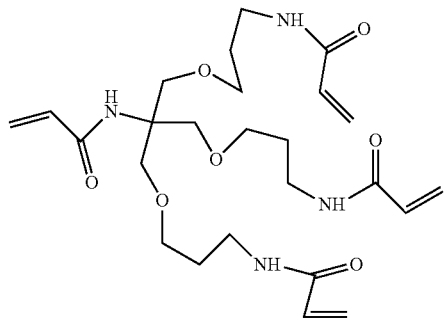

Photopolymerizable compounds that can be used in other water-based resin compositions are also preferably soluble in solvent mixtures of a lower alcohol having 1 to 3 carbon atoms such as methanol and water in a case in which an alcohol dispersion liquid of the metal oxide particles described below is jointly used in the water-based resin composition. As the polymerizable compound that is soluble in water or solvent mixtures of a lower alcohol having 1 to 3 carbon atoms and water, it is possible to use a monomer having a hydroxyl group or a monomer having an ethylene oxide or a polypropylene oxide and a phosphoric acid group in the molecule. The polymerizable compound that is also soluble in solvent mixtures of a lower alcohol having 1 to 3 carbon atoms and water is preferably KAYARAD RP-1040 (manufactured by Nippon Kayaku Co., Ltd.), ARONIX TO-2349 (manufactured by Toagosei Co., Ltd.), a polymerizable monomer A-9300 (manufactured by Shin-Nakamura Chemical Co., Ltd.), A-GLY-20E (manufactured by Shin-Nakamura Chemical Co., Ltd.), or the like. Meanwhile, the polymerizable compound also being soluble in solvent mixtures of a lower alcohol having 1 to 3 carbon atoms and water means that 0.1% by mass or more of the polymerizable compound is dissolved in solvent mixtures of an alcohol and water.

In addition, the content of the polymerizable compound is preferably 0% to 20% by mass, more preferably 0% to 10% by mass, and still more preferably 0% to 5% by mass of the total mass of the solid content of the resin composition that is used to form the second transparent resin layer.

—Photopolymerization Initiator—

As the photopolymerization initiator which is used in the composition for the second transparent resin layer and is soluble in water or solvent mixtures of a lower alcohol having 1 to 3 carbon atoms and water, it is possible to use Irgacure 2959 or an initiator of Structural Formula 2.

In addition, the content of the photopolymerization initiator is preferably 0% to 5% by mass, more preferably 0% to 1% by mass, and still more preferably 0% to 0.5% by mass of the total mass of the solid content of the resin composition that is used to form the second transparent resin layer.

Structural Formula 2

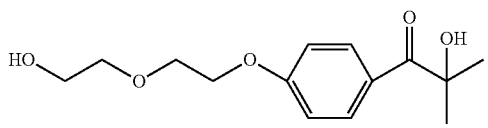

—Metal Oxide Particles—

The resin composition that is used to form the second transparent resin layer may or may not include particles (preferably metal oxide particles) for the purpose of adjusting the refractive index or the light transmittance, but preferably includes metal oxide particles from the viewpoint of controlling the refractive index of the second transparent resin layer in the above-described range. To the resin composition that is used to form the second transparent resin layer, it is possible to add metal oxide particles in an arbitrary ratio depending on the kind of the polymer or the polymerizable compound being used. In the resin composition that is used to form the second transparent resin layer, the content of the metal oxide particles is preferably 40% to 95% by mass, more preferably 55% to 95% by mass, particularly preferably 62% to 90% by mass, more particularly preferably 62% to 75% by mass from the viewpoint of further improving the adhesiveness of the transparent laminate of the present invention, and still more particularly preferably 62% to 70% by mass with respect to the total solid content of the second transparent resin layer.

—Metal Oxidation Suppressor—

The resin composition that is used to form the second transparent resin layer preferably includes a metal oxidation suppressor. When the second transparent resin layer includes a metal oxidation suppressor, it becomes possible to treat the surface of a metal wire portion in direct contact with the second transparent resin layer in a case in which the second transparent resin layer is laminated on a transparent substrate (the transparent substrate preferably includes a transparent electrode pattern, the metal wire portion, or the like). The protection property of the metal wire portion which is imparted by treating the surface is considered to remain effective even after the second transparent resin layer (and the first curable transparent resin layer) is removed.

The metal oxidation suppressor that is used in the present invention is preferably a compound having an aromatic ring including a nitrogen atom in the molecule.

In addition, in the metal oxidation suppressor that is used in the present invention, the aromatic ring including a nitrogen atom is preferably at least one ring selected from the group consisting of an imidazole ring, a triazole ring, a tetrazole ring, a thiadiazole ring, and fused rings of the above-described ring and an additional aromatic ring, and the aromatic ring including a nitrogen atom is more preferably an imidazole ring or a fused ring of an imidazole ring and an additional aromatic ring.

The additional aromatic ring may be a homocyclic ring or a heterocyclic ring, but is preferably a homocyclic ring, more preferably a benzene ring or a naphthalene ring, and still more preferably a benzene ring.

Examples of preferred metal oxidation suppressors include imidazole, benzimidazole, tetrazole, mercaptothiadiazole, and benzotriazole, and imidazole, benzimidazole, and benzotriazole are more preferred.

In addition, the content of the metal oxidation suppressor is preferably 0.1% to 20% by mass, more preferably 0.5% to 10% by mass, and still more preferably 1% to 5% by mass of the total mass of the second transparent resin layer.

(Drying)

The preferred range of the detailed conditions of a heating and drying step will be described below.

As the heating and drying method, it is also possible to use a method in which the composition is passed through a furnace comprising a heating device or blasting. The heating and drying conditions may be appropriately set depending on organic solvents and the like being used, and the composition may be heated to a temperature of 40° C. to 150° C.

Among these conditions, the first curable transparent resin layer is preferably dried in two stages in an order of Step 1 and Step 2 from the viewpoint of facilitating the second transparent resin layer to satisfy Expression 2A, Expression 2B, Expression 3A, Expression 3B, Expression 4A, and Expression 4B. In the case of forming the first curable transparent resin layer, in Step 1, the drying temperature is particularly preferably a temperature of 70° C. to 120° C. and more particularly preferably a temperature of 80° C. to 100° C. In the case of forming the first curable transparent resin layer, in Step 2, the drying temperature is particularly preferably a temperature of 100° C. to 130° C. and more particularly preferably a temperature of 110° C. to 120° C.

The second transparent resin layer is preferably dried in two stages in an order of Step 1 and Step 2 from the viewpoint of facilitating the second transparent resin layer to satisfy Expression 2A, Expression 2B, Expression 3A, Expression 3B, Expression 4A, and Expression 4B. In the case of forming the second transparent resin layer, in Step 1, the drying temperature is particularly preferably a temperature of 80° C. to 110° C. and more particularly preferably a temperature of 90° C. to 100° C. In the case of forming the second transparent resin layer, in Step 2, the drying temperature is particularly preferably a temperature of 100° C. to 130° C. and more particularly preferably a temperature of 110° C. to 120° C.

In the composition that has been subjected to heating and drying, the moisture content in the wet standard is preferably 5% by mass or less, more preferably 3% by mass or less, and still more preferably 1% by mass or less.

Furthermore, the method for manufacturing the transfer film preferably includes a step of generating acidic groups by volatilizing ammonia from the ammonium salt of a monomer having an acidic group or the ammonium salt of a resin having an acidic group. The step of generating acidic groups by volatilizing ammonia from the ammonium salt of a monomer having an acidic group or the ammonium salt of a resin having an acidic group is preferably a step of heating the applied water-based resin composition.

<Other Steps>

The method for manufacturing the transfer film may include a step of further forming a thermoplastic resin layer before the formation of the first curable transparent resin layer on the temporary support.

After the step of further forming the thermoplastic resin layer, a step of forming an interlayer between the thermoplastic resin layer and the first curable transparent resin layer may be provided. Specifically, in the case of forming the transfer film having the interlayer, it is preferable to provide a thermoplastic resin layer by applying and drying a solution obtained by dissolving additives together with a thermoplastic organic macromolecule (coating fluid for the thermoplastic resin layer) on the temporary support and then laminating the interlayer by applying and drying a preparation liquid obtained by adding resins or additives to a solvent that does not dissolve the thermoplastic resin layer (coating fluid for the interlayer) on the thermoplastic resin layer. Furthermore, a photosensitive resin layer is preferably laminated on the interlayer by applying and drying a coating fluid for the photosensitive resin layer which is prepared using a solvent that does not dissolve the interlayer.

As the method for manufacturing other transparent resin layers, it is possible to employ the method for producing a photosensitive transfer material described in Paragraphs 0094 to 0098 of JP2006-259138A.

<Applications of Transfer Film>

The transfer film of the present invention is preferably a dry-resist film. In the present specification, the dry-resist refers to a product obtained by providing a film shape to the transfer film.

The transfer film of the present invention is preferably used to form transparent insulating layers or transparent protective layers in electrostatic capacitance-type input devices. More specifically, the transfer film of the present invention can be preferably used as a transfer material for forming a lamination pattern of a refractive index-adjusting layer and an overcoat layer (transparent protective layer) on the transparent electrode pattern by means of photolithography.

[Transparent Laminate]

A first aspect of the transparent laminate of the present invention is a transparent laminate which includes a transparent electrode pattern, a second transparent resin layer disposed in direct contact with the transparent electrode pattern, and a first curable transparent resin layer disposed in direct contact with the second transparent resin layer and satisfies Expression 1 and Expression 2A.

$$n_1 < n_2 \quad \text{Expression 1:}$$

$$100 \times \sigma_2 / T_2 \leq 5.0 \quad \text{Expression 2A:}$$

$n_1$ represents the refractive index of the first curable transparent resin layer, $n_2$ represents the refractive index of the second transparent resin layer, $\sigma_2$ represents the standard deviation of the thickness of the second transparent resin layer, and $T_2$ represents the average thickness of the second transparent resin layer.

A second aspect of the transparent laminate of the present invention is a transparent laminate in which the second transparent resin layer and the first curable transparent resin layer in the transfer film of the present invention are laminated together in this order on the transparent electrode pattern.

In the first aspect of the transparent laminate of the present invention, the second transparent resin layer and the first curable transparent resin layer in the transfer film of the present invention are preferably laminated together in this order on the transparent electrode pattern.

<Constitution of Transparent Laminate>

The transparent laminate of the present invention preferably further has a transparent film having a refractive index of 1.6 to 1.78 and a thickness of 55 to 110 nm on a side of the transparent electrode pattern opposite to the side on which the second transparent resin layer is formed from the viewpoint of further improving the visibility of the transparent electrode pattern. Meanwhile, in the present specification, in the case of being simply mentioned, "transparent films" refer to the "transparent film having a refractive index of 1.6 to 1.78 and a thickness of 55 to 110 nm" without any particular limitations.

The transparent laminate of the present invention preferably further has a transparent substrate on a side of the transparent film having a refractive index of 1.6 to 1.78 and a thickness of 55 to 110 nm opposite to the side on which the transparent electrode pattern is formed.

Figure 11:
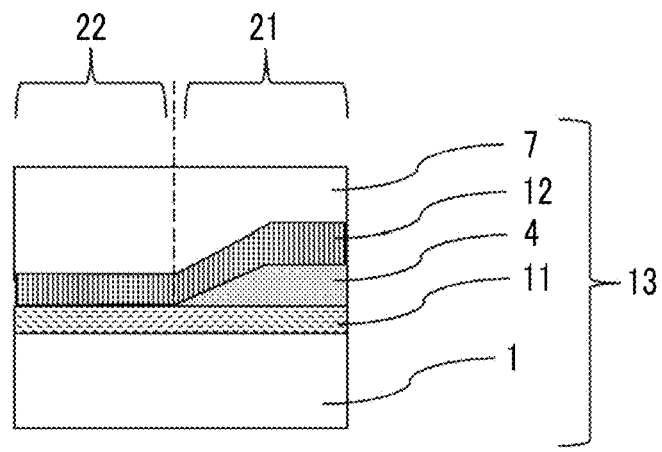
FIG. 11 is a schematic cross-sectional view illustrating an example of a constitution of a transparent laminate of the present invention.

FIG. 11 illustrates an example of the constitution of the transparent laminate of the present invention.

In FIG. 11 illustrating transparent laminate 13, a transparent substrate 1 and a transparent film 11 having a refractive index of 1.6 to 1.78 and a thickness of 55 to 110 nm are provided, and, furthermore, a region 21 in which a transparent electrode pattern 4, the second transparent resin layer 12, and the first curable transparent resin layer 7 are laminated in this order is provided in the plane. In addition, FIG. 11 illustrates that the transparent laminate includes, in addition to the above-described region, a region in which the transparent substrate 1 and the transparent film 11 are laminated in this order (in the constitution of FIG. 11, a region 22 in which the second transparent resin layer 12 and the first curable transparent resin layer 7 are laminated in this order (that is, a non-patterned region 22 in which the transparent electrode pattern is not formed)).

In other words, the transparent laminate includes the region 21 in which the transparent substrate 1, the transparent film 11, the transparent electrode pattern 4, the second transparent resin layer 12, and the first curable transparent resin layer 7 are laminated in this order in the in-plane direction.

The in-plane direction refers to a direction that is substantially parallel to a surface parallel to the transparent substrate in the transparent laminate. Therefore, the fact that the region in which the transparent electrode pattern 4, the second transparent resin layer 12, and the first curable transparent resin layer 7 are laminated in this order is included in the in-plane direction means that the orthogonal projection of the region in which the transparent electrode pattern 4, the second transparent resin layer 12, and the first curable transparent resin layer 7 are laminated in this order on the surface parallel to the transparent substrate in the transparent laminate is present in a plane parallel to the transparent substrate in the transparent laminate.

Figure 3:
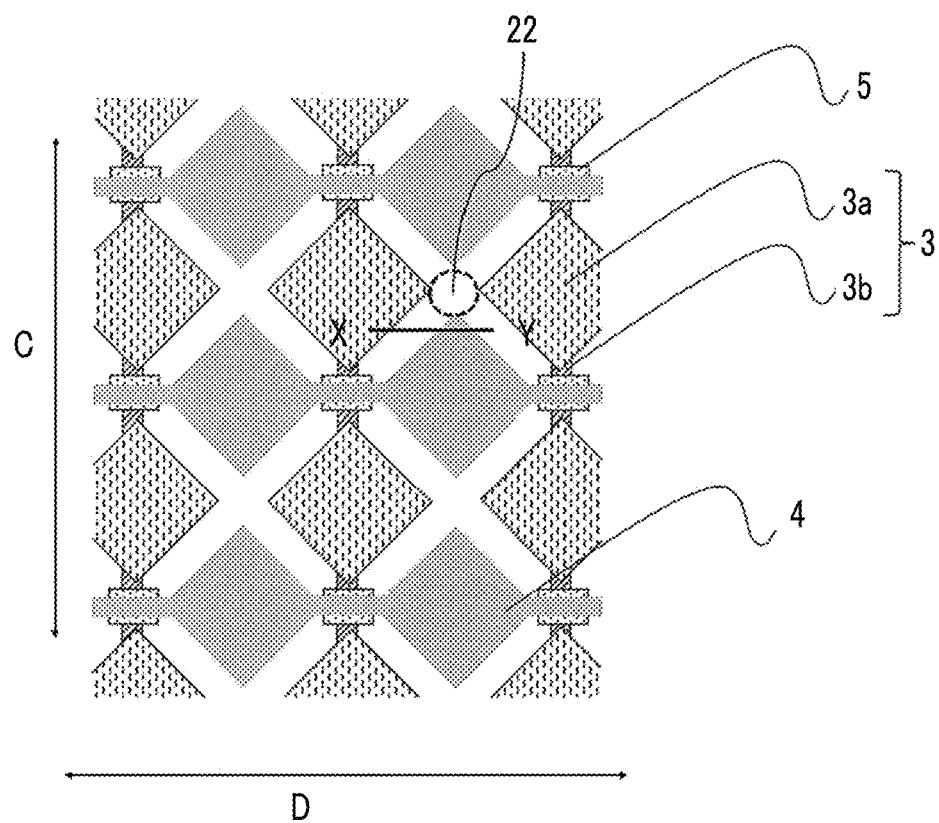
FIG. 3 is an explanatory view illustrating an example of a relationship between a transparent electrode pattern and non-patterned regions in the present invention.

Here, in a case in which the transparent laminate of the present invention is used in an electrostatic capacitance-type input device described below, there are cases in which the transparent electrode pattern is provided in two substantially orthogonal directions that are the row direction and the column direction as a first transparent electrode pattern and a second transparent electrode pattern (for example, refer to FIG. 3). For example, in the constitution of FIG. 3, the transparent electrode pattern in the transparent laminate of the present invention may be the second transparent electrode pattern 4 or a pad portion 3a of a first transparent electrode pattern 3. In other words, in the following description of the transparent laminate of the present invention, there are cases in which the transparent electrode pattern is representatively indicated using a reference sign "4", but the application of the transparent electrode pattern in the transparent laminate of the present invention is not limited to the second transparent electrode pattern 4 in the electrostatic capacitance-type input device of the present invention, and the transparent electrode pattern may be used as the pad portion 3a of the first transparent electrode pattern 3.

The transparent laminate of the present invention preferably includes a non-patterned region in which the transparent electrode pattern is not formed. In the present specification, the non-patterned region refers to a region in which the transparent electrode pattern 4 is not formed.

FIG. 11 illustrates an aspect in which the transparent laminate of the present invention includes the non-patterned region 22.

The transparent laminate of the present invention preferably includes the region in which the transparent substrate, the transparent film, and the second transparent resin layer are laminated in this order in the plane at least in a part of the non-patterned region 22 in which the transparent electrode pattern is not formed.

In the transparent laminate of the present invention, in the region in which the transparent substrate, the transparent film, and the second transparent resin layer are laminated in this order, the transparent film and the second transparent resin layer are preferably adjacent to each other.

In the other region of the non-patterned region 22, other members may be disposed in arbitrary locations within the scope of the gist of the present invention, and, for example, in a case in which the transparent laminate of the present invention is used in the electrostatic capacitance-type input device described below, it is possible to laminate a mask layer 2, an insulating layer 5, an additional conductive element 6, and the like in FIG. 1A.

In the transparent laminate of the present invention, the transparent substrate and the transparent film are preferably adjacent to each other.

FIG. 11 illustrates an aspect in which the transparent film 11 is adjacently laminated on the transparent substrate 1.

Within the scope of the gist of the present invention, a third transparent film may be laminated between the transparent substrate and the transparent film. For example, a third transparent film having a refractive index of 1.5 to 1.52 (not illustrated in FIG. 11) is preferably provided between the transparent substrate and the transparent film.

In the transparent laminate of the present invention, the thickness of the transparent film is preferably 55 to 110 nm, more preferably 60 to 110 nm, and particularly preferably 70 to 90 nm.

Here, the transparent film may have a monolayer structure or a laminate structure of two or more layers. In a case in which the transparent film has a laminate structure of two or more layers, the thickness of the transparent film refers to the total thickness of all the layers.

In the transparent laminate of the present invention, the transparent film and the transparent electrode pattern are preferably adjacent to each other.

FIG. 11 illustrates an aspect in which the transparent electrode pattern 4 is adjacently laminated on a region of a part of the transparent film 11.

The shape of the end portion of the transparent electrode pattern 4 is not particularly limited and may be a taper shape as illustrated in FIG. 11, and, for example, the end portion may have a taper shape in which the surface on the transparent substrate side is wider than the surface on the side opposite to the transparent substrate.

Here, when the end portion of the transparent electrode pattern has a taper shape, the angle of the end portion of the transparent electrode pattern (hereinafter, also referred to as the taper angle) is preferably 30° or less, more preferably 0.1° to 15°, and particularly preferably 0.5° to 5°.

In the present specification, the taper angle can be obtained using the following method for measuring the taper angle: a microscopic photograph of the end portion of the transparent electrode pattern is captured, the taper portion in the microscopic photograph is approximated to a triangle, and the taper angle is directly measured.

Figure 10:
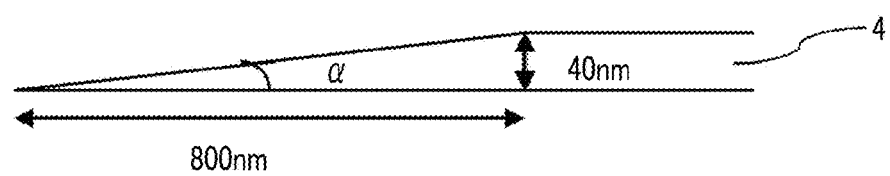
FIG. 10 is an explanatory view illustrating an example of a taper shape of an end portion of the transparent electrode pattern.

FIG. 10 illustrates an example of a case in which the end portion of the transparent electrode pattern has a taper shape. In a triangle obtained by approximating a taper portion in FIG. 10, the bottom surface is 800 nm, the height (the thickness at the top portion substantially parallel to the bottom surface) is 40 nm, and the taper angle α at this time is approximately 3°. The bottom surface of the triangle obtained by approximating the taper portion is preferably 10 to 3,000 nm, more preferably 100 to 1,500 nm, and particularly preferably 300 to 1,000 nm.

Meanwhile, a preferred range of the height of the triangle obtained by approximating the taper portion is the same as the preferred range of the thickness of the transparent electrode pattern.

The transparent laminate of the present invention preferably includes a region in which the transparent electrode pattern and the second transparent resin layer are adjacent to each other.

FIG. 11 illustrates an aspect in which the transparent electrode pattern, the second transparent resin layer, and the first curable transparent resin layer are adjacent to each other in the region 21 in which the transparent electrode pattern, the second transparent resin layer, and the first curable transparent resin layer are laminated in this order.

In addition, in the transparent laminate of the present invention, both of the transparent electrode pattern and the non-patterned region 22 in which the transparent electrode pattern is not formed are preferably continuously coated with the transparent film and the second transparent resin layer directly or through other layers.

Here, "being continuously coated" means that the transparent film and the second transparent resin layer are not patterned films but continuous films. That is, the transparent film and the second transparent resin layer preferably have no opening portions since the transparent electrode pattern is made to be rarely visible.

In addition, the transparent electrode pattern and the non-patterned region 22 are more preferably directly coated with the transparent film and the second transparent resin layer than coated through other layers. In a case in which the transparent electrode pattern and the non-patterned region are coated through other layers, examples of "other layers" include the insulating layer 5 included in the electrostatic capacitance-type input device of the present invention described below, a transparent electrode pattern on the second layer in a case in which two or more transparent electrode patterns are included as in the electrostatic capacitance-type input device of the present invention described below, and the like.

FIG. 11 illustrates an aspect in which the second transparent resin layer 12 is laminated. The second transparent resin layer 12 is laminated so as to astride the region in which the transparent electrode pattern 4 on the transparent film 11 is not laminated and the region in which the transparent electrode pattern 4 is laminated. That is, the second transparent resin layer 12 is adjacent to the transparent film 11 and, furthermore, the second transparent resin layer 12 is adjacent to the transparent electrode pattern 4.

In addition, in a case in which the end portion of the transparent electrode pattern 4 has a taper shape, the second transparent resin layer 12 is preferably laminated along the taper shape (at the same slope as the taper angle).

FIG. 11 illustrates an aspect in which the first curable transparent resin layer 7 is laminated on the surface on a side opposite to the surface of the second transparent resin layer 12 on which the transparent electrode pattern is formed.

<Material of Transparent Laminate>
(Transparent Substrate)

In the transparent laminate of the present invention, the transparent substrate is preferably a glass substrate or a transparent film substrate and more preferably a transparent film substrate. The refractive index of the transparent substrate is preferably 1.5 to 1.55 and particularly preferably 1.5 to 1.52.

The transparent substrate may be constituted of a translucent substrate such as a glass substrate, and it is possible to use reinforced glass or the like represented by Corning's GORILLA glass. In addition, as the transparent substrate, it is possible to preferably use the materials used in JP2010-86684A, JP2010-152809A, and JP2010-257492A.

In a case in which a transparent film substrate is used as the transparent substrate, a transparent film substrate causing no optical distortion or a transparent film substrate having high transparency is more preferably used. Specific examples of the transparent film substrate include transparent film substrates including polyethylene terephthalate (PET), polyethylene naphthalate, polycarbonate, triacetyl cellulose, or a cycloolefine resin.

(Transparent Electrode Pattern)

The refractive index of the transparent electrode pattern is preferably 1.75 to 2.1.

The material of the transparent electrode pattern is not particularly limited, and well-known materials can be used. For example, it is possible to produce the transparent electrode pattern using a translucent conductive metal oxide film such as ITO or IZO or a metal film. Examples of the above-described metal oxide film and metal film include ITO films; metal films of Al, Zn, Cu, Fe, Ni, Cr, Mo, and the like; metal oxide films of $SiO_2$ and the like. In this case, the thicknesses of the respective elements can be set to 10 to 200 nm. In addition, since amorphous ITO films are turned into polycrystalline ITO films by means of firing, it is also possible to reduce the electrical resistance. In addition, the first transparent electrode pattern 3, the second transparent electrode pattern 4, and the additional conductive element 6 described below can also be manufactured using a photosensitive film having a conductive photocurable resin layer for which a conductive fiber is used. Additionally, in a case in which the first conductive pattern and the like are formed using ITO or the like, it is possible to refer to Paragraphs 0014 to 0016 of JP4506785B. Among these, the transparent electrode pattern is preferably an ITO film.

In the transparent laminate of the present invention, the transparent electrode pattern is preferably an ITO film having a refractive index of 1.75 to 2.1.

(First Curable Transparent Resin Layer and Second Transparent Resin Layer)

The preferred ranges of the first curable transparent resin layer and the second transparent resin layer included in the transparent laminate of the present invention are the same as the preferred ranges of the above-described first curable transparent resin layer and the above-described second transparent resin layer in the transfer film of the present invention.

(Transparent Film)

In the transparent laminate of the present invention, the refractive index of the transparent film is 1.6 to 1.78 and preferably 1.65 to 1.74. Here, the transparent film may have a monolayer structure or a laminate structure of two or more layers. In a case in which the transparent film has a laminate structure of two or more layers, the refractive index of the transparent film refers to the refractive index of all the layers.

The material of the transparent film is not particularly limited as long as the above-described range of the refractive index is satisfied.

The preferred range of the material of the transparent film and the preferred range of the physical properties such as the refractive index are the same as the preferred ranges of those of the second transparent resin layer.

In the transparent laminate of the present invention, the transparent film and the second transparent resin layer are preferably constituted of the same material from the viewpoint of optical homogeneity.

In the transparent laminate of the present invention, the transparent film is preferably a transparent resin film.

Metal oxide particles, resins (binders), and other additives that are used in the transparent resin film are not particularly limited within the scope of the gist of the present invention, and it is possible to preferably use the resin and other additives that are used in the second transparent resin layer in the transfer film of the present invention.

In the transparent laminate of the present invention, the transparent film may be an inorganic film. Examples of the material that is used in the inorganic film include the materials that are used in the second transparent resin layer.

(Third Transparent Film)

The refractive index of the third transparent film is preferably 1.5 to 1.55 since the refractive index is approximated to the refractive index of the transparent substrate and the visibility of the transparent electrode pattern improves and more preferably 1.5 to 1.52.

<Method for Manufacturing Transparent Laminate>

The method for manufacturing the transparent laminate of the present invention is not limited, and the transparent laminate can be manufactured using a well-known method.

Particularly, the transparent laminate of the present invention is preferably manufactured using a manufacturing method including a step of laminating the second transparent resin layer and the first curable transparent resin layer of the transfer film of the present invention in this order on the transparent electrode pattern. When the above-described constitution is provided, it is possible to collectively transfer the second transparent resin layer and the first curable transparent resin layer of the transparent laminate and easily manufacture transparent laminates having no problems of the transparent electrode pattern being visible with favorable productivity.

Meanwhile, in the method for manufacturing the transparent laminate, the second transparent resin layer is formed on the transparent electrode pattern and, in the non-patterned region, on the transparent film directly or through other layers.

(Surface Treatment of Transparent Substrate)

In addition, in order to enhance the adhesiveness of the respective layers that have been laminated together in the subsequent transfer step, it is possible to carry out a surface treatment on the noncontact surface (a surface on a side opposite to the surface that is touched by input means such as a finger out of the surfaces of the transparent substrate constituting the electrostatic capacitance-type input device) of the transparent substrate (front plate) in advance. As the surface treatment, it is preferable to carry out a surface treatment using a silane compound (silane coupling treatment). A silane coupling agent is preferably an agent having a functional group that interacts with photosensitive resins. For example, a silane coupling liquid (an aqueous solution of 0.3% by mass of N-β(aminoethyl)γ-aminopropyltrimethoxysilane, trade name: KBM603, manufactured by Shin-Etsu Chemical Co., Ltd.) is showered on the surface for 20 seconds, and the surface is cleaned by means of pure water showering. After that, a reaction is caused by means of heating. A heating tank may be used, and the reaction can also be accelerated by preliminarily heating the substrate using a laminator.

(Formation of Transparent Electrode Pattern)

The transparent electrode pattern can be formed on the transparent substrate or the transparent film having a refractive index of 1.6 to 1.78 and a thickness of 55 to 110 nm using the method for forming the first transparent electrode pattern 3, the second transparent electrode pattern 4, and the additional conductive element 6 or the like in the description of the electrostatic capacitance-type input device of the present invention described below or the like, and a method in which a photosensitive film described below is used is preferred.

(Formation of First Curable Transparent Resin Layer and Second Transparent Resin Layer)

Examples of the method for forming the first curable transparent resin layer and the second transparent resin layer includes methods having a protective film-removing step of removing the protective film from the transfer film of the present invention, a transfer step of transferring the first curable transparent resin layer and the second transparent resin layer in the transfer film of the present invention from which the protective film has been removed onto the transparent electrode pattern, an exposure step of exposing the first curable transparent resin layer and the second transparent resin layer which have been transferred onto the transparent electrode pattern, and a development step of developing the first curable transparent resin layer and the second transparent resin layer which have been exposed.

—Transfer Step—

The transfer step is a step of transferring the first curable transparent resin layer and the second transparent resin layer in the transfer film of the present invention from which the protective film has been removed onto the transparent electrode pattern.

In this case, a method including a step of removing the temporary support after laminating the first curable transparent resin layer and the second transparent resin layer in the transfer film of the present invention on the transparent electrode pattern is preferred.

The first curable transparent resin layer and the second transparent resin layer are transferred (attached) onto the surface of the transparent electrode pattern by overlaying, pressurizing, and heating the first curable transparent resin layer and the second transparent resin layer on the surface of the transparent electrode pattern. For the attachment, well-known laminators such as a laminator, a vacuum laminator, and an auto-cut laminator capable of enhancing productivity can be used.

—Exposure Step, Development Step, and Other Steps—

As examples of the exposure step, the development step, and other steps, it is possible to preferably use the method described in Paragraphs 0035 to 0051 of JP2006-23696A even in the present invention.

The exposure step is a step of exposing the first curable transparent resin layer and the second transparent resin layer which have been transferred onto the transparent electrode pattern.

Specific examples thereof include a method in which a predetermined mask is disposed above the first curable transparent resin layer and the second transparent resin layer which has been formed on the transparent electrode patterns and the temporary support and then the first curable transparent resin layer and the second transparent resin layer are exposed to light sources above the mask (through the mask and the temporary support).

Here, as the light sources for the exposure, it is possible to appropriately select and use light sources as long as the light sources are capable of radiating light having wavelengths in a range (for example, 365 nm, 405 nm, or the like) with which the first curable transparent resin layer and the second transparent resin layer can be cured. Specific examples thereof include an ultrahigh-pressure mercury lamp, a high-pressure mercury lamp, a metal halide lamp, and the like. The exposure amount is generally approximately 5 to 200 mJ/cm$^2$ and preferably approximately 10 to 100 mJ/cm$^2$.

The development step is a step of developing the exposed first curable transparent resin layer and the second transparent resin layer.

In the present invention, the development step is a narrowly-defined development step in which the first curable transparent resin layer and the second transparent resin layer which have been pattern-exposed are pattern-developed using a developer.

The development can be carried out using a developer. The developer is not particularly limited, and it is possible to use well-known developers such as the developer described in JP1993-72724A (JP-H05-72724A). Furthermore, the developer is preferably a developer in which photocurable resin layers perform dissolution-type development behaviors and, for example, preferably a developer including a compound having a pKa (the negative logarithm of the acid dissociation constant; Ka represents the acid dissociation constant) of 7 to 13 at a concentration of 0.05 to 5 mol/L. Meanwhile, in a case in which the first curable transparent resin layer and the second transparent resin layer do not form any patterns, the developer is preferably a developer which performs development behaviors so as not to dissolve the non-alkali development-type coloring composition layer and, for example, preferably a developer including a compound having a pKa of 7 to 13 at a concentration of 0.05 to 5 mol/L. To the developer, a small amount of a water-miscible organic solvent may be further added. Examples of the water-miscible organic solvent include methanol, ethanol, 2-propanol, 1-propanol, butanol, diacetone alcohol, ethylene glycol monomethyl ether, ethylene glycol monoethyl ether, ethylene glycol mono-n-butyl ether, pentyl alcohol, acetone, methyl ethyl ketone, cyclohexanone, ε-caprolactone, γ-butyrolactone, dimethylformamide, dimethylacetamide, hexamethylphosphoramide, ethyl lactate, methyl lactate, ε-caprolactam, N-methyl pyrrolidone, and the like. The concentration of the organic solvent is preferably 0.1% by mass to 30% by mass.

In addition, to the developer, it is possible to further add a well-known surfactant. The concentration of the surfactant is preferably 0.01% by mass to 10% by mass.

The development method may be any one of puddle development, shower development, shower and spin development, dip development, and the like. In the case of the shower development, a developer is showered onto the first curable transparent resin layer and the second transparent resin layer which have been exposed, whereby it is possible to remove non-cured portions. Furthermore, in a case in which the thermoplastic resin layer or the interlayer is provided, it is preferable to shower an alkaline liquid that does not easily dissolve photocurable resin layers and remove the thermoplastic resin layer, the interlayer, and the like before development. In addition, after the development, it is preferable to shower a cleaning agent or the like and remove development residue by rubbing the surface with a brush or the like. The liquid temperature of the developer is preferably 20° C. to 40° C., and the pH of the developer is preferably 8 to 13.

The method for manufacturing the electrostatic capacitance-type input device may have other steps such as a post exposure step and a post baking step. In a case in which the first curable transparent resin layer and the second transparent resin layer are heat-curable, it is preferable to carry out a post baking step.

Furthermore, patterning exposure or full-surface exposure may be carried out after the peeling of the temporary support or may be carried out before the peeling of the temporary support, which is followed by the peeling of the temporary support. The exposure may be exposure through a mask or digital exposure using a laser or the like.

(Formation of Transparent Film)

In a case in which the transparent laminate of the present invention further has a transparent film having a refractive index of 1.6 to 1.78 and a thickness of 55 to 110 nm on a side of the transparent electrode pattern opposite to the side on which the second transparent resin layer is formed, the transparent film is produced on the transparent electrode pattern directly or through other layers such as the third transparent film.

The method for forming the transparent film is not particularly limited, but the transparent film is preferably formed by means of transfer or sputtering.

Among these, the transparent laminate of the present invention is preferably produced by transferring a transparent curable resin film having the transparent film formed on the temporary support onto the transparent substrate and more preferably produced by transferring and then curing the transparent curable resin film. Examples of the method for transferring and curing include a method in which the photosensitive film described in the section of the electrostatic capacitance-type input device of the present invention described below is used and transfer, exposure, development, and other steps are carried out in the same manner as in the method for transferring the first curable transparent resin layer and the second transparent resin layer in the method for manufacturing the transparent laminate. In this case, the refractive index of the transparent film is preferably adjusted to the above-described range by dispersing the metal oxide particles in a photocurable resin layer in the photosensitive film.

Meanwhile, in a case in which the transparent film is an inorganic film, the transparent film is preferably formed by means of sputtering. That is, in the transparent laminate of the present invention, the transparent film is also preferably formed by means of sputtering.

As the method for sputtering, it is possible to preferably use the method used in JP2010-86684A, JP2010-152809A, and JP2010-257492A.

(Formation of Third Transparent Film)

A method for forming the third transparent film is the same as a method for forming the transparent film having a refractive index of 1.6 to 1.78 and a thickness of 55 to 110 nm on the transparent substrate.

The method for manufacturing the transparent laminate preferably includes a step of curing the first curable transparent resin layer and the second transparent resin layer at the same time and more preferably includes a step of pattern-curing the layers at the same time. For the transfer film of the present invention, it is preferable to laminate the first curable transparent resin layer and then laminate the second transparent resin layer without curing the first curable transparent resin layer. The first curable transparent resin layer and the second transparent resin layer which have been transferred from the transfer film of the present invention obtained in the above-described manner can be cured at the same time. Therefore, the first curable transparent resin layer and the second transparent resin layer can be developed in a desired pattern by means of photolithography after being transferred onto the transparent electrode pattern from the transfer film of the present invention.

The method for manufacturing the transparent laminate more preferably includes a step of developing and removing non-cured portions (in the case of light-curing, only non-exposed portions or only exposed portions) in the first curable transparent resin layer and the second transparent resin layer after the step of curing the first curable transparent resin layer and the second transparent resin layer at the same time.

[Electrostatic Capacitance-Type Input Device]

The electrostatic capacitance-type input device of the present invention includes the transparent laminate of the present invention.

The electrostatic capacitance-type input device of the present invention is preferably produced by laminating the second transparent resin layer and the first curable transparent resin layer of the transfer film in this order on the transparent substrate including the transparent electrode pattern using the transfer film of the present invention. The electrostatic capacitance-type input device is more preferably produced by transferring the second transparent resin layer and the first curable transparent resin layer disposed adjacent to the second transparent resin layer onto the transparent electrode pattern in the electrostatic capacitance-type input device from the transfer film of the present invention.

The electrostatic capacitance-type input device is preferably produced by curing the first curable transparent resin layer and the second transparent resin layer which have been transferred from the transfer film of the present invention at the same time and more preferably produced by pattern-curing the first curable transparent resin layer and the second transparent resin layer at the same time. Meanwhile, in a case in which the first curable transparent resin layer and the second transparent resin layer which have been transferred from the transfer film of the present invention are cured at the same time, it is preferable not to peel the temporary support from the transfer film of the present invention.

The electrostatic capacitance-type input device of the present invention is more preferably produced by developing and removing the non-cured portion of the first curable transparent resin layer and the second transparent resin layer which have been transferred from the transfer film of the present invention and pattern-cured at the same time. Meanwhile, it is preferable to cure the first curable transparent resin layer and the second transparent resin layer which have been transferred from the transfer film of the present invention at the same time and then peel the protective film from the transfer film of the present invention to be developed. The electrostatic capacitance-type input device of the present invention needs to be connected to a flexible wire formed on a polyimide film at the terminal portion of a guidance wire and is thus preferably not covered with the first curable transparent resin layer (and the second transparent resin layer).

Figure 13:
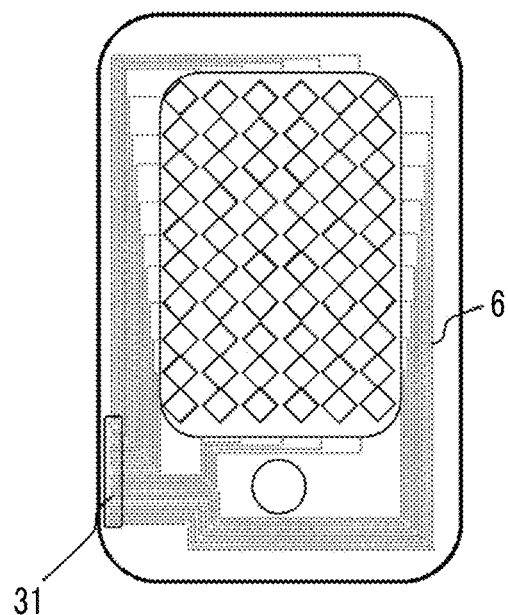
FIG. 13 is a top view illustrating another example of the constitution of the electrostatic capacitance-type input device of the present invention and illustrates an aspect including a terminal portion (end portion) of a guidance wire which is pattern-exposed and is not covered with a first curable transparent resin layer.

The above-described aspect is illustrated in FIG. 13. FIG. 13 illustrates an electrostatic capacitance-type input device having the following constitution which includes a guidance wire (the additional conductive element 6) of the transparent electrode pattern and a terminal portion 31 of the guidance wire.

The first curable transparent resin layer on the terminal portion 31 of the guidance wire forms a non-cured portion (non-exposed portion) and is thus removed by means of development, whereby the terminal portion 31 of the guidance wire is exposed.

Figure 14:
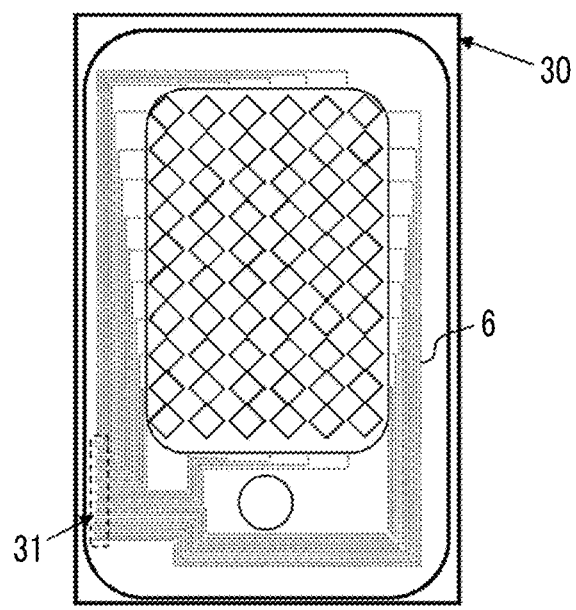
Figure 15:
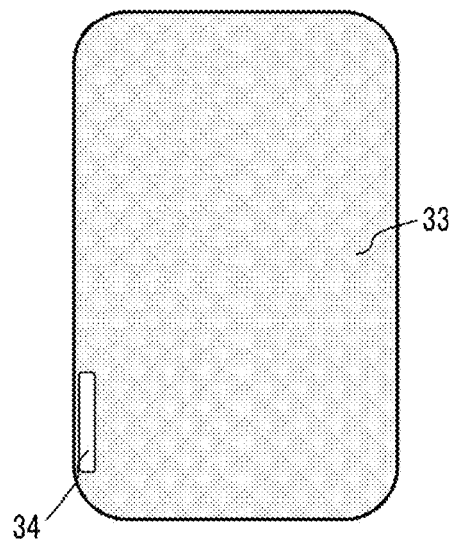
FIG. 15 is a schematic view illustrating an example of a desired pattern in which the first curable transparent resin layer and the second transparent resin layer are cured.

Specific exposure and development aspects are illustrated in FIGS. 14 and 15. FIG. 14 illustrates a state in which the transfer film 30 of the present invention having the first curable transparent resin layer and the second transparent resin layer is laminated on the transparent electrode pattern in the electrostatic capacitance-type input device by means of lamination and is to be cured by means of exposure or the like. In a case in which photolithography is used, that is, a case in which the transfer film is cured by means of exposure, the electrostatic capacitance-type input device can be obtained by pattern-exposing the cured portion (exposed portion) 33 of the first curable transparent resin layer and the second transparent resin layer having a shape illustrated in FIG. 15 using a mask and developing the non-exposed portions. Specifically, in FIG. 15, a cured portion (desired pattern) of the first curable transparent resin layer and the second transparent resin layer for preventing the terminal portion (the ejection wire portion) of the guidance wire from being covered, from which an opening portion 34 corresponding to the terminal portion of the guidance wire as the non-cured portion of the first curable transparent resin layer and the second transparent resin layer and the end portions of the transfer film of the present invention having the first curable transparent resin layer and the second transparent resin layer which protrude outside the contour of the frame portion of the electrostatic capacitance-type input device has been removed, are obtained.

Therefore, it is possible to directly connect the flexible wire produced on the polyimide film to the terminal portion 31 of the guidance wire, and thus it becomes possible to send signals from sensors to electric circuits.

The electrostatic capacitance-type input device of the present invention preferably has a transparent laminate having the transparent electrode pattern, the second transparent resin layer disposed adjacent to the transparent electrode pattern, and the first curable transparent resin layer disposed adjacent to the second transparent resin layer, in which the refractive index of the second transparent resin layer is higher than the refractive index of the first curable transparent resin layer and the refractive index of the second transparent resin layer is 1.6 or higher.

Hereinafter, the detail of a preferred aspect of the electrostatic capacitance-type input device of the present invention will be described.

The electrostatic capacitance-type input device of the present invention has a front plate (corresponding to the transparent substrate in the transparent laminate of the present invention) and at least the following elements (3) to (5), (7), or (8) on the noncontact surface side of the front plate and preferably has the transparent laminate of the present invention:

(3) a plurality of first transparent electrode patterns in which a plurality of pad portions are formed so as to extend in a first direction through a connection portion;

(4) a plurality of second electrode patterns which are electrically insulated from the first transparent electrode patterns and are made of a plurality of pad portions formed so as to extend in a direction orthogonal to the above-described first direction;

(5) an insulating layer that electrically insulates the first transparent electrode pattern and the second electrode pattern;

(7) a second transparent resin layer formed so as to fully or partially cover the elements (3) to (5); and (8) a first curable transparent resin layer adjacently formed so as to cover the element (7).

Here, the second transparent resin layer (7) corresponds to the second transparent resin layer in the transparent laminate of the present invention. In addition, the first curable transparent resin layer (8) corresponds to the first curable transparent resin layer in the transparent laminate of the present invention. Meanwhile, generally, the first curable transparent resin layer is preferably a so-called transparent protective layer in well-known electrostatic capacitance-type input devices.

In the electrostatic capacitance-type input device of the present invention, the second electrode pattern (4) may or may not be a transparent electrode pattern but is preferably a transparent electrode pattern.

The electrostatic capacitance-type input device of the present invention preferably further has an additional conductive element other than the first transparent electrode pattern and the second electrode pattern which is electrically connected to at least one of the first transparent electrode pattern or the second electrode pattern (6).

Here, in a case in which the second electrode pattern (4) is not a transparent electrode pattern and the additional conductive element (6) is not provided, the first transparent electrode pattern (3) corresponds to the transparent electrode pattern in the transparent laminate of the present invention.

In a case in which the second electrode pattern (4) is a transparent electrode pattern and the additional conductive element (6) is not provided, at least one of the first transparent electrode pattern (3) or the second electrode pattern (4) corresponds to the transparent electrode pattern in the transparent laminate of the present invention.

In a case in which the second electrode pattern (4) is not a transparent electrode pattern and the additional conductive element (6) is provided, at least one of the first transparent electrode pattern (3) or the additional conductive element (6) corresponds to the transparent electrode pattern in the transparent laminate of the present invention.

In a case in which the second electrode pattern (4) is a transparent electrode pattern and the additional conductive element (6) is provided, at least one of the first transparent electrode pattern (3), the second electrode pattern (4), or the additional conductive element (6) corresponds to the transparent electrode pattern in the transparent laminate of the present invention.

The electrostatic capacitance-type input device of the present invention preferably further has the transparent film (2) between the first transparent electrode pattern (3) and the front plate, between the second electrode pattern (4) and the front plate, or between the additional conductive element (6) and the front plate. Here, the transparent film (2) preferably corresponds to the transparent film having a refractive index of 1.6 to 1.78 and a thickness of 55 to 110 nm in the transparent laminate of the present invention from the viewpoint of improving the visibility of the transparent electrode pattern.

The electrostatic capacitance-type input device of the present invention preferably has the mask layer (1) and/or a decorative layer as necessary. The mask layer is also provided as a black trim around a region touched by a finger, a stylus, or the like in order to prevent the guidance wire of the transparent electrode pattern from being visible from the touch side or decorate the input device. The decorative layer is provided as a trim around the region touched by a finger, a stylus, or the like in order for decoration, and, for example, a white decorative layer is preferably provided.

The mask layer (1) and/or the decorative layer are preferably provided between the transparent film (2) and the front plate, between the first transparent electrode pattern (3) and the front plate, between the second transparent electrode pattern (4) and the front plate, or between the additional conductive element (6) and the front plate. The mask layer (1) and/or the decorative layer are more preferably provided adjacent to the front plate.

Even in a case in which the electrostatic capacitance-type input device includes a variety of members described above, when the electrostatic capacitance-type input device of the present invention includes the second transparent resin layer disposed adjacent to the transparent electrode pattern and the first curable transparent resin layer disposed adjacent to the second transparent resin layer, it is possible to prevent the transparent electrode pattern from becoming visible and solve a problem of the visibility of the transparent electrode pattern. Furthermore, when a constitution in which the transparent electrode pattern is sandwiched using the transparent film having a refractive index of 1.6 to 1.78 and a thickness of 55 to 110 nm and the second transparent resin layer as described above is provided, it is possible to further improve the problem of the visibility of the transparent electrode pattern.

<Constitution of Electrostatic Capacitance-Type Input Device>

First, a preferred constitution of the electrostatic capacitance-type input device of the present invention will be described together with methods for manufacturing the respective members constituting the device. FIG. 1A is a cross-sectional view illustrating a preferred constitution of the electrostatic capacitance-type input device of the present invention. FIG. 1A illustrates an aspect in which an electrostatic capacitance-type input device 10 is constituted of the transparent substrate (front plate) 1, the mask layer 2, the transparent film 11 having a refractive index of 1.6 to 1.78 and a thickness of 55 to 110 nm, the first transparent electrode pattern (what is illustrated in the drawing is a connection portion 3b of the first transparent electrode pattern), the second transparent electrode pattern 4, the insulating layer 5, the additional conductive element 6, the second transparent resin layer 12, and the first curable transparent resin layer 7.

In addition, FIG. 1B which illustrates a cross-sectional view in a direction of X-Y direction in FIG. 3 described below is also, similarly, a cross-sectional view illustrating a preferred constitution of the electrostatic capacitance-type input device of the present invention. FIG. 1B illustrates an aspect in which the electrostatic capacitance-type input device 10 is constituted of the transparent substrate (the front plate) 1, the transparent film 11 having a refractive index of 1.6 to 1.78 and a thickness of 55 to 110 nm, the first transparent electrode pattern 3, the second transparent electrode pattern 4, the second transparent resin layer 12, and the first curable transparent resin layer 7.

For the transparent substrate (the front plate) 1, it is possible to use the materials exemplified as the material of the transparent electrode pattern in the transparent laminate of the present invention. In addition, in FIG. 1A, the side of the transparent substrate 1, which is the front plate, on which the respective elements are provided will be referred to as the noncontact surface side. In the electrostatic capacitance-type input device 10 of the present invention, signals are input by touching the touch surface (the surface opposite to the noncontact surface) of the transparent substrate 1 which is the front plate with a finger or the like.

In addition, the mask layer 2 is provided on the noncontact surface of the transparent substrate 1 which is the front plate. The mask layer 2 is a trim-shaped pattern around a display region formed on the noncontact surface side of a touch panel front plate and is formed in order to prevent the guidance wire and the like from being visible.

Figure 2:
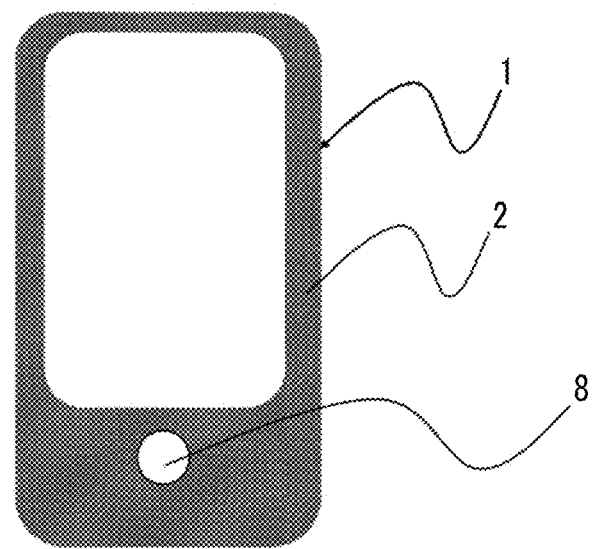
FIG. 2 is an explanatory view illustrating an example of a front plate in the present invention.

In the electrostatic capacitance-type input device 10 of the present invention, the mask layer 2 is provided so as to cover a part of the region (a region other than the input surface in FIG. 2) of the transparent substrate 1 which is the front plate as illustrated in FIG. 2. Furthermore, an opening portion 8 can be provided in a part of the transparent substrate 1 which is the front plate as illustrated in FIG. 2. In the opening portion 8, a press-type mechanical switch can be installed.

On the noncontact surface of the transparent substrate 1 which is the front plate, a plurality of first transparent electrode patterns 3 in which a plurality of the pad portions are formed so as to extend in the first direction through the connection portions, a plurality of second transparent electrode patterns 4 which are electrically insulated from the first transparent electrode pattern 3 and are made of a plurality of pad portions formed so as to extend in a direction orthogonal to the first direction, and the insulating layer 5 that electrically insulates the first transparent electrode pattern 3 and the second transparent electrode pattern 4. For the first transparent electrode pattern 3, the second transparent electrode pattern 4, and the additional conductive element 6 described below, the materials exemplified as the material of the transparent electrode pattern in the transparent laminate of the present invention can be used, and ITO films are preferred.

In addition, at least one of the first transparent electrode pattern 3 or the second transparent electrode pattern 4 can be installed so as to astride both regions of the noncontact surface of the transparent substrate 1 which is the front plate and the surface of the mask layer 2 opposite to the transparent substrate 1 which is the front plate. FIG. 1A illustrates a view in which the second transparent electrode pattern 4 is installed so as to astride both regions of the noncontact surface of the transparent substrate 1 which is the front plate and the surface of the mask layer 2 opposite to the transparent substrate 1 which is the front plate.

As described above, even in a case in which a photosensitive film is laminated so as to astride the mask layer which requires a certain thickness and the noncontact surface of the front plate, when a photosensitive film having a specific layer constitution described below is used, lamination causing no generation of foam in the boundary with the mask portion becomes possible with a simple step without using an expensive facility such as a vacuum laminator.

The first transparent electrode pattern 3 and the second transparent electrode pattern 4 will be described using FIG. 3. FIG. 3 is an explanatory view illustrating an example of the first transparent electrode pattern and the second transparent electrode pattern in the present invention. As illustrated in FIG. 3, in the first transparent electrode pattern 3, the pad portions 3a are formed so as to extend in the first direction C through the connection portion 3b. In addition, the second transparent electrode pattern 4 is electrically insulated from the first transparent electrode pattern 3 using the insulating layer 5 and is constituted of a plurality of the pad portions formed so as to extend in a direction orthogonal to the first direction C (a second direction D in FIG. 3). Here, in a case in which the first transparent electrode pattern 3 is formed, the pad portions 3a and the connection portions 3b may be integrally produced or it is also possible to produce the connection portions 3b alone and integrally produce (pattern) the pad portions 3*a* and the second transparent electrode pattern 4. In a case in which the pad portions 3*a* and the second transparent electrode pattern 4 are integrally produced (patterned), the respective layers are formed so that some of the connection portions 3*b* and some of the pad portions 3*a* are coupled together as illustrated in FIG. 3 and the first transparent electrode pattern 3 and the second transparent electrode pattern 4 are electrically insulated from each other using the insulating layer 5.

In addition, in FIG. 3, a region in which the first transparent electrode pattern 3, the second transparent electrode pattern 4, or the additional conductive element 6 described below are not formed corresponds to the non-patterned region 22 in the transparent laminate of the present invention.

Figure 1B:
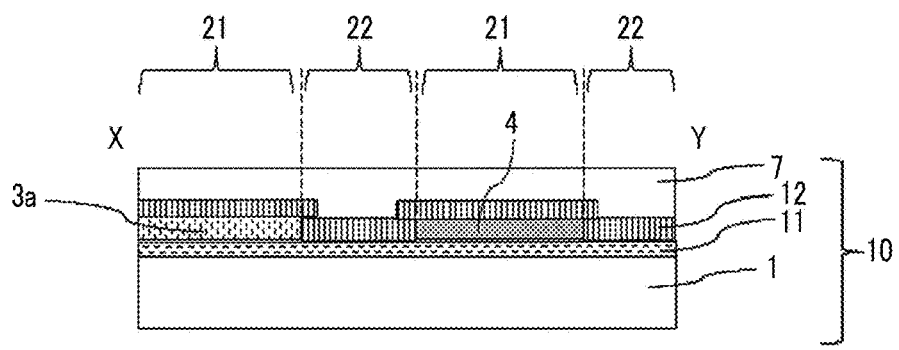
FIG. 1B is a schematic cross-sectional view illustrating another example of the constitution of the electrostatic capacitance-type input device of the present invention.

In FIG. 1A, the additional conductive element 6 is installed on the surface side of the mask layer 2 opposite to the transparent substrate 1 which is the front plate. The additional conductive element 6 is electrically connected to at least one of the first transparent electrode pattern 3 or the second transparent electrode pattern 4 and is a separate element from the first transparent electrode pattern 3 and the second transparent electrode pattern 4.

FIG. 1A illustrates an aspect in which the additional conductive element 6 is connected to the second transparent electrode pattern 4.

In addition, in FIG. 1A, the first curable transparent resin layer 7 is installed so as to cover all of the respective constituent elements. The first curable transparent resin layer 7 may be constituted so as to cover only part of the respective constituent elements. The insulating layer 5 and the first curable transparent resin layer 7 may be made of the same material or different materials. As the material constituting the insulating layer 5, it is possible to preferably use the material exemplified as the material of the first curable transparent resin layer or the second transparent resin layer in the transparent laminate of the present invention.

<Method for Manufacturing Electrostatic Capacitance-Type Input Device>

Figure 4:
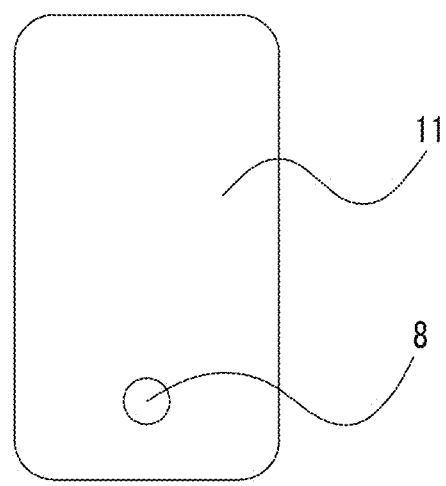
FIG. 4 is a top view illustrating an example of the front plate in which an opening portion is formed.
Figure 5:
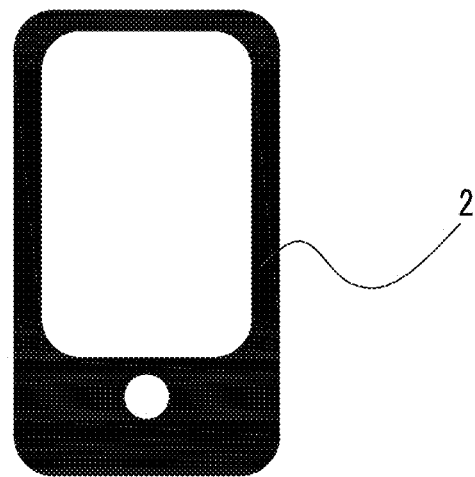
FIG. 5 is a top view illustrating an example of the front plate on which a mask layer is formed.
Figure 6:
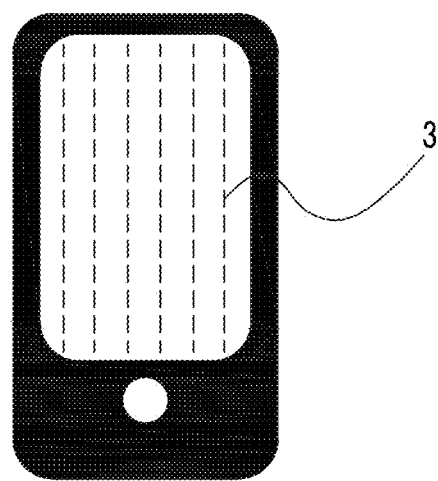
FIG. 6 is a top view illustrating an example of the front plate on which a first transparent electrode pattern is formed.
Figure 7:
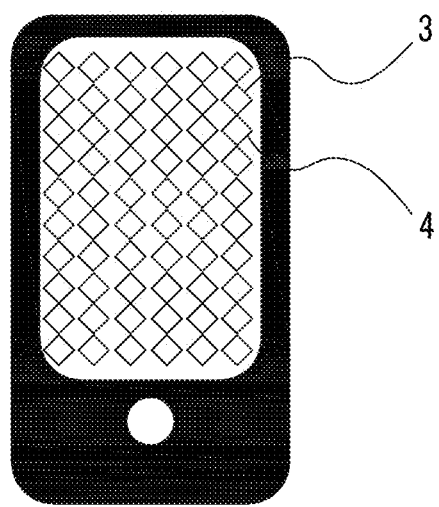
FIG. 7 is a top view illustrating an example of the front plate on which the first transparent electrode pattern and a second transparent electrode pattern are formed.
Figure 8:
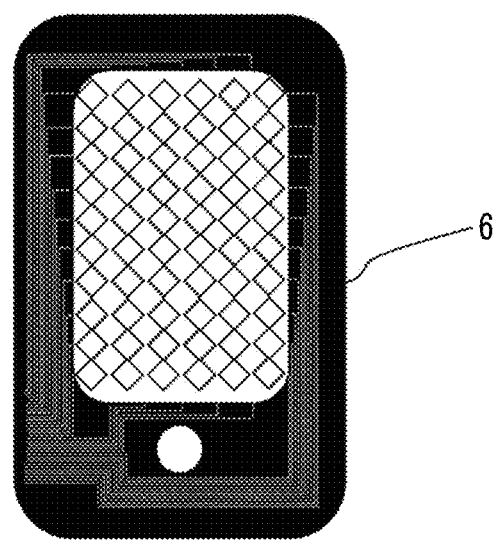
FIG. 8 is a top view illustrating an example of the front plate on which a conductive element different from the first and second transparent electrode patterns is formed.

Examples of an aspect being formed in a process for manufacturing the electrostatic capacitance-type input device of the present invention include aspects of FIGS. 4 to 8. FIG. 4 is a top view illustrating an example of the transparent substrate 1 in which the opening portion 8 is formed. FIG. 5 is a top view illustrating an example of the front plate in which the mask layer 2 is formed. FIG. 6 is a top view illustrating an example of the front plate in which the first transparent electrode pattern 3 is formed. FIG. 7 is a top view illustrating an example of the front plate in which the first transparent electrode pattern 3 and the second transparent electrode pattern 4 are formed. FIG. 8 is a top view illustrating an example of the front plate in which the additional conductive element 6 other than the first and second transparent electrode patterns is formed. These aspects illustrate examples in which the following description is specified, and the scope of the present invention is not interpreted to be limited by these drawings.

In the method for manufacturing the electrostatic capacitance-type input device, in a case in which the second transparent resin layer 12 and the first curable transparent resin layer 7 are formed, the layers can be formed by transferring the second transparent resin layer and the first curable transparent resin layer onto the surface of the transparent substrate 1 which is the front plate on which the respective elements are arbitrarily formed using the transfer film of the present invention.

In the method for manufacturing the electrostatic capacitance-type input device, at least one element of the mask layer 2, the first transparent electrode pattern 3, the second transparent electrode pattern 4, the insulating layer 5, or the additional conductive element 6 are preferably formed using the photosensitive film having the temporary base material and the photocurable resin layer in this order.

In a case in which the respective elements are formed using the transfer film of the present invention or the photosensitive film, even in the transparent substrate (the front plate) having the opening portion, resist components do not leak or protrude through the opening portion, and, particularly, in the mask layer in which a light-blocking pattern needs to be formed up to immediately above the boundary line of the edge portion of the front plate, resist components do not leak or protrude from the edge portion of the transparent substrate, and thus the noncontact surface of the transparent substrate is not contaminated, and it is possible to manufacture touch panels having a reduced thickness and a reduced weight with simple steps.

When the mask layer, the insulating layer, and the conductive photocurable resin layer are used, in a case in which the permanent materials of the first transparent electrode pattern, the second transparent electrode pattern, the conductive element, and the like are formed using the photosensitive film, the photosensitive film may be laminated on a temporary base material and then exposed in a pattern shape as necessary. The photosensitive film may be a negative-type material or a positive-type material. Patterns can be obtained by removing the non-exposed portions in a case in which the photosensitive film is a negative-type material or the exposed portions in a case in which the photosensitive film is a positive-type material by means of a development treatment. In the development, the thermoplastic resin layer and the photocurable resin layer may be developed and removed using separate fluids or may be removed using the same fluid. Well-known development facilities such as a brush and a high-pressure jet may be combined together as necessary. After the development, post exposure and post baking may be carried out as necessary.

(Photosensitive Film)

The photosensitive film other than the transfer film of the present invention which is preferably used to manufacture the electrostatic capacitance-type input device of the present invention will be described. The photosensitive film has a temporary base material and a photocurable resin layer and preferably has a thermoplastic resin layer between the temporary base material and the photocurable resin layer. In a case in which the mask layer and the like are formed using the photosensitive film having the thermoplastic resin layer, air bubbles are not easily generated in elements formed by transferring the photocurable resin layer, image unevenness or the like is not easily caused in image display devices, and excellent display characteristics can be obtained.

—Layers Other than Photocurable Resin Layer and Production Method—

As the temporary base material and the thermoplastic resin layer in the photosensitive film, it is possible to use the same temporary base material and thermoplastic resin layer as those respectively used as the temporary support and the thermoplastic resin layer in the transfer film of the present invention. In addition, as the method for producing the photosensitive film, it is possible to use the same method as the method for producing the transfer film of the present invention.

—Photocurable Resin Layer—

In the photosensitive film, additives are added to the photocurable resin layer depending on the applications of the photosensitive film. That is, in a case in which the photosensitive film is used to form the mask layer, a colorant is added to the photocurable resin layer. In addition, in a case in which the photosensitive film has a conductive photocurable resin layer, a conductive fiber and the like are added to the photocurable resin layer.

In a case in which the photosensitive film is a negative-type material, the photocurable resin layer preferably includes an alkali-soluble resin, a polymerizable compound, and a polymerization initiator. Furthermore, conductive fibers, colorants, other additives, and the like are used, but the components are not limited thereto.

——Alkali-Soluble Resin, Polymerizable Compound, or Polymerization Initiator——

As the alkali-soluble resin, the polymerizable compound, or the polymerization initiator included in the photosensitive film, it is possible to use the same alkali-soluble resin, polymerizable compound, or polymerization initiator as those used in the transfer film of the present invention.

——Conductive Fiber (in the Case of being Used as Conductive Photocurable Resin Layer)——

In a case in which the photosensitive film on which the conductive photocurable resin layer is laminated is used to form the transparent electrode pattern or the additional conductive element, it is possible to use the following conductive fibers and the like in the photocurable resin layer.

The structure of the conductive fiber is not particularly limited and can be appropriately selected depending on the purposes, but is preferably any one of a solid structure and a hollow structure.

Here, there are cases in which a fiber having a solid structure will be referred to as a "wire" and a fiber having a hollow structure will be referred to as a "tube". In addition, there are cases in which a conductive fiber having an average short-axis length of 1 nm to 1,000 nm and an average long-axis length of 1 µm to 100 µm will be referred to as a "nanowire".

In addition, there are cases in which a conductive fiber having an average short-axis length of 1 nm to 1,000 nm, an average long-axis length of 0.1 µm to 1,000 µm, and a hollow structure will be referred to as a "nanotube".

The material of the conductive fiber is not particularly limited as long as the material is conductive and can be appropriately selected depending on the purposes, but at least one of metal or carbon is preferred, and, among these, the conductive fiber is particularly preferably at least one of metal nanowires, metal nanotubes, or carbon nanotubes.

The material of the metal nanowire is not particularly limited, and, for example, at least one metal selected from the group consisting of Groups 4, 5, and 6 of the extended periodic table (The International Union of Pure and Applied Chemistry; IUPAC1991) is preferred, at least one metal selected from Groups 2 to 14 is more preferred, at least one metal selected from Groups 2, 8, 9, 10, 11, 12, 13, and 14 is still more preferred, and materials including the above-described metal as a main component are particularly preferred.

Examples of the metal include copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, alloys thereof, and the like. Among these, metals mainly containing silver or metals containing an alloy of silver and a metal other than silver are preferred from the viewpoint of the excellent conductivity.

The metals mainly containing silver means that the content of silver in the metal nanowire is 50% by mass or more and preferably 90% by mass or more.

Examples of metals used to form the alloys with silver include platinum, osmium, palladium, iridium, and the like. These metals may be used singly or two or more metals may be jointly used.

The shape of the metal nanowire is not particularly limited, can be appropriately selected depending on the purposes, and the shape may be, for example, an arbitrary shape such as a cylindrical shape, a cubic shape, or a column shape having a polygonal cross-section; however, in applications in which high transparency is required, a cylindrical shape or a cross-sectional shape in which the corners of the polygonal of the cross-section are rounded is preferred.

The cross-sectional shape of the metal nanowire can be investigated by applying a water dispersion liquid of the metal nanowire onto the temporary base material and observing the cross-section using a transmission electron microscope (TEM).

The average short-axis length of the metal nanowire is preferably 150 nm or less, more preferably 1 nm to 40 nm, still more preferably 10 nm to 40 nm, and particularly preferably 15 nm to 35 nm.

In a case in which the average short-axis length is less than 1 nm, oxidation resistance deteriorates, and there are cases in which durability deteriorates, and, in a case in which the average short-axis length exceeds 150 nm, the metal nanowire causes scattering, and there are cases in which sufficient transparency cannot be obtained.

The average short-axis length of the metal nanowire was obtained by observing 300 metal nanowires using a transmission electron microscope (TEM; manufactured by JEOL Ltd.; JEM-2000FX) and calculating the average value.

Meanwhile, in a case in which the short axis of the metal nanowire is not round, the shortest axis was considered as the short-axis length.

The average long-axis length of the metal nanowire is preferably 1 µm to 40 µm, more preferably 3 µm to 35 µm, and still more preferably 5 µm to 30 µm.

The average long-axis length of the metal nanowire was obtained by, for example, observing 300 metal nanowires using a transmission electron microscope (TEM; manufactured by JEOL Ltd.; JEM-2000FX) and calculating the average value. Meanwhile, in a case in which the metal nanowire is bent, a circle including the bending of the metal nanowire as an arc is considered, and the value computed from the radius and curvature thereof was used as the long-axis length.

The thickness of the conductive photocurable resin layer is preferably 0.1 to 20 µm, more preferably 0.5 to 18 µm, and particularly preferably 1 to 15 µm from the viewpoint of the stability of coating fluids, drying during coating, and the development time during patterning.

The content of the conductive fiber in the total solid contents of the conductive photocurable resin layer is preferably 0.01% to 50% by mass, more preferably 0.05% to 30% by mass, and particularly preferably 0.1% to 20% by mass from the viewpoint of the conductivity and the stability of coating fluids.

——Colorant (in the Case of being Used as Mask Layer)——

In a case in which the photosensitive film is used as the mask layer, it is possible to use a colorant in the photocurable resin layer. As the colorant that is used in the present invention, it is possible to preferably use well-known colorants (organic pigments, inorganic pigments, dyes, and the like). Furthermore, in the present invention, in addition to black colorants, mixtures of red pigments, blue pigments, green pigments, and the like can be used.

In a case in which the photocurable resin layer is used as a black mask layer, a black colorant is preferably included from the viewpoint of the optical density. Examples of the black colorant include carbon black, titanium carbon, iron oxide, titanium oxide, graphite, and the like, and, among these, carbon black is preferred.

In a case in which the photocurable resin layer is used as a white mask layer, it is possible to use the white pigments described in Paragraph 0015 or 0114 of JP2005-7765A. In order to use the photocurable resin layer as mask layers having other colors, the pigments or dyes described in Paragraphs 0183 to 0185 of JP4546276B may be mixed into the photocurable resin layer. Specifically, it is possible to preferably use the pigments and dyes described in Paragraphs 0038 to 0054 of JP2005-17716A, the pigments described in Paragraphs 0068 to 0072 of JP2004-361447A, the colorants described in Paragraphs 0080 to 0088 of JP2005-17521A, and the like.

The colorant (preferably a pigment and more preferably carbon black) is desirably used as a dispersion liquid. This dispersion liquid can be prepared by adding a composition obtained by mixing the colorant and a pigment dispersant in advance to an organic solvent (or a vehicle) and dispersing the composition in the organic solvent. The vehicle refers to a portion of a medium in which a pigment is dispersed when paint is in a liquid state and includes a liquid component (a binder) which is a liquid phase and bonded with the pigment so as to form coated films and a component that dissolves and dilutes the above-described component (an organic solvent).

The disperser that is used in the case of dispersing the pigment is not particularly limited, and examples thereof include well-known dispersers such as kneaders, roll mills, attritors, super mills, dissolvers, homogenizers, sand mills, and beads mills which are described in p. 438 of "Pigment Dictionary", Kunizou Asakura, 1$^{st}$ edition, Asakura Publishing Co., Ltd., 2000.

Furthermore, the pigment may be finely ground using a friction force by means of the mechanical grinding described in p. 310 of the same publication.

The colorant is preferably a colorant having a number-average particle diameter of 0.001 μm to 0.1 μm and more preferably a colorant of 0.01 μm to 0.08 μm from the viewpoint of the dispersion stability. The "particle diameter" mentioned herein refers to the diameter of a circle having the same area as the particle in an electron micrograph, and the "number-average particle diameter" refers to the average value of 100 particle diameters arbitrarily selected from the particle diameters of a number of particles.

The thickness of the photocurable resin layer including the colorant is preferably 0.5 to 10 μm, more preferably 0.8 to 5 μm, and particularly preferably 1 to 3 μm from the viewpoint of the thickness difference from other layers. The content ratio of the colorant in the solid content of the colored photosensitive resin composition is not particularly limited, but is preferably 15% to 70% by mass, more preferably 20% to 60% by mass, and still more preferably 25% to 50% by mass from the viewpoint of sufficiently shortening the development time.

The total solid content mentioned in the present specification refers to the total mass of nonvolatile components excluding the solvent and the like from the colored photosensitive resin composition.

In a case in which the insulating layer is formed using the photosensitive film, the thickness of the photocurable resin layer is preferably 0.1 to 5 μm, more preferably 0.3 to 3 μm, and particularly preferably 0.5 to 2 μm from the viewpoint of maintaining the insulating property.

——Other Additives——

Furthermore, in the photocurable resin layer, other additives may be used. As the additives, it is possible to use the same additives as those used in the transfer film of the present invention.

In addition, as the solvent used in the case of manufacturing the photosensitive film by means of coating, it is possible to use the same solvent as that used in the transfer film of the present invention.

Hitherto, a case in which the photosensitive film is a negative-type material has been mainly described, but the photosensitive film may be a positive-type material. In a case in which the photosensitive film is a positive-type material, for example, the material and the like described in JP2005-221726A are used in the photocurable resin layer, but the components are not limited thereto.

(Formation of Mask Layer and Insulating Layer Using Photosensitive Film)

The mask layer 2 and the insulating layer 5 can be formed by transferring the photocurable resin layer to the transparent substrate 1 which is the front plate or the like using the photosensitive film. For example, in a case in which a black mask layer 2 is formed, the black mask layer can be formed by transferring the black photocurable resin layer onto the surface of the transparent substrate 1 which is the front plate using the photosensitive film having the black photocurable resin layer as the photocurable resin layer. In a case in which the insulating layer 5 is formed, the insulating layer can be formed by transferring the photocurable resin layer onto the surface of the first transparent electrode pattern formed in the transparent substrate 1 which is the front plate in which the first transparent electrode pattern has been formed using the photosensitive film having an insulating photocurable resin layer as the photocurable resin layer.

Furthermore, when the photosensitive film having a specific layer constitution in which the thermoplastic resin layer is provided between the photocurable resin layer and the temporary base material is used to form the mask layer 2 in which a light-blocking property is required, it is possible to prevent the generation of air bubbles during the lamination of the photosensitive film and form a high-quality mask layer 2 or the like from which light does not leak.

(Formation of First and Second Transparent Electrode Patterns and Additional Conductive Elements Using Photosensitive Film)

The first transparent electrode pattern 3, the second transparent electrode pattern 4, and the additional conductive element 6 can be formed by an etching treatment, using the photosensitive film having the conductive photocurable resin layer, or using the photosensitive film as a liftoff material.

—Etching Treatment—

In a case in which the first transparent electrode pattern 3, the second transparent electrode pattern 4, and the additional conductive element 6 are formed by an etching treatment, first, a transparent electrode layer such as ITO is formed on the noncontact surface of the transparent substrate 1 which is the front plate on which the mask layer 2 and the like have been formed by means of sputtering. Next, an etching pattern is formed on the transparent electrode layer by means of exposure and development using the photosensitive film having a photocurable resin layer for etching as the photocurable resin layer. After that, the transparent electrode is patterned by etching the transparent electrode layer, and the etching pattern is removed, whereby the first transparent electrode pattern 3 or the like can be formed.

Even in a case in which the photosensitive film is used as an etching resist (etching pattern), resist patterns can be obtained in the same manner as in the above-described method. As the etching, it is possible to apply etching and resist peeling using the well-known method described in Paragraphs 0048 to 0054 of JP2010-152155A.

Examples of the method for etching include ordinarily-performed wet-etching methods in which subjects are immersed in etching fluids. As the etching fluid used for wet-etching, an acidic-type etching fluid or an alkali-type etching fluid may be appropriately selected depending on etching subjects. Examples of the acidic-type etching fluid include aqueous solutions of a single acidic component such as hydrochloric acid, sulfuric acid, hydrofluoric acid, or phosphoric acid, mixed aqueous solutions of an acidic component and a salt such as iron (III) chloride, ammonium fluoride, or potassium permanganate, and the like. As the acidic component, a component obtained by combining a plurality of acidic components may be used. In addition, examples of the alkali-type etching fluid include aqueous solution of a single alkali component such as a salt of an organic amine such as sodium hydroxide, potassium hydroxide, ammonia, an organic amine, or tetramethyl ammonium hydroxide, mixed aqueous solutions of an alkali component and a salt such as potassium permanganate, and the like. As the alkali component, a component obtained by combining a plurality of alkali components may be used.

The temperature of the etching fluid is not particularly limited, but is preferably 45° C. or lower. In the present invention, a resin pattern that is used as an etching mask (etching pattern) is formed using the above-described photocurable resin layer and thus exhibit particularly excellent resistance to acidic and alkaline etching fluids in the above-described temperature range. Therefore, the peeling of the resin pattern during the etching step is prevented, and portions free of the resin pattern are selectively etched.

After the etching, a washing step and a drying step may be carried out as necessary in order to prevent line contamination. In the washing step, for example, the temporary base material is washed for 10 to 300 seconds with pure water at normal temperature, and the drying step may be carried out by appropriately adjusting the air blow pressure (approximately 0.1 to 5 kg/cm$^2$) using an air blow.

Next, the method for peeling the resin pattern is not particularly limited, and examples thereof include a method in which the temporary base material is immersed in a peeling fluid under stirring for 5 to 30 minutes at 30° C. to 80° C. and preferably at 50° C. to 80° C. The resin pattern that is used as the etching mask in the present invention exhibits excellent chemical resistance at 45° C. or lower as described above, but exhibits a property of being swollen by alkaline peeling fluids in a case in which the chemical temperature reaches 50° C. or higher. Due to the above-described properties, when the peeling step is carried out using a peeling fluid of 50° C. to 80° C., there is an advantage that the step time is shortened and the amount of the peeling residue of the resin pattern decreases. That is, when a difference is caused in the chemical temperature between the etching step and the peeling step, the resin pattern that is used as the etching mask in the present invention exhibits favorable chemical resistance in the etching step and also exhibits a favorable peeling property in the peeling step, whereby both conflicting characteristics such as the chemical resistance and the peeling property can be satisfied.

Examples of the peeling fluid include peeling fluids obtained by dissolving an inorganic alkali component such as sodium hydroxide or potassium hydroxide or an organic alkali component such as a tertiary amine or a quaternary ammonium salt in water, dimethyl sulfoxide, N-methyl pyrrolidone, or a mixed solution thereof. The resin pattern may be peeled using the above-described peeling fluid and a spray method, a shower method, a puddle method, or the like.

—Photosensitive Film Having Conductive Photocurable Resin Layer—

In a case in which the first transparent electrode pattern 3, the second transparent electrode pattern 4, and the additional conductive element 6 are formed using the photosensitive film having a conductive photocurable resin layer, the first transparent electrode pattern, the second transparent electrode pattern, and the additional conductive element can be formed by transferring the conductive photocurable resin layer to the surface of the transparent substrate 1 which is the front plate.

In a case in which the first transparent electrode pattern 3 and the like are formed using the photosensitive film having a conductive photocurable resin layer, even in the transparent substrate (the front plate) having an opening portion, resist components do not leak or protrude through the opening portion, the rear side of the substrate is not contaminated, and it becomes possible to manufacture touch panels having advantages of thickness reduction and weight reduction with simple steps.

Furthermore, when the photosensitive film having a specific layer constitution in which the thermoplastic resin layer is provided between the conductive photocurable resin layer and the temporary base material is used to form the first transparent electrode pattern 3 and the like, it is possible to prevent the generation of air bubbles during the lamination of the photosensitive film and form the first transparent electrode pattern 3, the second transparent electrode pattern 4, and the additional conductive element 6 which have excellent conductivity and small resistance.

—Use of Photosensitive Film as Liftoff Material—

In addition, it is also possible to form the first transparent electrode layer, the second transparent electrode layer, and other conductive members using the photosensitive film as a liftoff material.

In this case, desired transparent conductive layer patterns can be obtained by carrying out patterning using the photosensitive film, then, forming the transparent conductive layer on the entire surface of the temporary base material, and then dissolving and removing the photocurable resin layer from each of the laminated transparent conductive layers (a liftoff method).

[Image Display Device]

An image display device of the present invention comprises the electrostatic capacitance-type input device of the present invention.

To the electrostatic capacitance-type input device of the present invention and image display devices comprising this electrostatic capacitance-type input device as a constituent element, it is possible to apply the constitution disclosed by "Advanced touch panel technology" (published by Techno Times Co., Ltd. on Jul. 6, 2009), "Technology and development of touch panels" edited by Yuji Mitani, CMC Publishing Co., Ltd. (December 2004), FPD International 2009 Forum T-11 lecture textbook, Cypress Semiconductor Corporation application note AN2292, and the like.

EXAMPLES

Hereinafter, the present invention will be more specifically described using examples. Materials, amounts used, ratios, processing contents, processing orders, and the like described in the following examples can be appropriately modified within the scope of the gist of the present invention. Therefore, the scope of the present invention is not limited to specific examples described below. Meanwhile, unless particularly otherwise described, "parts" are mass-based.

Example 1

<Production of Transfer Film>
(Formation of First Curable Transparent Resin Layer)
A coating fluid for a first curable transparent resin layer made of Formulation 101 was applied in an adjusted manner onto a 75 μm-thick polyethylene terephthalate film (temporary support) using slit-shaped nozzles so as to obtain a film having a thickness after drying of 10 μm, and the film was dried at 100° C. for two minutes and further dried at 120° C. for one minute, thereby forming a first curable transparent resin layer.
—Coating Fluid for First Curable Transparent Resin Layer: Formulation 101 (Organic Solvent-Based)—

| | |
|---|---|
| 1-Methoxy-2-propyl acetate | 35.00 parts |
| Methyl ethyl ketone | 25.33 parts |
| Tricyclodecane dimethanol diacrylate A-DCP: manufactured by Shin-Nakamura Chemical Co., Ltd. | 5.00 parts |
| Urethane acrylate U-15HA: manufactured by Shin-Nakamura Chemical Co., Ltd. | 2.50 parts |
| Polymer 1 | 32.00 parts |

Structural Formula P-25 having the following structure described in Paragraph "0061" of JP2008-146018A: weight-average molecular weight of 35,000, solid content of 45%, 15% of 1-methoxy-2-propyl acetate, 40% of 1-methoxy-2-propanol

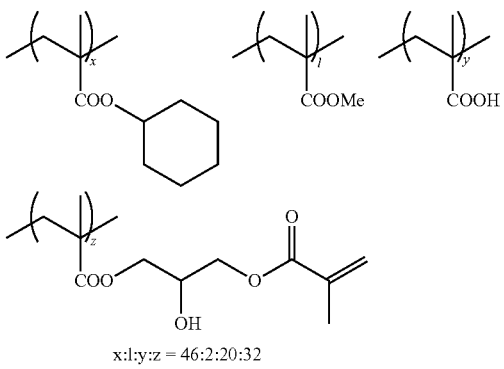

| | |
|---|---|
| Photopolymerization initiator Irgacure OXE-01: manufactured by BASF | 0.15 parts |
| Surfactant containing a fluorine atom (fluorine-based surfactant) | 0.02 parts |

Compound represented by Structural Formula (3): weight-average molecular weight of 15,000, solid content of 30%, 70% of methyl ethyl ketone

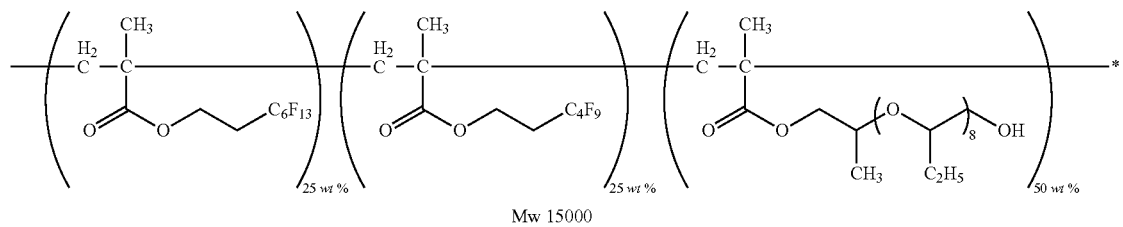

Meanwhile, "wt %" in the specification is identical to "% by mass".
(Formation of Second Transparent Resin Layer)
Next, a coating fluid for a second transparent resin layer made of Formulation 201 was applied in an adjusted manner onto the first curable transparent resin layer so as to obtain a film having a thickness after drying of 100 nm, and the film was dried at 80° C. for one minute and further dried at 110° C. for one minute, thereby forming a second transparent resin layer disposed in direct contact with the first curable transparent resin layer. Here, Formulation 201 was prepared using a resin having an acidic group and ammonia water, the resin having an acidic group was neutralized with the ammonia aqueous solution, and the coating fluid for a second transparent resin layer which was a water-based resin composition including an ammonium salt of the resin having an acidic group was prepared. The amount (parts by mass) of water added to the coating fluid for a second transparent resin layer refers to the total amount of water added to the coating fluid in a case in which the total amount of water and other solvents are set to 100 parts by mass, and, for example, in Example 1, the amount of water added, including water in 8.00 parts by mass of 2.5% ammonia water, was set to 40 parts by mass from the following calculation expression.

$$100\times\{31.08+8.00\times(100-2.5)/100\}/\{31.08+8.00\times(100-2.5)/100+54.14+6.00\times(100-30.5)/100\}=40$$

The calculated amounts of water added are shown in Table 2.

In addition, in Table 2, "Structure of resin" indicates that the coating fluid for a second transparent resin layer includes one of resins having the following structures. The resin that is used in the coating fluid for a second transparent resin layer are preferably Structure A or Structure C and more preferably Structure A.

Structure A . . . Water-based resin that is an ammonium salt of a polymer having an acidic group Structure B . . . Organic solvent-based resin Structure C . . . Water-based resin that is not an ammonium salt since the resin does not have an acidic group —Coating Fluid for Second Transparent Resin Layer: Formulation 201—

| | |
|---|---|
| Distilled water | 31.08 parts |
| Ammonia water (2.5%) | 8.00 parts |
| Acrylic resin | 0.70 parts |
| Copolymer resin of methacrylic acid/allyl methacrylate, Structure A, weight-average molecular weight: 25,000, compositional ratio (molar ratio) = 40/60, solid content: 99.8% | |
| Acrylamide monomer | 0.07 parts |
| Compound represented by Structural Formula 1 | |
| Water-soluble photopolymerization initiator | 0.01 parts |
| Irgacure 2959: manufactured by BASF | |
| Methanol | 54.14 parts |
| $ZrO_2$ particles | 6.00 parts |
| NANOUSE OZ-S30M: manufactured by Nissan Chemical Industries, Ltd. | |
| Particles having a solid content of 30.5%, 69.5% of methanol, a refractive index of 2.2, and an average particle diameter of approximately 12 nm | |

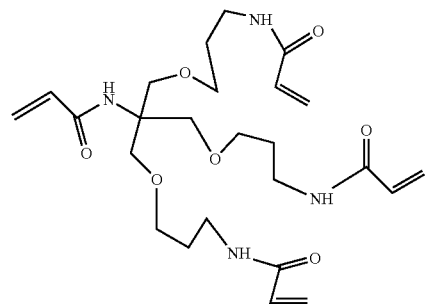 [SMILES: C=CC(=O)NCCCOCC(COCCCNC(=O)C=C)(COCCCNC(=O)C=C)NC(=O)C=C]

Structural Formula 1

In a laminate provided with the first curable transparent resin layer and the second transparent resin layer disposed in direct contact with the first curable transparent resin layer, which had been obtained in the above-described manner, in this order on the temporary support, finally, a protective film (12 μm-thick polypropylene film) was pressed on the second transparent resin layer, thereby producing a transfer film of Example 1.

Comparative Example 1

A transfer film of Comparative Example 1 was produced in the same manner as in Example 1 except for the fact that, in Example 1, $ZrO_2$ particles added to the coating fluid for a second transparent resin layer were replaced by the same parts by mass of an acrylic resin (that is, a copolymer resin of methacrylic acid/allyl methacrylate, weight-average molecular weight: 25,000, compositional ratio=40/60, solid content: 99.8%).

Comparative Example 2

A transfer film of Comparative Example 2 was produced in the same manner as in the production of the transfer film of Example 1 except for the fact that, in Example 1, the coating fluid for a second transparent resin layer was replaced by a coating fluid for a second transparent resin layer of Formulation 202.

—Coating Fluid for Second Transparent Resin Layer: Formulation 202 (Organic Solvent-Based)—

| | |
|---|---|
| 1-Methoxy-2-propyl acetate | 32.35 parts |
| Methyl ethyl ketone | 60.00 parts |
| Polymer 1 | 1.55 parts |

A resin having Structural Formula P-25 described in Paragraph "0061" of JP2008-146018A, Structure B: weight-average molecular weight of 35,000, solid content of 45%, 15% of 1-methoxy-2-propyl acetate, 40% of 1-methoxy-2-propanol

| | |
|---|---|
| Acrylic monomer | 0.07 parts |
| Dipentaerythritol hexaacrylate: manufactured by Shin-Nakamura Chemical Co., Ltd., solid content of 76%, 24% of 1-methoxy-2-propyl acetate | |
| Urethane monomer | 0.03 parts |
| NK OLIGO UA-32P: manufactured by Shin-Nakamura Chemical Co., Ltd., solid content of 75%, 25% of 1-methoxy-2-propyl acetate | |
| Photopolymerization initiator | 0.01 parts |
| Irgacure 379: manufactured by BASF | |
| $ZrO_2$ particles | 6.00 parts |
| (ZR-010: manufactured by Solar Co., Ltd., methyl ethyl ketone was contained as the solvent, particle-containing proportion: 30% by mass, volume-average particle diameter: 15 nm) | |

Examples 3 to 19 and Comparative Examples 3 to 5

Transfer films of individual examples and individual comparative examples were produced in the same manner as in the production of the transfer film of Example 1 except for the fact that, in the production of the transfer film of Example 1, the formulation or drying temperature condition of the coating fluid for a first curable transparent resin layer or the coating fluid for a second transparent resin layer was changed as shown in Table 2.

Example 20

A transfer film of Example 20 was produced in the same manner as in the production of the transfer film of Example 1 except for the fact that, in the production of the transfer film of Example 1, the acrylic resin included in the coating fluid for a second transparent resin layer was changed to a water-based resin.

Cellulose resin, Structure C, trade name: HPC-L (manufactured by Nippon Soda Co., Ltd.)

Example 21

A transfer film of Example 21 was produced in the same manner as in the production of the transfer film of Example 1 except for the fact that, in the production of the transfer film of Example 1, the acrylic resin included in the coating fluid for a second transparent resin layer was changed to the following acrylic resin.

Acrylic Resin

Copolymer resin of methacrylic acid/methyl methacrylate, Structure A, weight-average molecular weight: 15,000, compositional ratio=40/60, solid content: 99.8%

Example 22

A transfer film of Example 22 was produced in the same manner as in the production of the transfer film of Example 1 except for the fact that, in the production of the transfer film of Example 1, the acrylic resin included in the coating fluid for a second transparent resin layer was changed to the following acrylic resin.

Acrylic Resin

Copolymer resin of methacrylic acid/benzyl methacrylate, Structure A, weight-average molecular weight: 30,000, compositional ratio=30/70, solid content: 99.8%

[1. Characteristics of Transfer Film]

<Characteristics of Refractive Index and Thickness of Second Transparent Resin Layer>

$n_1$, $n_2$, $T_2$, $\sigma_2$, and $H_2$ were obtained as described below using a thickness monitor FE-3000 (manufactured by Otsuka Electronics Co., Ltd.).

(1) A Laminate was Produced by Adhering PT100 NB (Manufactured by Lintec Corporation) which was a black polyethylene terephthalate (PET) material to one surface of the temporary support that was used in each of the examples and the comparative examples, which had been cut into vertical and horizontal lengths of 10 cm×10 cm, through transparent adhesive tape (OCA tape 8171CL: manufactured by The 3M Company). The reflection spectrum (wavelength: 430 to 800 nm) of the laminate of the temporary support and the black PET was evaluated using a thickness monitor FE-3000, and the refractive indexes no of the temporary support at the respective wavelengths were obtained.

(2) A laminate was produced by bringing a black PET material into contact with the temporary support surface of a sample which had been cut into vertical and horizontal lengths of 10 cm×10 cm and obtained by forming only the first curable transparent resin layer on the temporary support in the same manner as in the respective examples and the respective comparative examples through transparent adhesive tape (OCA tape 8171CL: manufactured by The 3M Company). The structure of the laminate of the first curable transparent resin layer, the temporary support, and the black PET was analyzed using a transmission electron microscope (TEM: HT7700, manufactured by Hitachi High-Tech Fielding Corporation). The thicknesses of the first curable transparent resin layer were measured at ten points, the average value thereof was obtained, and the first estimation value $T_1$ (I) of the average value of the thickness of the first curable transparent resin layer was obtained. The reflection spectrum (wavelength: 430 to 800 nm) of the laminate of the first curable transparent resin layer, the temporary support, and the black PET was evaluated using a thickness monitor FE-3000 manufactured by Otsuka Electronics Co., Ltd., and the refractive indexes $n_1$ of the first curable transparent resin layer at the respective wavelengths and the second estimation value $T_1$ (II) of the average value of the thickness of the first curable transparent resin layer were obtained, and the refractive index $n_1$ of the first curable transparent resin layer at a wavelength of 550 nm was described in the following table. At this time, since reflection in the interface between the first curable transparent resin layer and the temporary support is taken into account, the values of the refractive index no of the temporary support obtained in the section (1) and the first estimation value $T_1$ (I) of the average value of the thickness of the first curable transparent resin layer were input into thickness calculation software embedded into FE3000, and then the refractive index $n_1$ of the first curable transparent resin layer and the second estimation value $T_1$ (II) of the average value of the thickness of the first curable transparent resin layer were obtained from the reflection spectrum of the laminate of the first curable transparent resin layer, the temporary support, and the black PET by means of simulation calculation and fitting.

(3) A sample piece was produced by bringing a black PET material into contact with the surface of the temporary support, which had been cut into vertical and horizontal lengths of 10 cm×10 cm, of the transfer film of each of the examples and the comparative examples, from which the protective film had been peeled off, through transparent adhesive tape (OCA tape 8171CL: manufactured by The 3M Company). The structure of the sample specimen was analyzed using a transmission electron microscope (TEM), the thicknesses of the second transparent resin layer were measured at ten points, the average value thereof was obtained, and the estimation value $T_2$ (I) of the average value of the thickness of the second transparent resin layer was obtained. The reflection spectra of the sample specimen were evaluated at 200 measurement points which had a diameter of 40 µm and were arrayed at intervals of 0.2 mm along a straight line in an arbitrary direction (that is, 4 cm long) using a thickness monitor FE-3000, and this evaluation was repeated at a total of 1,000 points which were evenly distributed in five lines disposed at intervals of 1 cm in a direction orthogonal to the above-described straight line direction. At this time, reflection in the interface between the first curable transparent resin layer and the temporary support and reflection in the interface between the first curable transparent resin layer and the second transparent resin layer are taken into account. Therefore, in a state in which the refractive index no of the temporary support obtained in the section (1), the refractive index nm of the first curable transparent resin layer obtained in the section (2), the second estimation value $T_1$ (II) of the average value of the thickness of the first curable transparent resin layer, and the estimation value $T_2$ (I) of the average value of the thickness of the second transparent resin layer were input into a calculation expression, the refractive index $n_2$ of the second transparent resin layer and the thicknesses of the first curable transparent resin layer and the second transparent resin layer at the 1,000 measurement points were obtained from the reflection spectrum of the laminate of the second transparent resin layer, the first curable transparent resin layer, the temporary support, and the black PET by means of simulation calculation and fitting. Furthermore, the average values, the maximum values, the minimum values, and the standard deviations of the thicknesses of the first curable transparent resin layer and the second transparent resin layer were computed, thereby obtaining $n_1$, $n_2$, $T_1$, $T_2$, $\sigma_2$, and $H_2$.

For the thickness of the first curable transparent resin layer and the thickness of the second transparent resin layer, it is possible to increase the fitting accuracy of simulation by inputting the estimation values obtained by analyzing the structures using TEM into the thickness monitor.

$X_2$ was computed by analyzing the measurement results of one 4 cm-long sample specimen as in FIG. 17 and FIG. 9, respectively counting the numbers of the portions 41 in which the thickness of the second transparent resin layer was thicker than the average thickness $T_2$ of the second transparent resin layer and the portions 42 in which the thickness of the second transparent resin layer is thinner than the average thickness $T_2$ of the second transparent resin layer from the average thickness $T_2$ of the second transparent resin layer and the thicknesses at the respective measurement points, obtaining the sum thereof, and averaging the total of the five lines. The 4 cm length of the 4 cm-long sample specimen was the length in a direction parallel to the surface of the first curable transparent resin layer in the vertical cross-section of the sample.

[2. Evaluation of Transparent Laminate]

<Production of Transparent Laminate>

(Production of Transparent Electrode Pattern Film Used for Production of Transparent Laminate)

—Formation of Transparent Film—

A corona discharge treatment was carried out for three seconds on a 38 μm-thick cycloolefin resin film having a refractive index of 1.53 using a high-frequency oscillator and a wire electrode having a diameter of 1.2 mm at an output voltage of 100% and an output of 250 W under conditions of an electrode length of 240 mm and a distance between working electrodes of 1.5 mm, thereby reforming the surface. The obtained film was used as a transparent film substrate.

Next, each of Material-C shown in Table 1 was applied onto the transparent film substrate using slit-shaped nozzles, irradiated with ultraviolet rays (at an integral of light of 300 mJ/cm$^2$), and dried at approximately 110° C., thereby forming an 80 nm-thick transparent film having a refractive index of 1.60.

using slit-shaped nozzles. Next, a coating fluid for an interlayer made of Formulation P1 was applied and dried. Furthermore, a coating fluid for a photocurable resin layer for etching made of Formulation E1 was applied and dried. A laminate having a thermoplastic resin layer having a dried thickness of 15.1 μm, an interlayer having a dried thickness of 1.6 μm, and a photocurable resin layer for etching having a thickness of 2.0 μm on the temporary base material was obtained in the above-described manner, and, finally, a protective film (12 μm-thick polypropylene film) was pressed thereto. Therefore, a photosensitive film for etching E1 which was a transfer material in which the temporary base material, the thermoplastic resin layer, the interlayer (oxygen-blocking film), and the photocurable resin layer for etching were integrated together was produced.

——Coating Fluid for Photocurable Resin Layer for Etching: Formulation E1——

Methyl methacrylate/styrene/methacrylic acid copolymer (copolymer composition (% by mass): 31/40/29, weight-average molecular weight of 60,000, acid value: 163 mgKOH/g): 16.0 parts by mass Monomer 1 (trade name: BPE-500, manufactured by Shin-Nakamura Chemical Co., Ltd.): 5.6 parts by mass Adduct of hexamethylene diisocyanate and 0.5 mol of tetraethylene oxide monomethacrylate: 7.0 parts by mass

TABLE 1

| Materials | Material-C |
|---|---|
| $ZrO_2$: ZR-010 manufactured by Solar Co., Ltd. | 2.08 |
| DPHA liquid (dipentaerythritol hexaacrylate: 38%, dipenaerythritol pentaacrylate: 38%, 1-methoxy-2-propylacetate: 24%) | 0.29 |
| Urethane-based monomer: NK OLIGO UA-32P manufactured by Shin-Nakamura Chemical Co., Ltd.: nonvolatile component: 75%, 1-methoxy-2-propylacetate: 25% | 0.14 |
| Monomer mixture (polymerizable compound (b2-1) described in Paragraph "0111" of JP2012-78528A, n = 1: content ratio of tripentaerythritol octaacrylate of 85%, the sum of n = 2 and n = 3 as impurities is 15%) | 0.36 |
| Polymer solution 1 (Structural Formula P-25 described in Paragraph "0058" of JP2008-146018A: weight-average molecular weight = 35,000, solid content 45%, 15% of 1-methoxy-2-propyl acetate, 40% of 1-methoxy-2-propanol) | 1.89 |
| Photoradical polymerization initiator: 2-benzyl-2-dimethylamino-1-(4-morpholinophenyl)-butanone (Irgacure 379, manufactured by BASF) | 0.03 |
| Photopolymerization initiator: KAYACURE DETX-S (alkyl thioxanthone manufactured by Nippon Kayaku Co., Ltd.) | 0.03 |
| Polymer solution 2 (compound represented by (Structural Formula (3): weight-average molecular weight = 15,000, nonvolatile component = 30 wt %, methyl ethyl ketone = 70 wt %) | 0.01 |
| 1-Methoxy-2-propyl acetate | 38.73 |
| Methyl ethyl ketone | 56.8 |
| Total (parts by mass) | 100 |

—Formation of Transparent Electrode Layer—

The transparent film substrate on which the transparent film had been formed was introduced into a vacuum chamber, and a 40 nm-thick ITO thin film having a refractive index of 1.82 was formed using an ITO target (indium: tin=95:5 (molar ratio)) in which the content ratio of $SnO_2$ was 10% by mass by means of DC magnetron sputtering (conditions: the temperature of the transparent film substrate was 150° C., the argon pressure was 0.13 Pa, and the oxygen pressure was 0.01 Pa), thereby obtaining a film having the transparent film and the transparent electrode layer on the transparent film substrate. The surface electrical resistance of the ITO thin film was 80Ω/☐ (Ω per square).

—Preparation of Photosensitive Film for Etching E1 —

A coating fluid for a thermoplastic resin layer made of Formulation H1 was applied and dried on a 75 μm-thick polyethylene terephthalate film temporary base material Cyclohexane dimethanol monoacrylate as a compound having one polymerizable group in the molecule: 2.8 parts by mass 2-Chloro-N-butylacridone: 0.42 parts by mass 2,2-Bis(orthochlorophenyl)-4,4',5,5'-tetraphenyl biimidazole: 2.17 parts by mass Malachite green oxalate: 0.02 parts by mass Leuco crystal violet: 0.26 parts by mass Phenothiazine: 0.013 parts by mass Surfactant (trade name: MEGAFACE F-780F, manufactured by DIC Corporation): 0.03 parts by mass Methyl ethyl ketone: 40 parts by mass 1-Methoxy-2-propanol: 20 parts by mass Meanwhile, the viscosity of the coating fluid for a photocurable resin layer for etching E1 after the removal of the solvent at 100° C. was 2,500 Pa-sec.

——Coating Fluid for Thermoplastic Resin Layer: Formulation H1——
Methanol: 11.1 parts by mass
Propylene glycol monomethyl ether acetate: 6.36 parts by mass
Methyl ethyl ketone: 52.4 parts by mass
Methyl methacrylate/2-ethylhexyl acrylate/benzyl methacrylate/methacrylic acid copolymer (copolymerization compositional ratio (molar ratio)=55/11.7/4.5/28.8, weight-average molecular weight=100,000, Tg ≈70° C.): 5.83 parts by mass
Styrene/acrylic acid copolymer (copolymerization compositional ratio (molar ratio)=63/37, weight-average molecular weight=10,000, Tg ≈100° C.): 13.6 parts by mass
Monomer 1 (trade name: BPE-500, manufactured by Shin-Nakamura Chemical Co., Ltd.): 9.1 parts by mass
Fluorine-based polymer: 0.54 parts by mass The fluorine-based polymer is a copolymer of 40 parts of $C_6F_{13}CH_2CH_2OCOCH=CH_2$, 55 parts of $H(OCH(CH_3)CH_2)_7OCOCH=CH_2$, and 5 parts of $H(OCH_2CH_2)_7OCOCH=CH_2$ and a solution of 30% by mass of methyl ethyl ketone having a weight-average molecular weight of 30,000 (trade name: MEGAFACE F780F, manufactured by DIC Corporation).

——Coating Fluid for Interlayer: Formulation P1——
Polyvinyl alcohol: 32.2 parts by mass
(trade name: PVA205, manufactured by Kuraray Co., Ltd., degree of saponification=88%, degree of polymerization 550)
Polyvinyl pyrrolidone: 14.9 parts by mass
(trade name: K-30, manufactured by ISB Corporation)
Distilled water: 524 parts by mass
Methanol: 429 parts by mass —Formation of Transparent Electrode Pattern—

The film having the transparent film and the transparent electrode layer formed on the transparent film substrate was washed, and the photosensitive film for etching E1 from which the protective film had been removed was laminated so that the surface of the transparent electrode layer and the surface of the photocurable resin layer for etching faced each other (the temperature of the transparent film substrate: 130° C., the rubber roller temperature: 120° C., the linear pressure: 100 N/cm, and the transportation rate: 2.2 m/minute). After the peeling of the temporary base material, the thermoplastic resin layer and the interlayer were transferred to the surface of the transparent electrode layer together with the photocurable resin layer for etching. The distance between an exposure mask (a silica exposure mask having a transparent electrode pattern) and the photocurable resin layer for etching was set to 200 μm, and the photocurable resin layer for etching was pattern-exposed at an exposure amount of 50 mJ/cm² (i rays) through the thermoplastic resin layer and the interlayer.

Next, a development treatment was carried out at 25° C. for 100 seconds using a triethanolamine-based developer (containing 30% by mass of triethanolamine, a liquid obtained by diluting T-PD2 (trade name, manufactured by Fujifilm Corporation) with pure water ten times), the thermoplastic resin layer and the interlayer were dissolved, and a washing treatment was carried out at 33° C. for 20 seconds using a surfactant-containing washing liquid (a liquid obtained by diluting T-SD3 (trade name, manufactured by Fujifilm Corporation) with pure water ten times). Pure water was sprayed from ultrahigh-pressure washing nozzles, residues on the thermoplastic resin layer were removed using a rotary brush, and furthermore, a post-baking treatment was carried out at 130° C. for 30 minutes, thereby obtaining a film having the transparent film, the transparent electrode layer, and a photocurable resin layer pattern for etching formed on the transparent film substrate.

The film having the transparent film, the transparent electrode layer, and the photocurable resin layer pattern for etching formed on the transparent film substrate was immersed in an etching tank filled with an ITO etchant (an aqueous solution of hydrochloric acid and potassium chloride, liquid temperature: 30° C.) and treated for 100 seconds (etching treatment), and the transparent electrode layer in exposed regions which were not covered with the photocurable resin layer for etching was dissolved and removed, thereby obtaining a transparent electrode-patterned film including the photocurable resin layer pattern for etching.

Next, the transparent electrode-patterned film including the photocurable resin layer pattern for etching was immersed in a resist peeling tank filled with a resist peeling fluid (N-methyl-2-pyrrolidone, monoethanolamine, the liquid temperature of a surfactant (trade name: SURFYNOL 465, manufactured by Air Products and Chemicals, Inc.): 45° C.) and treated for 200 seconds (peeling treatment), and the photocurable resin layer for etching was removed, thereby obtaining a transparent electrode-patterned film including the transparent film and the transparent electrode pattern formed on the transparent film substrate.

(Production of Transparent Laminate)
—Transfer—

The second transparent resin layer, the first curable transparent resin layer, and the temporary support were transferred in this order to the transparent electrode-patterned film from the transfer film of each of the examples and the comparative examples using the transfer film of each of the examples and the comparative examples from which the protective film had been peeled off so that the second transparent resin layer covered the transparent film and the transparent electrode pattern in the transparent electrode-patterned film in which the transparent film and the transparent electrode pattern were formed on the transparent film substrate, thereby obtaining a laminate (the temperature of the transparent film substrate: 40° C., the rubber roller temperature: 110° C., the linear pressure: 3 N/cm, and the transportation rate: 2 m/minute).

—Photolithography—

After that, the obtained laminate was pattern-exposed using a proximity-type stepper having an ultrahigh-pressure mercury lamp (manufactured by Hitachi High-Tech Fielding Corporation) at a distance between an exposure mask (a silica exposure mask having a pattern for forming an overcoat layer) and the temporary support set to 125 μm and an exposure amount of 100 mJ/cm² (i rays) through the temporary support. After the peeling of the temporary support, a washing treatment was carried out on the pattern-exposed laminate (transparent film substrate) using an aqueous solution of 2% sodium carbonate at 32° C. for 60 seconds. Ultrapure water was sprayed to the washed transparent film substrate from ultrahigh-pressure washing nozzles, thereby removing residues. Subsequently, moisture on the transparent film substrate was removed by blowing air, and a post-basking treatment was carried out at 145° C. for 30 minutes, thereby obtaining a transparent laminate of each of the examples and the comparative examples in which the transparent film, the transparent electrode pattern, the second transparent resin layer disposed in direct contact with the transparent electrode pattern, and the first curable transparent resin layer disposed in direct contact with the second transparent resin layer were continuously provided in this order on the transparent film substrate. Meanwhile, in the regions in which the transparent electrode pattern was absent, the second transparent resin layer was disposed in direct contact with the transparent film. Through the above-described steps, it was confirmed that the transfer film of the present invention has photolithographic properties.

<Evaluation of Transparent Laminate>

(Transparent Electrode Pattern-Masking Properties)

The transparent laminate of each of the examples and the comparative examples in which the transparent film, the transparent electrode pattern, the second transparent resin layer, and the first curable transparent resin layer were continuously provided in this order on the transparent film substrate and a black PET material were made to adhere together through transparent adhesive tape (manufactured by The 3M Company, trade name: OCA tape 8171CL) so that the black PET material and the first curable transparent resin layer were adjacent to each other, thereby producing a substrate for evaluation which was fully blocked from light.

In a dark room, light was incident on the transparent film substrate surface side of the substrate for evaluation using a fluorescent lamp (light source) and the produced substrate for evaluation, reflected light from the surface of the transparent film substrate on which light was incident was visually observed at an inclined angle, and transparent electrode pattern-masking properties were evaluated on the basis of the following evaluation standards.

—Evaluation Standards—

A: The transparent electrode pattern was not observed.

B: The transparent electrode pattern was observed.

The obtained results are shown in Table 2. The transparent electrode pattern-masking properties are practically required to be A.

(Color Unevenness)

The transparent laminate of each of the examples and the comparative examples and a black PET material were made to adhere together through transparent adhesive tape (manufactured by The 3M Company, trade name: OCA tape 8171CL) so that the black PET material and the transparent film substrate were adjacent to each other, thereby producing a substrate for evaluation which was fully blocked from light.

Light was incident on the first curable transparent resin layer side, and reflected light from the surface of the first curable transparent resin layer was visually observed at an inclined angle, thereby evaluating color unevenness.

—Evaluation Standards—

5 Point: Color unevenness was not observed.

4 Point: Color unevenness was slightly, but barely observed.

3 Point: Color unevenness was observed, but practically permissible.

2 Point: Color unevenness was clearly observed in some parts.

1 Point: Color unevenness was clearly observed in all parts.

The obtained results are shown in Table 2. The color unevenness needs to be practically evaluated at a level of 5 point, 4 point, or 3 point and is preferably evaluated at a level of 5 point or 4 point, and more preferably evaluated at a level of 5 point.

(Adhesiveness)

In a case in which eleven 1 mm-wide incisions, which extended up to a depth reaching the first curable transparent resin layer and the second transparent resin layer from the first curable transparent resin layer side, were vertically and horizontally provided in the transparent laminate of each of the examples and the comparative examples according to JIS K 5600-5-6 (JIS stands for Japanese Industrial Standards) and ISO2409 (a cross-cut method; ISO stands for International Organization for Standardization) so as to form 100 lattice form film specimens, and cellophane tape was attached onto the first curable transparent resin layer and then peeled off, whether or not the film specimens including the components of the first curable transparent resin layer and the second transparent resin layer were peeled off was observed. That is, adhesiveness between the second transparent resin layer and the transparent electrode pattern was evaluated using the following standards.

—Evaluation Standards—

5 Point: The film specimens of the first curable transparent resin layer and the second transparent resin layer were not peeled off, and adhesion was at an extremely favorable level.

4 Point: The first curable transparent resin layer and the second transparent resin layer were finely peeled off only at the incision edges, but the surface portions of the film specimens were not peeled off, and adhesion was at a favorable level.

3 Point: The film specimens of the first curable transparent resin layer and the second transparent resin layer were peeled off, and peeling was observed in more than 0% and less than 2% of the total film specimens.

2 Point: The film specimens of the first curable transparent resin layer and the second transparent resin layer were peeled off, and peeling was observed in 2% or more and less than 5% of the total film specimens.

1 Point: The film specimens of the first curable transparent resin layer and the second transparent resin layer were peeled off, and peeling was observed in 5% or more of the total film specimens.

The obtained results are shown in Table 2. The adhesiveness is preferably evaluated at a level of 5 point, 4 point, or 3 point, more preferably evaluated at a level of 5 point or 4 point, and particularly preferably at a level of 5 point.

(Moisture-Heat Resistance)

The transparent laminate of each of the examples and the comparative examples was heated at 150° C. for ten minutes and then left to stand in a constant temperature and humidity tank of 85° C. and a relative humidity of 85% for 24 hours. Transmitted light and reflected light were observed visually and using an optical microscope from the second transparent resin layer before and after the test and were evaluated in the following manner.

—Evaluation Standards—

A: No changes were observed on the film surface before and after the test.

B: The film surface became slightly white-turbid after the test.

C: The state of the film surface was significantly changed and became white-turbid before and after the test.

The obtained results are shown in Table 2. The moisture-heat resistance is preferably evaluated as A or B and more preferably evaluated as A.

TABLE 2

| | Second transparent resin layer Coating fluid | | | | | First curable transparent resin layer Coating fluid | | | | Characteristics of transfer film Refractive index | |
|---|---|---|---|---|---|---|---|---|---|---|---|
| | Resin structure [—] | Concentration of solid content [%] | Amount of water added [Parts by mass] | Drying temperature Step 1 [°C.] | Drying temperature Step 2 [°C.] | Percentage of solid content of surfactant [%] | Concentration of solid content [%] | Drying temperature Step 1 [°C.] | Drying temperature Step 2 [°C.] | $n_1$ [—] | $n_2$ [—] |
| EXAMPLE 1 | A | 2.6 | 40 | 80 | 110 | 0.03 | 22.1 | 100 | 120 | 1.51 | 1.65 |
| COMPARATIVE EXAMPLE 1 | A | 2.6 | 40 | 80 | 110 | 0.03 | 22.1 | 100 | 120 | 1.51 | 1.51 |
| COMPARATIVE EXAMPLE 2 | B | 2.6 | 0 | 80 | 110 | 0.03 | 22.1 | 100 | 120 | 1.51 | 1.60 |
| COMPARATIVE EXAMPLE 3 | A | 3.5 | 20 | 110 | 120 | 0.00 | 25.0 | 120 | 130 | 1.51 | 1.62 |
| COMPARATIVE EXAMPLE 4 | A | 3.2 | 25 | 100 | 120 | 0.00 | 25.0 | 120 | 130 | 1.51 | 1.62 |
| COMPARATIVE EXAMPLE 5 | A | 3.0 | 30 | 100 | 120 | 0.00 | 25.0 | 120 | 130 | 1.51 | 1.62 |
| EXAMPLE 2 | A | 1.8 | 50 | 70 | 100 | 1.00 | 18.0 | 80 | 110 | 1.51 | 1.68 |
| EXAMPLE 3 | A | 3.0 | 40 | 90 | 110 | 0.01 | 22.1 | 110 | 120 | 1.51 | 1.65 |
| EXAMPLE 4 | A | 2.3 | 40 | 70 | 110 | 0.50 | 22.1 | 90 | 120 | 1.51 | 1.65 |
| EXAMPLE 5 | A | 2.8 | 40 | 80 | 110 | 0.02 | 22.1 | 100 | 120 | 1.51 | 1.65 |
| EXAMPLE 6 | A | 2.4 | 40 | 80 | 110 | 0.30 | 22.1 | 100 | 120 | 1.51 | 1.65 |
| EXAMPLE 7 | A | 2.6 | 30 | 90 | 110 | 0.02 | 22.1 | 110 | 130 | 1.51 | 1.63 |
| EXAMPLE 8 | A | 2.6 | 50 | 70 | 110 | 0.40 | 22.1 | 90 | 110 | 1.51 | 1.67 |
| EXAMPLE 9 | A | 2.6 | 50 | 70 | 110 | 0.30 | 22.1 | 90 | 110 | 1.51 | 1.67 |
| EXAMPLE 10 | A | 2.6 | 50 | 70 | 110 | 0.10 | 22.1 | 90 | 110 | 1.51 | 1.67 |
| EXAMPLE 11 | A | 5.5 | 65 | 110 | 110 | 0.50 | 22.1 | 100 | 120 | 1.51 | 1.65 |
| EXAMPLE 12 | A | 5.0 | 60 | 80 | 110 | 0.50 | 22.1 | 100 | 120 | 1.51 | 1.65 |
| EXAMPLE 13 | A | 4.0 | 50 | 80 | 110 | 0.35 | 22.1 | 100 | 120 | 1.51 | 1.67 |
| EXAMPLE 14 | A | 2.6 | 40 | 70 | 100 | 0.02 | 24.0 | 120 | 120 | 1.51 | 1.64 |
| EXAMPLE 15 | A | 2.6 | 40 | 70 | 100 | 0.02 | 23.0 | 110 | 110 | 1.51 | 1.64 |
| EXAMPLE 16 | A | 2.6 | 40 | 80 | 110 | 0.005 | 22.1 | 100 | 120 | 1.51 | 1.62 |
| EXAMPLE 17 | A | 2.6 | 40 | 80 | 110 | 0.01 | 22.1 | 100 | 120 | 1.51 | 1.65 |
| EXAMPLE 18 | A | 2.6 | 40 | 80 | 110 | 0.50 | 22.1 | 100 | 120 | 1.51 | 1.66 |
| EXAMPLE 19 | A | 2.6 | 40 | 80 | 110 | 0.75 | 22.1 | 100 | 120 | 1.51 | 1.68 |
| EXAMPLE 20 | C | 2.6 | 40 | 80 | 110 | 0.03 | 22.1 | 100 | 120 | 1.51 | 1.65 |
| EXAMPLE 21 | A | 2.6 | 40 | 80 | 110 | 0.03 | 22.1 | 100 | 120 | 1.51 | 1.65 |
| EXAMPLE 22 | A | 2.6 | 40 | 80 | 110 | 0.03 | 22.1 | 100 | 120 | 1.51 | 1.65 |

| | Characteristics of transfer film Characteristics of thickness of second transparent resin layer | | | | | Evaluation of transparent laminate | | | |
|---|---|---|---|---|---|---|---|---|---|
| | $T_2$ [nm] | $\sigma_2$ [nm] | $H_2$ [nm] | $100 \times \sigma_2/T_2$ [%] | $100 \times H_2/T_2$ [%] | $X_2$ [Portions] | Transparent electrode pattern-masking properties [—] | Color unevenness [Point] | Adhesiveness [Point] | Moisture-heat resistance [—] |
| EXAMPLE 1 | 100 | 3.2 | 15 | 3.2 | 15 | 51 | A | 4 | 5 | A |
| COMPARATIVE EXAMPLE 1 | | | Not determinable | | | | B | — | — | — |
| COMPARATIVE EXAMPLE 2 | 100 | 8.0 | 25 | 8.0 | 25 | 150 | A | 1 | 5 | A |
| COMPARATIVE EXAMPLE 3 | 102 | 6.0 | 22 | 5.9 | 22 | 124 | A | 2 | 5 | A |
| COMPARATIVE EXAMPLE 4 | 101 | 5.5 | 17 | 5.4 | 17 | 120 | A | 2 | 5 | A |
| COMPARATIVE EXAMPLE 5 | 101 | 5.3 | 5 | 5.2 | 5 | 105 | A | 2 | 5 | A |
| EXAMPLE 2 | 105 | 0.1 | 1.9 | 0.1 | 1.8 | 2 | A | 5 | 1 | A |
| EXAMPLE 3 | 100 | 4.8 | 19 | 4.8 | 19.0 | 95 | A | 4 | 5 | A |
| EXAMPLE 4 | 98 | 0.2 | 3 | 0.2 | 3.1 | 6 | A | 5 | 3 | A |
| EXAMPLE 5 | 98 | 4.0 | 17 | 4.1 | 17.3 | 74 | A | 4 | 5 | A |
| EXAMPLE 6 | 100 | 2.0 | 7 | 2.0 | 7.0 | 20 | A | 5 | 5 | A |
| EXAMPLE 7 | 95 | 4.5 | 20 | 4.7 | 21.1 | 102 | A | 3 | 5 | A |
| EXAMPLE 8 | 106 | 0.4 | 2 | 0.4 | 1.9 | 2 | A | 5 | 4 | A |
| EXAMPLE 9 | 106 | 2.7 | 2 | 2.5 | 1.9 | 3 | A | 4 | 5 | A |
| EXAMPLE 10 | 103 | 4.2 | 2 | 4.1 | 1.9 | 5 | A | 4 | 5 | A |
| EXAMPLE 11 | 100 | 0.5 | 23 | 0.5 | 23 | 85 | A | 3 | 3 | A |
| EXAMPLE 12 | 100 | 0.5 | 19 | 0.5 | 19 | 85 | A | 4 | 3 | A |
| EXAMPLE 13 | 99 | 1.5 | 13 | 1.5 | 13 | 45 | A | 5 | 4 | A |
| EXAMPLE 14 | 100 | 4.5 | 5 | 4.5 | 5 | 100 | A | 4 | 5 | A |
| EXAMPLE 15 | 100 | 3.7 | 7 | 3.7 | 7 | 72 | A | 4 | 5 | A |

TABLE 2-continued

| | | | | | | | | | | |
|---|---|---|---|---|---|---|---|---|---|---|
| EXAMPLE 16 | 97 | 4.6 | 16 | 4.7 | 16 | 85 | A | 4 | 5 | A |
| EXAMPLE 17 | 100 | 4.2 | 13 | 4.2 | 13 | 64 | A | 4 | 5 | A |
| EXAMPLE 18 | 95 | 2.5 | 10 | 2.6 | 11 | 10 | A | 5 | 3 | A |
| EXAMPLE 19 | 93 | 2.0 | 3 | 2.2 | 3 | 3 | A | 5 | 2 | A |
| EXAMPLE 20 | 100 | 3.0 | 14 | 3.0 | 14 | 48 | A | 4 | 5 | B |
| EXAMPLE 21 | 100 | 3.0 | 15 | 3.0 | 15 | 45 | A | 4 | 5 | A |
| EXAMPLE 22 | 100 | 3.7 | 20 | 3.7 | 20 | 60 | A | 4 | 5 | A |

From the obtained results, it was found that the transfer film of the present invention can be used to form transparent laminates which have favorable transparent electrode pattern-masking properties and allow color unevenness only to a small extent, is capable of transferring two or more transparent resin layers at once, and has photolithographic properties. Particularly, the transfer films of the examples which satisfied Expression 3A, Expression 3B, or Expression 4A allowed color unevenness only to an extremely small extent and were favorable. In addition, the films of the examples which satisfied Expression 2B or Expression 4B or the transfer films of the examples in which the first curable transparent resin layer included 0.01% to 0.5% by mass of the surfactant containing a fluorine atom with respect to the solid content of the first curable transparent resin layer were also excellent in terms of adhesiveness.

On the other hand, it was found that the transfer film of Comparative Example 1 which failed to satisfy Expression 1 had poor transparent electrode pattern-masking properties. It was found that the transfer films of Comparative Examples 2 to 5 which failed to satisfy Expression 2A allowed color unevenness to a great extent.

$n_1$, $n_2$, $T_2$, $\sigma_2$, and $H_2$ in the transparent laminates of the respective examples and the respective comparative examples respectively corresponded to $n_1$, $n_2$, $T_2$, $\sigma_2$, and $H_2$ in the transfer films of the respective examples and the respective comparative examples.

$n_1$, $n_2$, $T_2$, $\sigma_2$, and $H_2$ in the obtained transparent laminates were obtained using a thickness monitor FE-3000 (manufactured by Otsuka Electronics Co., Ltd.) by repeating the same method as for the computation of $n_1$, $n_2$, $T_2$, $\sigma_2$, and $H_2$ in the transfer films of the respective examples and the respective comparative examples for every layer. The outlines will be described below.

(1) In the transparent laminates of the examples and the comparative examples, for the samples having the transparent film substrate, the transparent film, and the transparent electrode pattern laminated in this order, the samples having the transparent film substrate, the transparent film, and the transparent electrode pattern, and the second transparent resin layer laminated in this order, and the like, which had been used in the respective examples and the respective comparative examples, the refractive index of the respective layers and the estimation values of the thicknesses of the respective layers were measured in advance.

(2) A specimen having vertical and horizontal lengths of 5 cm×5 cm was cut out from the five-layer constitution (the transparent film substrate/the transparent film/the transparent electrode pattern/the second transparent resin layer/the first curable transparent resin layer) portion of the transparent laminate, and a black PET material was brought into contact with the specimen through transparent adhesive tape (OCA tape 8171CL: manufactured by The 3M Company), thereby producing a sample specimen. The structure of the specimen sample was analyzed using a transmission electron microscope (TEM), and the estimation values of the thicknesses of the respective layers were obtained. For the sample specimen, the reflection spectra were evaluated at 100 measurement points which had a diameter of 40 µm and were arrayed at intervals of 0.2 mm along a straight line in an arbitrary direction using a thickness monitor FE-3000 (manufactured by Otsuka Electronics Co., Ltd.). At this time, since reflection in the interface between the second transparent resin layer and the transparent electrode pattern and reflection in the interface between the first curable transparent resin layer and the second transparent resin layer are taken into account, in a state in which the refractive indexes of the second transparent resin layer, the transparent film substrate, the transparent film, and the transparent electrode pattern, the estimation value of the average value of the thickness of the first curable transparent resin layer, and the estimation value of the average value of the thickness of the second transparent resin layer were input into a calculation expression, the refractive index $n_1$ of the first curable transparent resin layer, the refractive index $n_2$ of the second transparent resin layer, and the thicknesses of the first curable transparent resin layer and the second transparent resin layer at the 100 measurement points were obtained from the reflection spectrum of the five-layer constitution (the transparent film substrate/the transparent film/the transparent electrode pattern/the second transparent resin layer/ the first curable transparent resin layer) portion by means of simulation calculation and fitting. Furthermore, the average values, the maximum values, the minimum values, and the standard deviations of the thicknesses of the first curable transparent resin layer and the second transparent resin layer were computed, thereby computing $n_1$, $n_2$, $T_1$, $T_2$, $\sigma_2$, and $H_2$. In the present specification, the arbitrary direction is set to a direction parallel to one side of the sample specimen, and the 100 measurement points (that is, 2 cm long) were evenly placed within a range extending 1 cm in the right and left directions from the center of the side of the sample specimen.

$X_2$ was computed by analyzing the measurement results of one 2 cm-long sample specimen on the basis of the description in the present specification and FIGS. 17 and 9, respectively counting the numbers of the portions 41 in which the thickness of the second transparent resin layer was thicker than the average thickness $T_2$ of the second transparent resin layer and the portions 42 in which the thickness of the second transparent resin layer is thinner than the average thickness $T_2$ of the second transparent resin layer from the average thickness $T_2$ of the second transparent resin layer and the thicknesses at the respective measurement points, obtaining the sum thereof, averaging the total of the five lines, and converting the total to a value for 4 cm. The 2 cm length of the 2 cm-long sample specimen was the length in a direction parallel to the surface of the first curable transparent resin layer in the vertical cross-section of the sample.

INDUSTRIAL APPLICABILITY

The transfer film of the present invention has favorable transparent electrode pattern-masking properties and allows color unevenness only to a small extent and thus can be preferably used as a material for touch panels (particularly, electrostatic capacitance-type input devices) or a material for image display devices comprising a touch panel (particularly, an electrostatic capacitance-type input device) as a constituent element. The transfer film of the present invention has photolithographic properties, and thus, in a case in which it is necessary to form desired pattern using the transfer film of the present invention, patterns can be formed by means of photolithography having superior productivity to cutting methods.

EXPLANATION OF REFERENCES

1: transparent substrate
2: mask layer
3: first transparent electrode pattern
3a: pad portion
3b: connection portion
4: transparent electrode pattern (second transparent electrode pattern)
5: insulating layer
6: additional conductive element
7: first curable transparent resin layer (preferably having function of overcoat layer or transparent protective layer)
8: opening portion
10: electrostatic capacitance-type input device
11: transparent film
12: second transparent resin layer (refractive index-adjusting layer, may have function of transparent insulating layer)
13: transparent laminate
21: region in which transparent electrode pattern, second transparent resin layer, and first curable transparent resin layer are laminated in this order
22: non-patterned region
α: taper angle
26: temporary support
29: protective peeling layer (protective film)
30: transfer film
31: terminal portion of guidance wire
33: cured portion of first curable transparent resin layer and second transparent resin layer
34: opening portion corresponding to terminal portion of guidance wire (non-cured portion of first curable transparent resin layer and second transparent resin layer)
41: portion in which thickness of second transparent resin layer is thicker than average thickness $T_2$ of second transparent resin layer
42: portion in which thickness of second transparent resin layer is thinner than average thickness $T_2$ of second transparent resin layer
$H_2$: difference between maximum value and minimum value of thickness of second transparent resin layer
$T_2$: average thickness of second transparent resin layer
C: first direction
D: second direction

What is claimed is:

1. A transfer film comprising in this order:
a temporary support;
a first curable transparent resin layer; and
a second transparent resin layer disposed in direct contact with the first curable transparent resin layer,
wherein Expression 1 and Expression 2A are satisfied, $$n_1 < n_2 \qquad \text{Expression 1:}$$

$$100 \times \sigma_2 / T_2 \leq 5.0 \qquad \text{Expression 2A:}$$

where $n_1$ represents a refractive index of the first curable transparent resin layer, $n_2$ represents a refractive index of the second transparent resin layer, $\sigma_2$ represents a standard deviation of a thickness of the second transparent resin layer, and $T_2$ represents an average thickness of the second transparent resin layer.

2. The transfer film according to claim 1,
wherein Expression 2B is satisfied, $$0.2 \leq 100 \times \sigma_2 / T_2 \qquad \text{Expression 2B:}$$

where $\sigma_2$ represents the standard deviation of the thickness of the second transparent resin layer, and $T_2$ represents the average thickness of the second transparent resin layer.

3. The transfer film according to claim 1,
wherein Expression 3A is satisfied, $$100 \times H_2 / T_2 \leq 20 \qquad \text{Expression 3A:}$$

where $H_2$ represents a difference between a maximum value and a minimum value of the thickness of the second transparent resin layer, and $T_2$ represents the average thickness of the second transparent resin layer.

4. The transfer film according to claim 1,
wherein Expression 3B is satisfied, $$2 \leq 100 \times H_2 / T_2 \qquad \text{Expression 3B:}$$

where $H_2$ represents a difference between a maximum value and a minimum value of the thickness of the second transparent resin layer, and $T_2$ represents the average thickness of the second transparent resin layer.

5. The transfer film according to claim 1,
wherein Expression 4A is satisfied, $$X_2 \leq 100 \qquad \text{Expression 4A:}$$

where $X_2$ represents a sum of the number of portions in which the thickness of the second transparent resin layer is thicker than the average thickness $T_2$ of the second transparent resin layer and the number of portions in which the thickness of the second transparent resin layer is thinner than the average thickness $T_2$ of the second transparent resin layer per 4 cm length in a direction parallel to a surface of the first curable transparent resin layer in a vertical cross-section of the transfer film.

6. The transfer film according to claim 1,
wherein Expression 4B is satisfied, $$3 \leq X_2 \qquad \text{Expression 4B:}$$

where $X_2$ represents a sum of the number of the portions in which the thickness of the second transparent resin layer is thicker than the average thickness $T_2$ of the second transparent resin layer and the number of the portions in which the thickness of the second transparent resin layer is thinner than the average thickness $T_2$ of the second transparent resin layer per 4 cm length in a direction parallel to a surface of the first curable transparent resin layer in a vertical cross-section of the transfer film.

7. The transfer film according to claim 1,
wherein the first curable transparent resin layer includes 0.01% to 0.5% by mass of a surfactant containing a fluorine atom with respect to a solid content of the first curable transparent resin layer.

8. The transfer film according to claim 1,
wherein the first curable transparent resin layer includes a resin that is soluble in organic solvents.

9. The transfer film according to claim 1 which is a dry-resist film.

10. A transparent laminate produced by laminating the transfer film according to claim 1 on a transparent electrode pattern so that the second transparent resin layer can be in direct contact with the transparent electrode pattern and by removing the temporary support,
wherein the transparent laminate has a transparent substrate on a side of the transparent electrode pattern opposite to the side on which the second transparent resin layer is formed.

11. A laminate produced by laminating the transfer film according to claim 1 on a transparent electrode pattern so that the second transparent resin layer can be in direct contact with the transparent electrode pattern,
wherein the transparent laminate has a transparent substrate on a side of the transparent electrode pattern opposite to the side on which the second transparent resin layer is formed.

12. A transparent laminate comprising:
a transparent electrode pattern;
a second transparent resin layer disposed in direct contact with the transparent electrode pattern; and
a first curable transparent resin layer disposed in direct contact with the second transparent resin layer,
wherein Expression 1 and Expression 2A are satisfied, $$n_1 < n_2 \quad \text{Expression 1:}$$

$$100 \times \sigma_2 / T_2 \leq 5.0 \quad \text{Expression 2A:}$$

where $n_1$ represents a refractive index of the first curable transparent resin layer, $n_2$ represents a refractive index of the second transparent resin layer, $\sigma_2$ represents a standard deviation of a thickness of the second transparent resin layer, and $T_2$ represents an average thickness of the second transparent resin layer; and wherein the transparent laminate has a transparent substrate on a side of the transparent electrode pattern opposite to the side on which the second transparent resin layer is formed.

13. An electrostatic capacitance-type input device comprising:
a front plate which is a transparent substrate,
the following elements (3) to (5), (7) and (8) on the noncontact surface side of the front plate, and
the transparent laminate according to claim 10,
wherein the elements (3) to (5), (7) and (8) are as follows:
(3) a plurality of first transparent electrode patterns in which a plurality of pad portions are formed so as to extend in a first direction through a connection portion;
(4) a plurality of second electrode patterns which are electrically insulated from the first transparent electrode patterns and are made of a plurality of pad portions formed so as to extend in a direction orthogonal to the above-described first direction;
(5) an insulating layer that electrically insulates the first transparent electrode pattern and the second electrode pattern;
(7) a second transparent resin layer formed so as to fully or partially cover the elements (3) to (5), this element (7) being the recited second transparent resin layer in the transparent laminate; and
(8) a first curable transparent resin layer adjacently formed so as to cover the element (7), this element (8) being the recited first curable transparent resin layer in the transparent laminate.

14. An image display device comprising:
a display device and
an input device,
wherein the electrostatic capacitance-type input device according to claim 13 serves as the input device.

* * * * *